(12) United States Patent
Kulkarni et al.

(10) Patent No.: US 11,474,843 B2
(45) Date of Patent: *Oct. 18, 2022

(54) AI-DRIVEN HUMAN-COMPUTER INTERFACE FOR ASSOCIATING LOW-LEVEL CONTENT WITH HIGH-LEVEL ACTIVITIES USING TOPICS AS AN ABSTRACTION

(71) Applicant: MICROSOFT TECHNOLOGY LICENSING, LLC, Redmond, WA (US)

(72) Inventors: Aniruddha Prabhakar Kulkarni, Bellevue, WA (US); Nathaniel M. Myhre, Kirkland, WA (US); Yogesh Madhukarrao Joshi, Bellevue, WA (US); William Henry Gates, III, Medina, WA (US); Vignesh Sachidanandam, Redwood City, CA (US); Peter Loren Engrav, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,214

(22) Filed: Apr. 27, 2021

(65) Prior Publication Data
US 2021/0279085 A1    Sep. 9, 2021

Related U.S. Application Data

(63) Continuation of application No. 16/020,940, filed on Jun. 27, 2018, now Pat. No. 10,990,421.

(51) Int. Cl.
*G06F 3/048*    (2013.01)
*G06F 9/451*    (2018.01)
(Continued)

(52) U.S. Cl.
CPC .......... *G06F 9/453* (2018.02); *G06F 3/04845* (2013.01); *G06N 5/04* (2013.01)

(58) Field of Classification Search
CPC ........ G06F 3/04845; G06F 9/453; G06N 5/04
See application file for complete search history.

(56) References Cited

U.S. PATENT DOCUMENTS 7,617,239 B2    11/2009    Laik et al.
7,672,995 B2    3/2010    Balasubramanyan et al.
(Continued)

OTHER PUBLICATIONS

"Non Final Office Action Issued In U.S. Appl. No. 16/020,941", dated Apr. 1, 2021, 8 Pages.
(Continued)

*Primary Examiner* — Rashawn N Tillery
(74) *Attorney, Agent, or Firm* — Newport IP, LLC; Jacob P. Rohwer

(57) ABSTRACT

An artificial intelligence ("AI") based system is disclosed for associating low-level user content, such as documents, email messages, and calendar invites, with high-level user activities using topics as an abstraction. The associations can enable a computing system to provide, among other things, activity-specific views that present a specific selection of low-level user content that is most relevant to a user at a particular point in time. The activity-specific views present the right information to users at the right time based on a context of a user and a user's past activities.

20 Claims, 34 Drawing Sheets

(51) Int. Cl.
   *G06F 3/04845* (2022.01)
   *G06N 5/04* (2006.01)

(56) References Cited

U.S. PATENT DOCUMENTS

| | | | |
|---|---|---|---|
| 10,902,331 | B2 | 1/2021 | Delgado et al. |
| 2006/0143561 | A1 | 6/2006 | Balasubramanyan et al. |
| 2007/0225956 | A1 | 9/2007 | Pratt et al. |
| 2009/0276445 | A1 | 11/2009 | Flake et al. |
| 2012/0102024 | A1 | 4/2012 | Campbell et al. |
| 2013/0046799 | A1 | 2/2013 | Hale et al. |
| 2013/0132138 | A1 | 5/2013 | Doganata et al. |
| 2013/0191326 | A1 | 7/2013 | Sharma |
| 2013/0254329 | A1 | 9/2013 | Lin et al. |
| 2013/0262439 | A1 | 10/2013 | Hao et al. |
| 2013/0339907 | A1 | 12/2013 | Matas et al. |
| 2014/0067535 | A1 | 3/2014 | Rezaei et al. |
| 2014/0304267 | A1 | 10/2014 | Deng et al. |
| 2015/0012467 | A1 | 1/2015 | Greystoke et al. |
| 2015/0278691 | A1 | 10/2015 | Xia et al. |
| 2015/0294220 | A1 | 10/2015 | Oreif |
| 2015/0356446 | A1 | 12/2015 | Greystoke et al. |
| 2016/0162785 | A1 | 6/2016 | Grobman |
| 2016/0180738 | A1 | 6/2016 | Garis et al. |
| 2016/0217476 | A1 | 7/2016 | Duggal et al. |
| 2016/0306965 | A1 | 10/2016 | Iyer et al. |
| 2017/0026318 | A1 | 1/2017 | Daniel et al. |
| 2017/0097951 | A1* | 4/2017 | Nachiappan ........ G06F 16/2228 |
| 2018/0046470 | A1 | 2/2018 | De Oliveira et al. |
| 2018/0137856 | A1 | 5/2018 | Gilbert |
| 2018/0246486 | A1 | 8/2018 | Krasadakis |
| 2019/0199733 | A1 | 6/2019 | Aaltonen et al. |
| 2020/0004388 | A1 | 1/2020 | Myhre et al. |

OTHER PUBLICATIONS

"Non Final Office Action Issued In U.S. Appl. No. 16/020,943", dated Apr. 1, 2021, 10 Pages.

"Notice of Allowance Issued in U.S. Appl. No. 16/020,941", dated Feb. 11, 2022, 8 Pages.

"Notice of Allowance Issued in U.S. Appl. No. 16/020,943", dated Jan. 26, 2022, 8 Pages.

"Final Office Action Issued in U.S. Appl. No. 16/020,941", dated Oct. 14, 2021, 10 Pages.

"Final Office Action Issued in U.S. Appl. No. 16/020,943", dated Oct. 15, 2021, 11 Pages.

"Notice of Allowance Issued in U.S. Appl. No. 16/020,943", dated Apr. 20, 2022, 8 Pages.

* cited by examiner

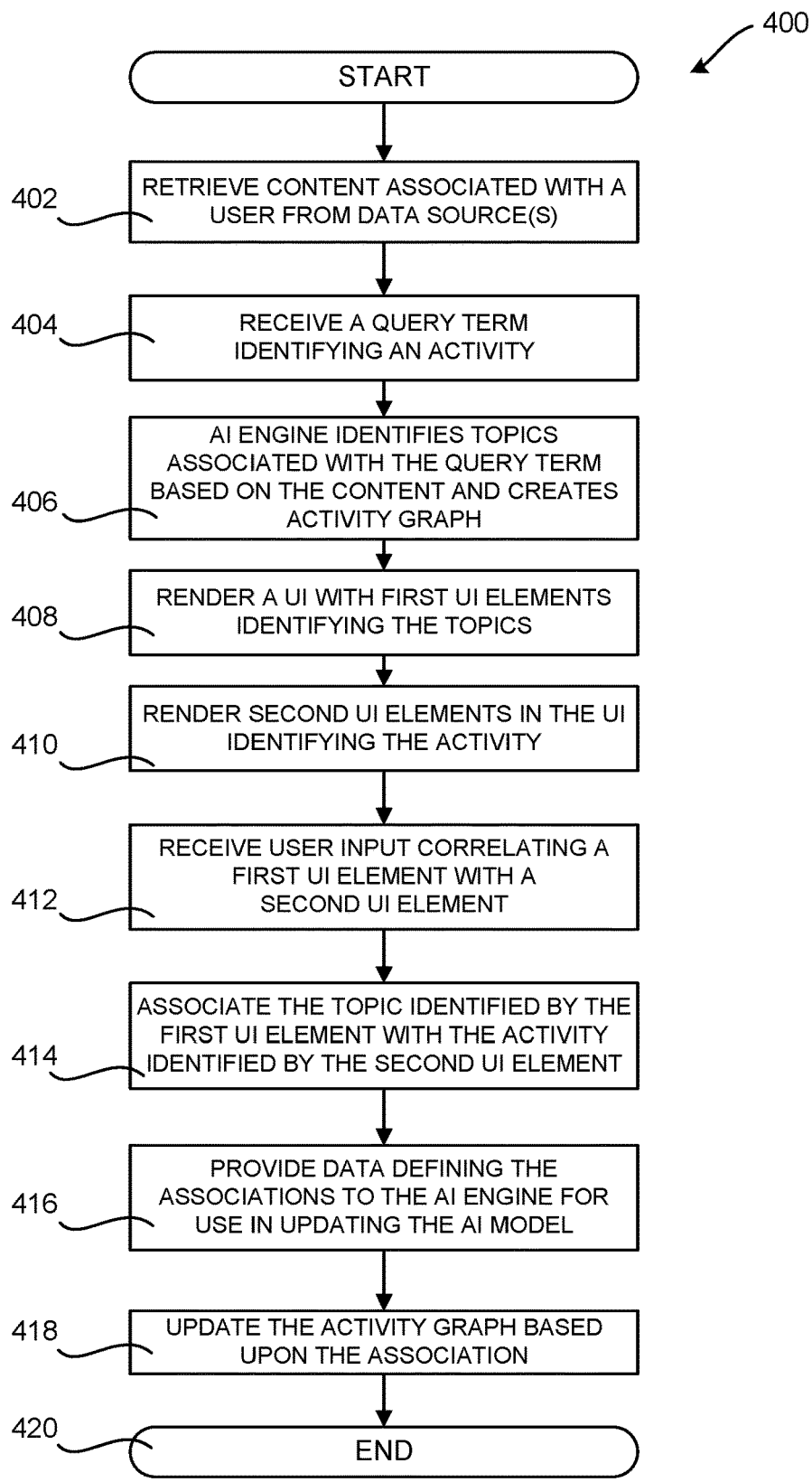
FIG. 4 — ASSOCIATE LOW-LEVEL CONTENT TO HIGH-LEVEL ACTIVITIES USING TOPICS AS AN ABSTRACTION

Project X

What can I help you with?

HOME | CONVERSATIONS | EVENTS | FILES

THIS WEEK

Code Review in Bill's Office
03/16/18
3:30 PM – 4 PM

NEXT WEEK

Meet with Team
SKYPE
03/24/18
1:30 PM – 2:30 PM

Project X – original document.docx

*Lorem ipsum dolor sit amet, consectetur adipiscing elit. ALIO MODO. Mene ergo et Triarium dignos existimas, apud quos turpiter loquare? Quae cum ita sint, effectum est nihil esse malum, quod turpe non sit. Esse enim quam vellet iniquus iustus poterat inpune. Sed tamen omne, quod de re bona dilucide dicitur, mihi praeclare dici videtur. Duo Reges: constructio interrete. Tu enim ista lenius, hic Stoicorum more nos vexat. Nec tamen ullo modo summum pecudis bonum et hominis idem mihi videri potest. Nam ista vestra: Si gravis, brevis;*

*Illum mallem levares, quo optimum atque humanissimum virum, Cn. Ego quoque, inquit, didicerim libentius si quid attuleris, quam te reprehenderim. Cum praesertim illa perdiscere ludus esset.*

TWO PEOPLE

Project X – retrospective 2-18-2018.pptx

Project X – Slides Outline.docx

Project X – Dashboard.png

Subject: Upcoming Deadline
From: Amar Singh

Steve-- I think the schedule is slipping. Let's discuss soon.

FIG. 9A

GENERATE ACTIVITY-SPECIFIC UI FOR PRESENTING AND ACTING ON ACTIVITY-SPECIFIC CONTENT

AUTO-GENERATING AN APPLICATION FOR PROVIDING A ACTIVITY-SPECIFIC VIEW OF ACTIVITY-SPECIFIC CONTENT

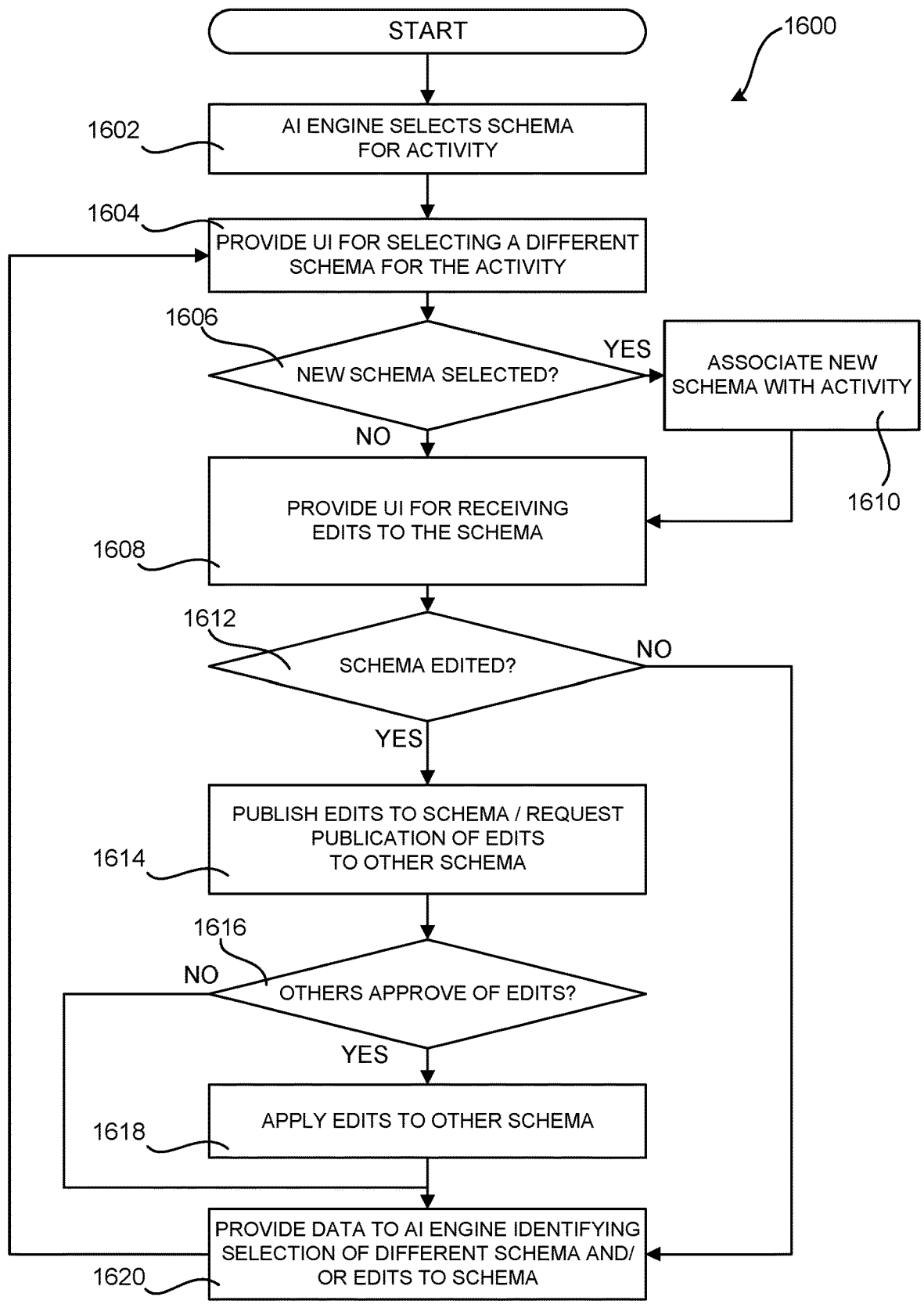
FIG. 16    INDIVIDUAL AND CROWDSOURCED MODIFICATION OF ACTIVITY-SPECIFIC SCHEMA AI-ASSISTED CLUSTERING AND PERSONALIZATION FOR DISAMBIGUATING NATURAL LANGUAGE QUERIES OVER SEMI-STRUCTURED DATA FROM MULTIPLE DATA SOURCES

AI-DRIVEN HUMAN-COMPUTER INTERFACE FOR ASSOCIATING LOW-LEVEL CONTENT WITH HIGH-LEVEL ACTIVITIES USING TOPICS AS AN ABSTRACTION

PRIORITY APPLICATION(S)

This application claims priority to U.S. patent application Ser. No. 16/020,940, filed on Jun. 27, 2018 and entitled "AI-DRIVEN HUMAN-COMPUTER INTERFACE FOR ASSOCIATING LOW-LEVEL CONTENT WITH HIGH-LEVEL ACTIVITIES USING TOPICS AS AN ABSTRACTION," the entire disclosure of which is expressly incorporated in its entirety by its reference herein. In the alternative, this application claims priority to U.S. patent application Ser. No. 16/020,947, also filed on Jun. 27, 2018 and entitled "FRAMEWORK AND STORE FOR USER-LEVEL CUSTOMIZABLE ACTIVITY-BASED APPLICATIONS FOR HANDLING AND MANAGING DATA FROM VARIOUS SOURCES," the entire disclosure of which is expressly incorporated in its entirety by its reference herein.

BACKGROUND

There are a number of existing software programs for helping users manage their personal information. For instance, personal information management ("PIM") programs can send, receive, and store electronic messages, and store address books, calendar events and tasks. Other applications also allow users to store and communicate files by the use of a network service, such as ONEDRIVE or other network storage services. Using these services, users can share and collaborate on virtually any type of document.

Although the tools described above individually provide specific features for helping users manage individual types of data, such as electronic messages, contact lists, documents, spreadsheets, images, and videos, there are a number of drawbacks with some existing systems. For instance, there are a number of scenarios where a user's personalized data set becomes too large. In some instances, a user may have tens or even hundreds of thousands of emails, images, documents, tasks lists, etc. This large amount of data can make it very difficult for many users to process, locate, and utilize data files relating to a particular context, such as an activity, person, or event.

There are a number of solutions that have been presented to help users organize and make use of large amounts of personal data. For instance, a number of companies have developed searching tools that enable users to query for relevant information. These tools are helpful for finding individual elements of content, such as a particular file or image. However, such tools may not provide the most accurate results given that the context of some queries may not be accurately represented.

In addition, it can be difficult to use general search tools to find data having specialized formats such as tasks, contact information, images, videos, etc. In some situations, for example, users may have to interact with a large number of applications to find content relating to a particular context, such as an activity or event. Then, once the content is located, the user is challenged with the task of compiling the content into a useable format.

These labor-intensive steps can be inconvenient for users and cause significant inefficiencies with respect to the utilization of computing resources. For example, opening and interacting with multiple applications to locate relevant information regarding a particular context can result in the inefficient utilization of processor cycles, memory, batter power, and network bandwidth. Moreover, some existing systems cause inefficient computer interactions that increase the frequency of inadvertent user inputs which, in turn, cause further inefficiencies with respect to the utilization of computing resources. Given these drawbacks and others, there still exists a need for tools that can efficiently identify and present salient information relating to a particular context.

It is with respect to these and other technical challenges that the disclosure made herein is presented.

SUMMARY

The technologies described herein provide an artificial intelligence ("AI") driven human-computer interface ("HCI") for associating low-level content to high-level activities using topics as an abstraction. The associations can be generated by a computing system for use in organizing, retrieving and displaying data in a usable format that improves user interaction with the computing system. In one aspect, the present disclosure provides an AI-driven HCI for associating volumes of low-level content, such as email content and calendar events, with high-level activity descriptions. The associations enable a computing system to provide activity-specific views that present a specific selection of the low-level content in an arrangement that is contextually relevant to a user's current situation.

In some configurations, an AI-based system presents activity-specific views of relevant activity-specific content. In particular, an AI engine can select activity-specific content relating to a multitude of activities. The selected activities can have associated relevance scores exceeding a predefined threshold value. The selected activity-specific content can be used to render user interface ("UI") elements in a UI for the activities. The UI elements present an activity-specific view of the activity-specific content relating to each activity.

In other configurations, an AI-based system utilizes a schema to auto-generate an application for a specific context. An AI engine selects an activity schema associated with an activity. The schema identifies data sources for obtaining activity-specific content for the activity and can be selected based upon topics associated with the activity. The AI engine also selects a view definition that defines an arrangement of an activity-specific UI for presenting relevant activity-specific content obtained from the data sources identified by the schema. An application is then generated using the schema and the view definition. The application can generate the activity-specific UI for presenting the relevant activity-specific content.

In other configurations, an AI engine generates an activity graph that includes nodes corresponding to activities and that defines clusters of content associated with the activities. A natural language ("NL") search engine can receive a NL query and parse the NL query to identify entities and intents specified by the NL query. Clusters of content defined by the activity graph can be identified based upon the identified entities and intents. A search can then be made of the identified clusters of content using the entities and intents. Search results identifying the content located by the search can then be returned in response to the NL query.

In other configurations, an AI engine selects a schema that defines an activity-specific UI for presenting activity-specific content based upon one or more topics associated with an activity. A UI can then be presented for receiving edits to the selected schema and the edits can be published for utilization by other users. Data identifying the edits, selection of a different schema for the activity, modification of properties associated with the selected schema, and data describing usage of the schema can be provided to the AI engine for using in improving an AI model utilized to select the schema.

Among many other technical benefits, the techniques disclosed herein can improve a user's interaction with one or more computing devices. For example, using the disclosed technologies a user can interact with only a single application to view and interact with various types of data such as, but not limited to, relevant email messages, images, calendar events, and tasks. This can reduce the utilization of computing resources like processor cycles, memory, network bandwidth, and power.

Improved user interaction can also reduce the likelihood of inadvertent user inputs and thus save computing resources, such as memory resources, processing resources, and networking resources. The reduction of inadvertent inputs can reduce a user's time interacting with a computer, reduce the need for redundant queries for data, and also reduce the need for repeated data retrieval. By providing the right information to users at the right time, many other technical benefits can also result. Other technical benefits not specifically mentioned herein can also be realized through implementations of the disclosed subject matter.

It is to be appreciated that while the technologies disclosed herein are primarily presented in the context of associating low-level content with activities, the disclosed technologies can additionally be utilized to associate low-level content with other types of contexts. It should also be appreciated that the subject matter disclosed herein can be implemented as a computer-controlled apparatus, a computer-implemented method, a computing device, or as an article of manufacture, such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages of prior solutions noted in any part of this disclosure.

BRIEF DESCRIPTION OF THE DRAWINGS

FIG. 4 is a flow diagram illustrating aspects of a routine for generating associations between low-level content and high-level activities using topics as an abstraction.

FIG. 9A is a UI diagram showing aspects of one example of an interactive activity-specific UI for presenting and interacting with activity-specific content.

FIG. 16 is a flow diagram illustrating aspects of a routine for enabling individual and crowdsourced modification of activity schema.

DETAILED DESCRIPTION

Figure 1:
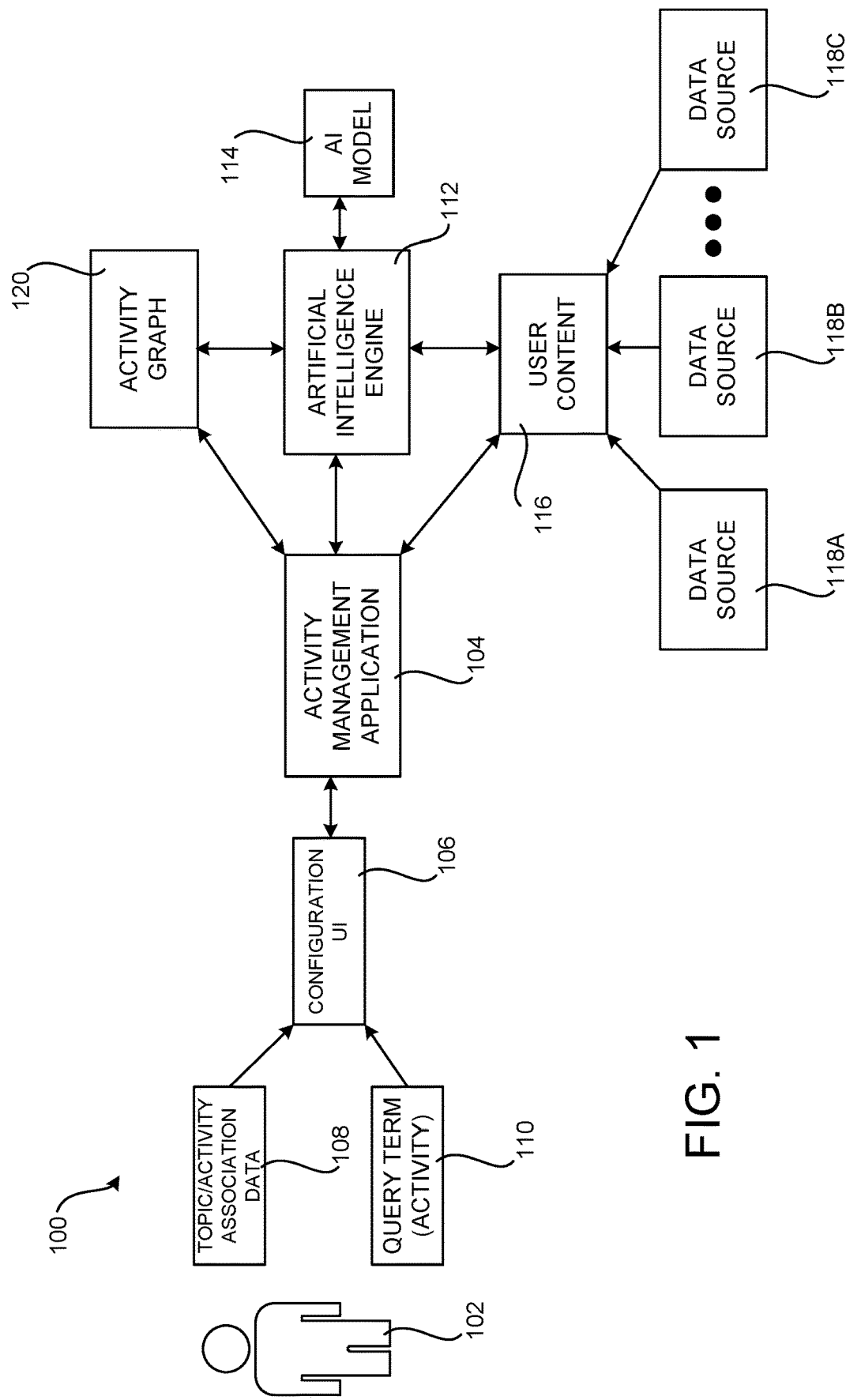
FIG. 1 is a computing system diagram illustrating aspects of an operating environment for the technologies disclosed herein along with aspects of an illustrative system that enables computationally efficient association of low-level content to high level activities using topics as an abstraction.

The following Detailed Description is directed to technologies that utilize AI and NL systems to enable users to organize, retrieve, view, and interact with activity-specific content in a usable layout that improves user interaction with a computing device. One aspect of the present disclosure provides an AI-driven system for associating volumes of low-level content, such as emails, files, images, and calendar events, with high-level activity descriptions.

Other aspects of the present disclosure enable a computing system to provide activity-specific views that show a specific selection of the low-level content in a format that is easy to use and contextually relevant to the activities currently taking place in a user's life. Among other aspects, the present disclosure also provides a framework for users to provide customized activity-based applications for selecting, managing, retrieving, and generating customized displays of low-level content. The customized activity-based applications can be modified using one or more crowdsourced resources that enable multiple users to create an optimal feature base for selecting, managing, retrieving, and providing customized displays of low-level content related to an activity.

Among many other technical benefits, the techniques disclosed herein can improve a user's interaction with one or more computing devices. For example, and as discussed briefly above, using the disclosed technologies a user can interact with only a single application to view and interact with various types of data such as, but not limited to, relevant email messages, images, calendar events, and tasks. This can reduce the utilization of computing resources like processor cycles, memory, network bandwidth, and power.

Improved user interaction can also reduce the likelihood of inadvertent inputs and thus save computing resources, such as memory resources, processing resources, and networking resources by eliminating the communication of data that has been re-entered following an inadvertent input. By providing the right information at the right time, queries for information can also be reduced. Other technical benefits not specifically mentioned herein can also be realized through implementations of the disclosed subject matter.

While the subject matter described herein is presented in the general context of a server-based service, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a system for providing an AI-driven system for associating low-level content to high level activities using topics as an abstraction will be described.

Figure 6A:
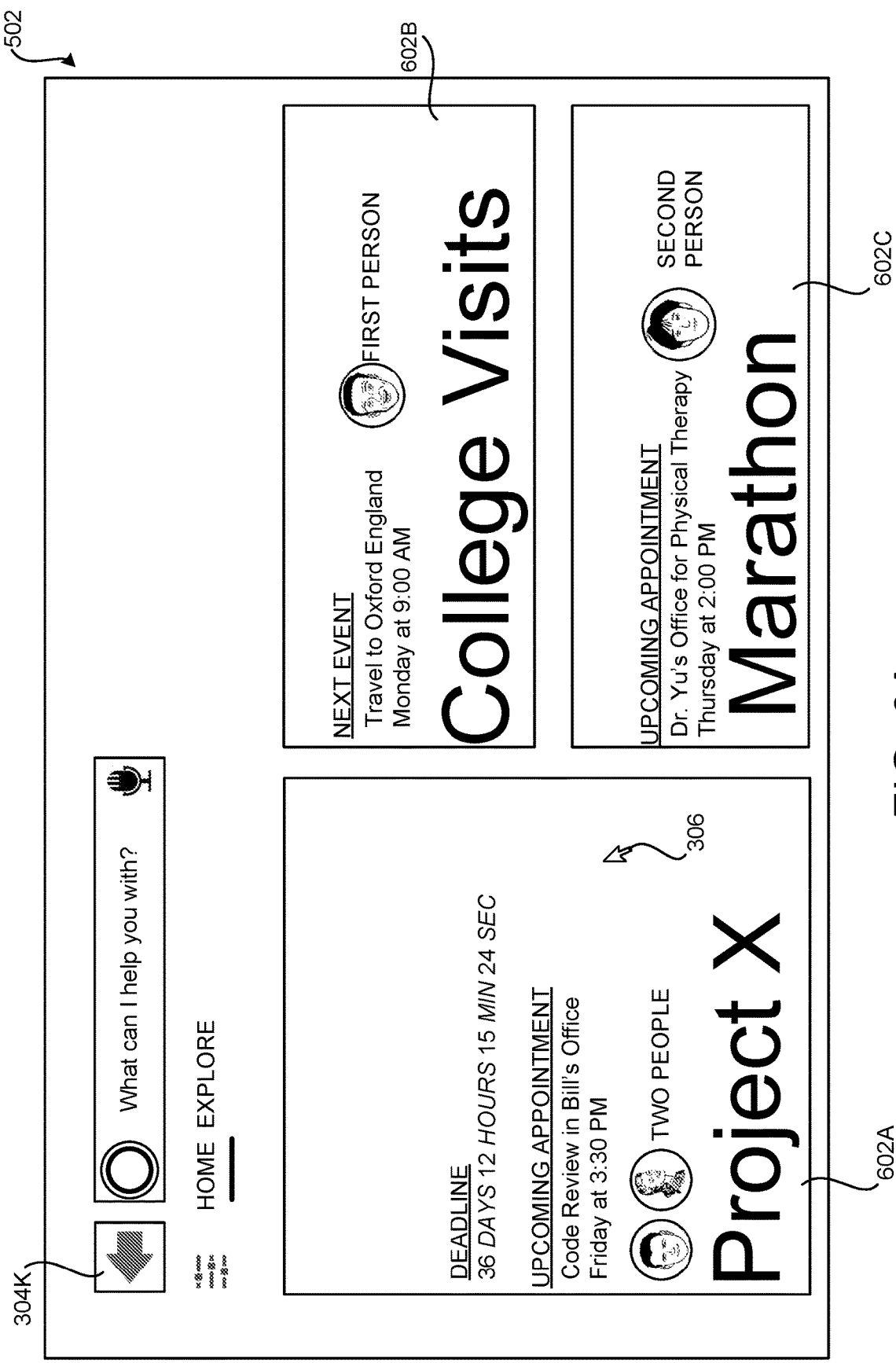
FIG. 6A is a UI diagram showing aspects of an illustrative UI that displays a dashboard UI for presenting multiple activity-specific views.
Figure 6B:
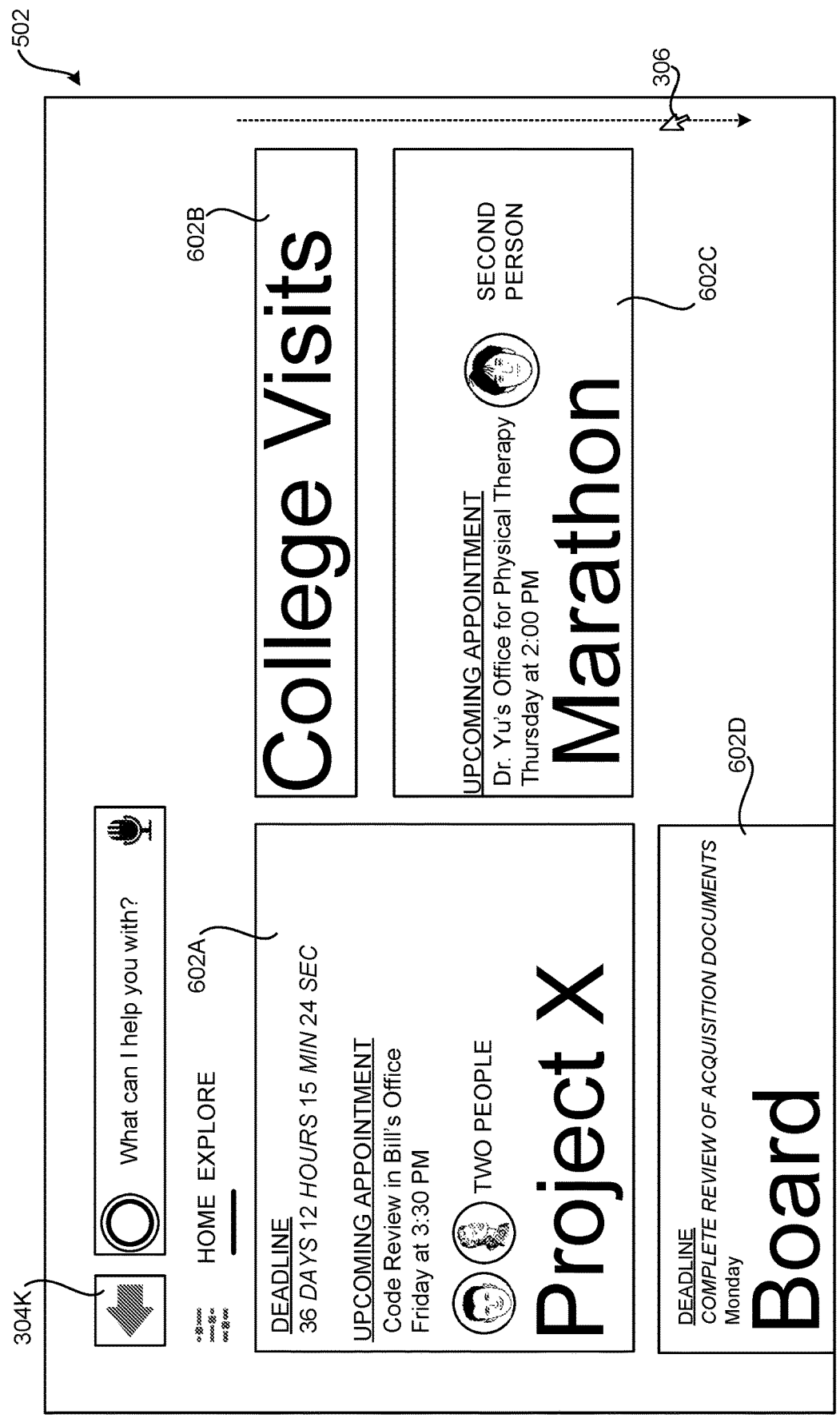
FIG. 6B is a UI diagram showing features of the dashboard UI for enabling users to modify the presentation of activity-specific views.
Figure 7:
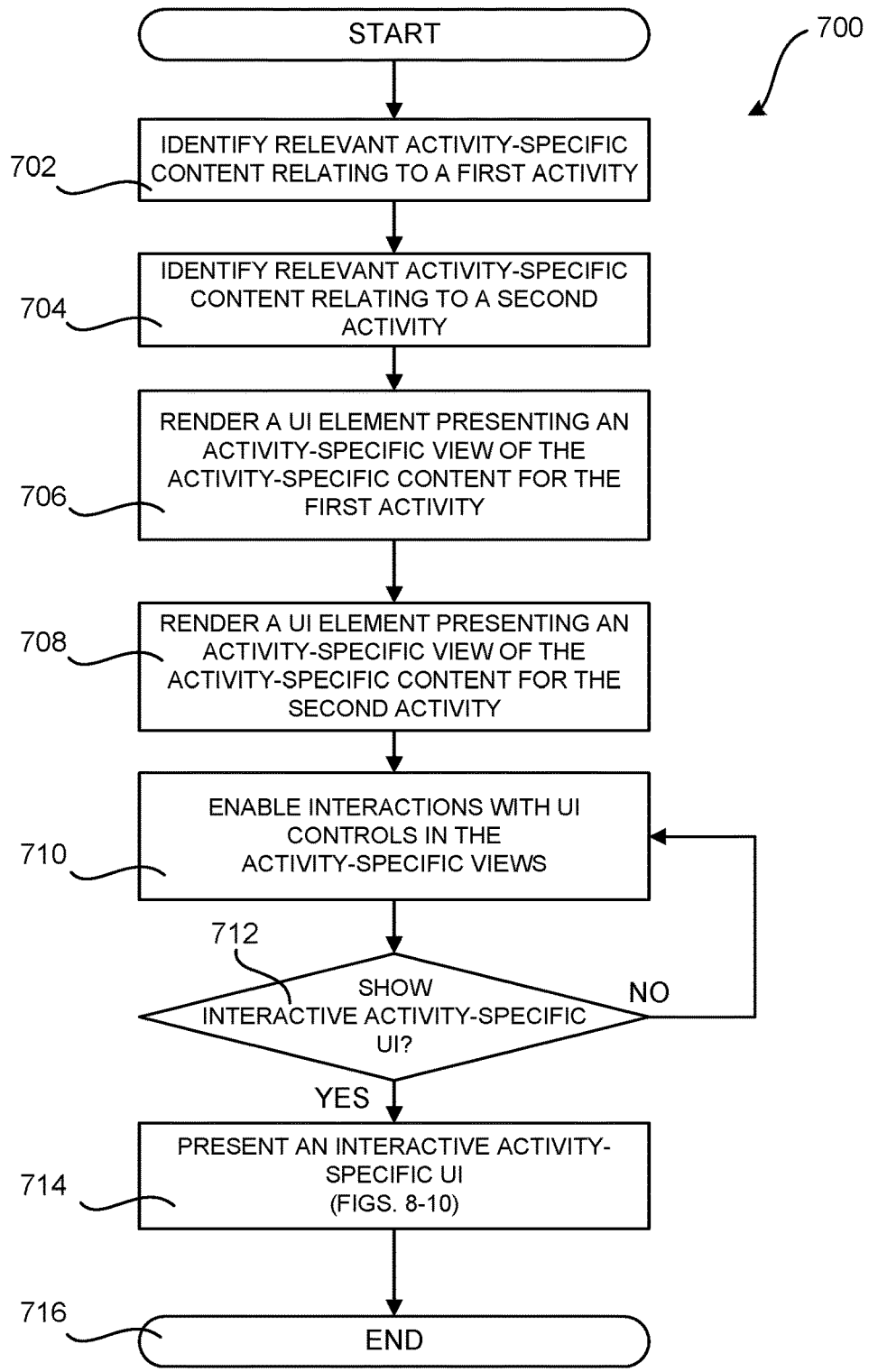
FIG. 7 is a flow diagram illustrating aspects of a routine for generating a UI for presenting activity-specific content in activity-specific views.
Figure 17:
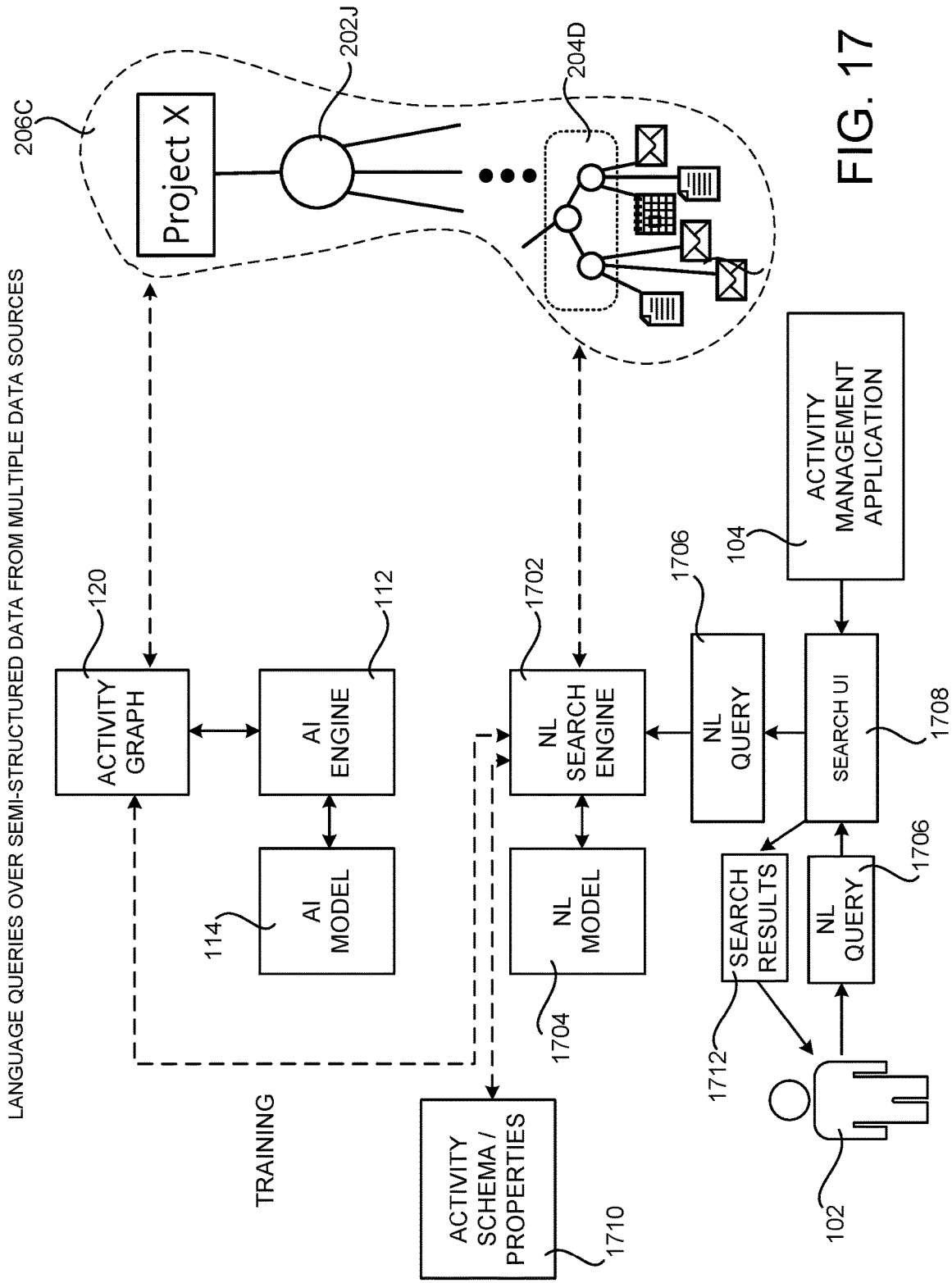
FIG. 17 is a computing system diagram illustrating aspects of an operating environment for enabling AI-assisted clustering and personalization of data for disambiguating natural language ("NL") queries over semi-structured data from multiple data sources.

A number of aspects and features are disclosed herein. For example, one aspect of the present disclosure includes an AI-driven system for associating low-level content to high level activities using topics as an abstraction. Such features are depicted in FIGS. 1-4, 6A-7, and 9A-10 and described below. Another aspect of the present disclosure includes an AI-driven HCI for presenting activity-specific views of activity-specific content for multiple activities. Such features are depicted in FIGS. 6A-7 and described below. Another aspect of the present disclosure includes an AI-synthesized application for presenting an interactive activity-specific UI of activity-specific content. The activity-specific UI enables users to interact with the data for providing feedback to an AI engine. Such features are depicted in FIGS. 9A-9D, 11 and 12 and described below. Another aspect of the present disclosure includes a framework and store for user-level customizable activity-based applications for managing and displaying data from various sources. Such features are depicted in FIGS. 13-16 and described below. Another aspect of the present disclosure includes personalized AI and NL models based on user-defined semantic context and activities. Such features are depicted in FIGS. 17-19 and described below.

To illustrate the above-described aspects, consider the following example scenario where a user has thousands of instances of low-level content, e.g., emails, images, to-do list items, calendar events, address book entries, etc. To generate a customized view that displays the most relevant content to the user at a specific point in time, the user can first provide an input identifying an activity. Based on the user-identified activity, an AI engine can utilize an AI model to automatically analyze the user's content such as, for instance, by clustering the user's content to identify topics related to the activity. For example, if a user input indicates an activity such as a "Marathon", the AI engine may identify one or more topics such as "get new shoes" from documents and emails associated with the user.

The techniques disclosed herein also provide a UI that displays the identified topics with one or more activities identified by the user. The UI enables the user to confirm or refute associations between the identified topics and the activities generated by the AI engine. Based on these user indications, the AI engine can adjust the AI model and an activity graph that defines the clusters of content and associations between the content and activities.

The user can also change the relevance of a topic by resizing or reordering graphical elements associated with the suggested topics. Such indications provided by the user can be used to provide feedback to the AI engine to update the AI model and the activity graph. By analyzing user interactions that indicate a level of relevance between topics and activities, the systems disclosed herein can improve an AI model that will, in turn, produce more accurate results when identifying topics based upon user-identified activities. Further, the improved AI model can be used to select and display relevant content. The improved AI model can also be used to identify activities and categories of activities in some configurations. The following Detailed Description describes the technical aspects of nonlimiting example systems that can be used to enable this user scenario.

AI-Driven Human-Computer Interface for Associating Low-Level Content with High-Level Activities Using Topics as an Abstraction FIG. 1 is a computing system diagram illustrating aspects of an operating environment 100 (also referred to herein as a "system 100") that enables computationally efficient processing of data associating low-level content to high level activities using topics as an abstraction. Generally described, the system 100 includes an activity management application 104, a configuration UI 106, and an artificial intelligence ("AI") engine 112. A user 102 can interact with the configuration UI 106 to provide a query term 110 to the activity management application 104 that identifies an activity. For example, and without limitation, the user 102 might supply a query term 110 that identifies an activity that the user 102 is currently engaged in such as, but not limited to, a personal activity like "Marathon" training, a work-related activity like a project that the user 102 is working on, or another type of activity in the user's life. The query term 110 can be provided by any type of input mechanism such as, but not limited to, a UI capturing a text input, a microphone capturing a voice input, or a camera capturing a gesture.

In response to receiving the query term 110, the AI engine 112 can analyze content associated with the user 102 (referred to herein as user content 116) to identify topics associated with the activity identified by the query term 110. The user content 116 can include, but is not limited to, files obtained from a number of data sources 118A-118C (which might be referred to collectively as data sources 118), such as a file server, an email server, a social networking service, a PIM server, or another type of local or network-accessible data source 118. For illustrative purposes, individual items of user content 116 might be referred to herein as "instances of user content 116" or "content items." User content 116 might also be referred to herein as "low-level content" and activities (not shown in FIG. 1) might also be referred to herein as "high-level activities."

In some configurations, the AI engine 112 can utilize an AI model 114 to analyze the user content 116 to identify one or more topics based on content items that are related to the activity identified by the query term 110. For instance, if the user 102 provides the query term 110 "Marathon", emails, contact list items (e.g., people), calendar events, or other data identifying the topics "marathon", "location," "buy new shoes," "marathon training," or other related topics can be identified by the AI engine 112.

The AI model 114 can utilize various technologies to identify topics associated with an activity based upon the user content 116. For example, and without limitation, the AI model 114 can utilize unsupervised clustering, Bayesian networks, representation learning, similarity and metric learning, rule-based machine learning, learning classifier systems, support vector machines ("SVMs"), deep learning, artificial neural networks, associated rule learning, decision tree learning, or other machine learning techniques. As will be described in greater detail below, interaction by the user 102 with the configuration UI 106 and other UIs generated by the activity management application 104 can be utilized to continually update the AI model 114 to improve its ability to accurately identify relevant topics relating to user-specified activities based upon user content 116. Additional details regarding this process will be provided below.

When analyzing and processing the user content 116, the AI engine 112 can generate one or more activity graphs 120. Generally described, an activity graph 120 can define a hierarchy of relationships between user-specified activities, topics related to the activities, and the user content 116 that resulted in the association of the topics with the activities. Additional details regarding an illustrative activity graph 120 will be provided below with regard to FIG. 2.

As will be described in greater detail below with regard to FIGS. 3A-4, the configuration UI 106 can also provide functionality for enabling a user 102 to define topic/activity association data 108 describing associations between an activity and topics identified by the AI engine 112 as being associated with the activity. The configuration UI 106 can also provide functionality for enabling the user 102 to specify the relevance of a topic to an activity, indicate that a topic is unrelated to an activity, view the instances of user content 116 that resulted in a topic being associated with an activity by the AI engine 112, and to perform other functions. These types of user inputs can be fed back into the AI engine 112 for use in updating the AI model 114 to better predict the topics associated with an activity in the future. The activity graph 120 can also be updated to reflect the user's interaction with the configuration UI 106 and other UIs provided by the activity management application 104. Additional details regarding these aspects will be provided below with regard to FIGS. 3A-4.

Figure 2:
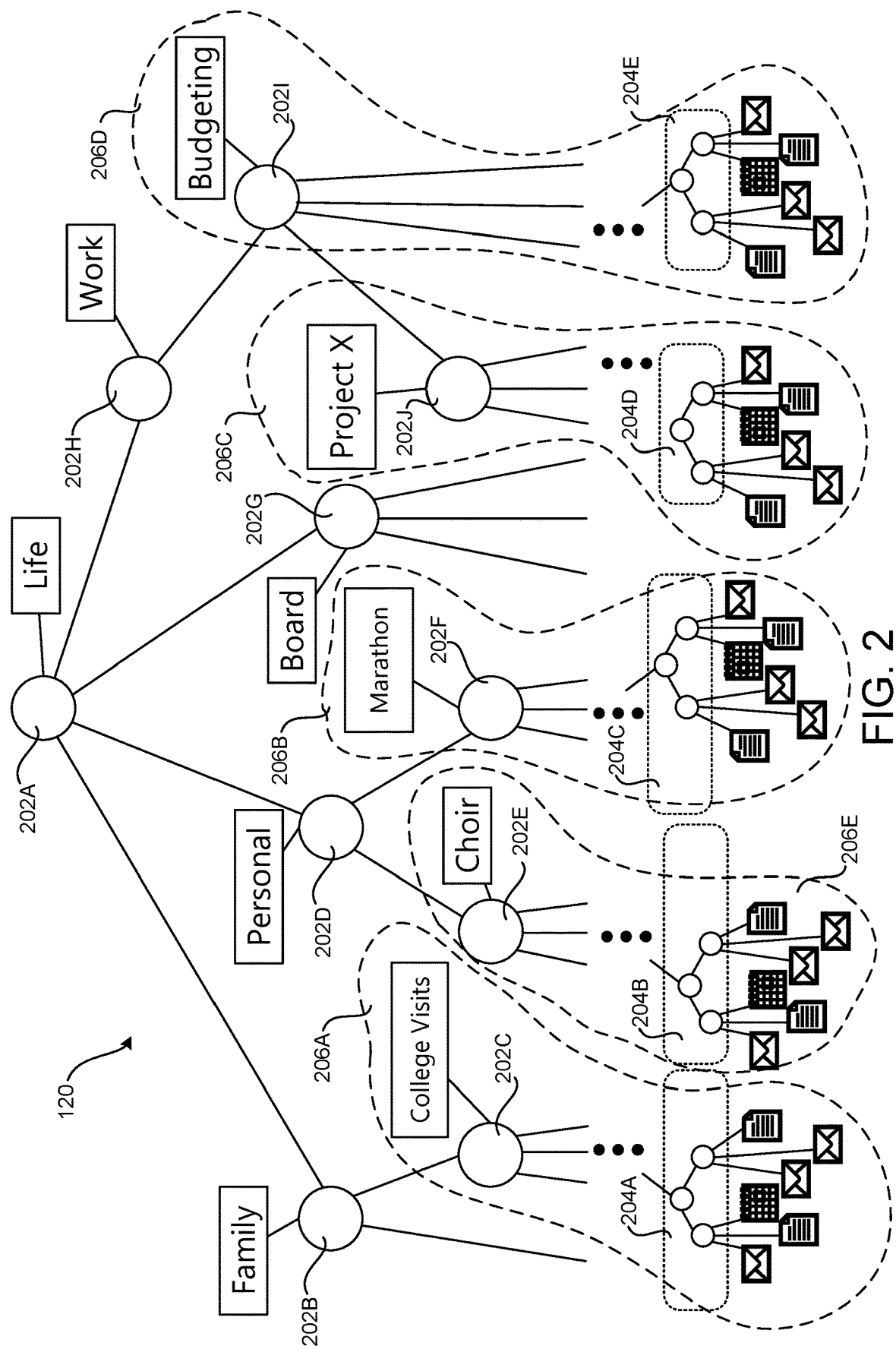
FIG. 2 is a multi-level activity graph showing associations between low-level content and high-level activities.

Referring now to FIG. 2, aspects of an illustrative activity graph 120 will be described. As shown in FIG. 2, an activity graph can include a number of nodes 202A-202J, including leaf nodes 204. The node 202A at the highest level of the activity graph 120 (i.e. the root node) corresponds to a user's life. The nodes 202B, 202D, 202G and 202H below the root node correspond to categories of activities currently taking place in the user's life. For example, and without limitation, the node 202B corresponds to family-related activities, the node 202D corresponds to other non-family personal activities, the node 202G corresponds to corporate board activities, and the node 202H corresponds to work-related activities.

The next layer of nodes 202C, 202E, 202F, 202J and 202I in the activity graph 120 correspond to activities in a user's life. For example, and without limitation, the node 202C corresponds to "College Visits," the node 202E corresponds to "Church Choir," related activities, the node 202F corresponds to "Marathon" related activities, the node 202J corresponds to a work project called "Project X"," and the node 202I corresponds to a work-related budgeting activity. As discussed above, the user 102 specifies a query term 110 identifying these activities in some configurations. In other configurations, the AI engine 112 identifies the activities based upon an analysis of the user content 116.

The leaf nodes 204 under each activity-related node correspond to the topics associated with each activity. For instance, the leaf nodes 204A under the "College Visits" activity might correspond to the names of colleges to be visited, contact information for people associated with the "College Visits", documents including travel plans for the "College Visits", and other types of information. As another example, the leaf nodes 204C might correspond to calendar entries specifying the data, time, and location of a "Marathon", task list entries defining a training schedule, a reminder to purchase new running shoes, and other types of information relating to the "Marathon" activity.

Instances of user content 116 relating to the corresponding topic are identified under the leaf nodes 204. For example, and without limitation, the icons shown in FIG. 2 beneath the leaf node 204A represent instances of user content 116 related to topics associated with the "College Visits" activity, the icons beneath the leaf node 204B represent instances of user content 116 related to topics associated with the choir activity, the icons beneath the leaf node 204C represent instances of user content 116 related to topics associated with the "Marathon" activity, the icons beneath the leaf node 204D represent instances of user content 116 related to topics associated with the "Project X" activity, and the icons beneath the leaf node 204E represent instances of user content 116 related to topics associated with the budgeting activity.

As also shown in FIG. 2, the activity graph 120 can include clusters 206 associating the low-level content identified by the leaf nodes 204 with individual topics and high-level activities or groups of activities. As shown, a first cluster 206A associates the instances of user content 116 under the leaf nodes 204A with the "College Visits" activity and its associated topics, a second cluster 206E associates the instances of user content 116 under the leaf nodes 204B with the "Choir" activity and its associated topics, a third cluster 206B associates the instances of user content 116 under the leaf nodes 204C with the "Marathon" activity and its associated topics, a fourth cluster 206C associates the instances of user content 116 under the leaf nodes 204D with the "Project X" activity and its associated topics, and the cluster 206D associates the instances of user content 116 under the leaf nodes 204E with the budgeting activity and its associated topics.

As will be described below, the activity management application 104 uses the activity graph 120 to generate contextually relevant views of the user content 116. In addition, the activity graph 120 can be utilized to populate the configuration UI 106 and enable a user to associate suggested topics with one or more activities. Additional details regarding this process are provided below with regard to FIGS. 3A-4.

It is to be appreciated that the activity graph 120 shown in FIG. 2 is merely illustrative and that activity graphs 120 for other users 102 will include different information than shown in FIG. 2. It is also to be appreciated that although the configurations disclosed herein utilize a graph data structure to represent the relationships between activities, topics, and related instances of user content 116, other types of data structures can be utilized to store this information in other configurations.

Turning now to FIGS. 3A-3E, additional aspects of the layout and operation of the configuration UI 106 will be provided. In particular, FIGS. 3A-3E will be described with reference to an example scenario to illustrate how a user 102 can interact with the system 100 to configure associations between low-level content and high-level activities using topics as an abstraction. In the examples shown in FIGS. 3A-3E and the other FIGS., a user 102 interacts with the system 100 using a standard mouse or trackpad user input device. As discussed above, however, other types of user input mechanisms can be utilized in other configurations to enable similar functionality.

Figure 3A:
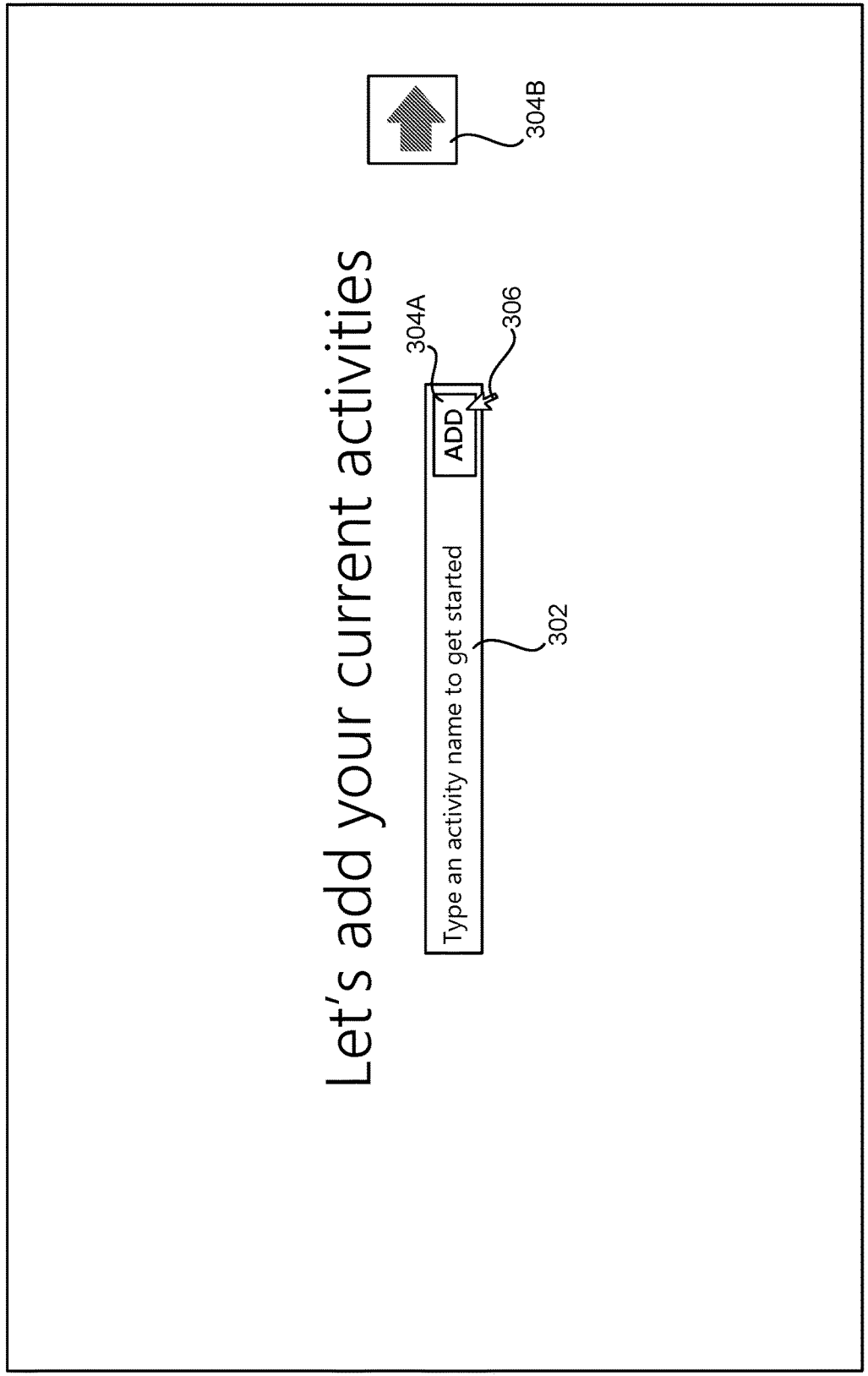
FIG. 3A is a user interface ("UI") diagram showing aspects of an illustrative UI that enables a computing system to receive a term from a user, the term identifying an activity.

FIG. 3A is a UI diagram showing aspects of the configuration UI 106 for receiving a query term 110 identifying an activity from the user 102. In this illustrative example, the configuration UI 106 is in the form of a rendering having a data entry field 302, a first UI element 304A, and a second UI element 304B. The user 102 can interact with the configuration UI 106 by directing a pointer 306, which can be controlled by the use of any type of suitable input device such as a mouse or trackpad. To provide the query term 110, the user 102 can enter text in the data entry field 302 and actuate the first UI element 304A to provide the query term to the system 100. The user 102 can provide multiple query terms 110 identifying multiple activities using the UI shown in FIG. 3A.

Figure 3B:
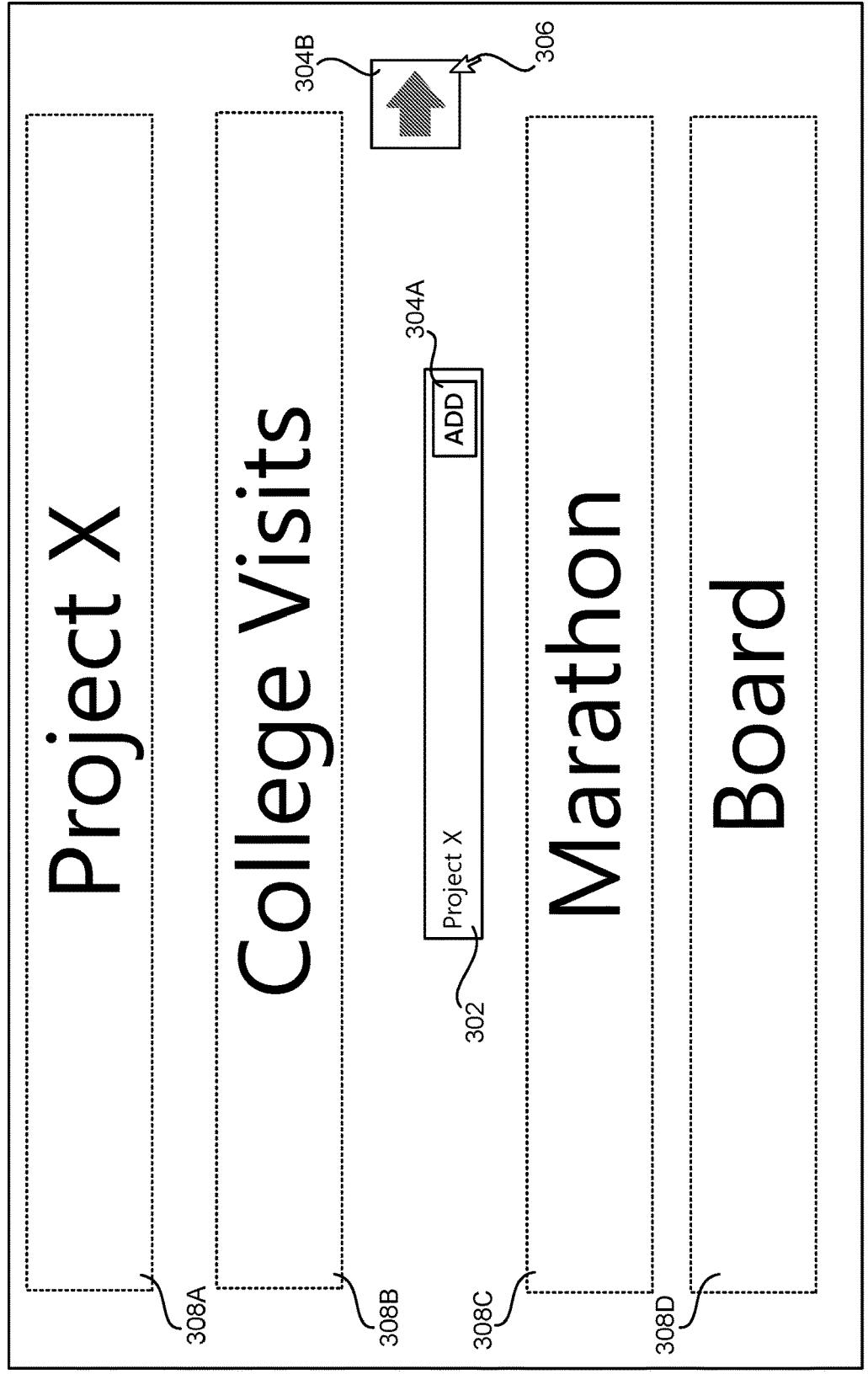
FIG. 3B is a UI diagram showing aspects of an illustrative UI that displays high-level activities that can be selected by a user.

FIG. 3B shows an example of the configuration UI 106 after the user 102 has entered a number of query terms 110 in the data entry field 302. In this example, the user 102 has entered four query terms 110: "Project X"; "College Visits"; "Marathon"; and "Board". UI elements (referred to herein as "activity identifiers 308") identifying the query terms 110 entered by the user 102 are shown in the UI 106. For illustrative purposes, the activity identifiers 308 might be referred to collectively as the "activity identifiers 308" or an "activity identifier 310 (shown in FIG. 3C)."

Figure 3C:
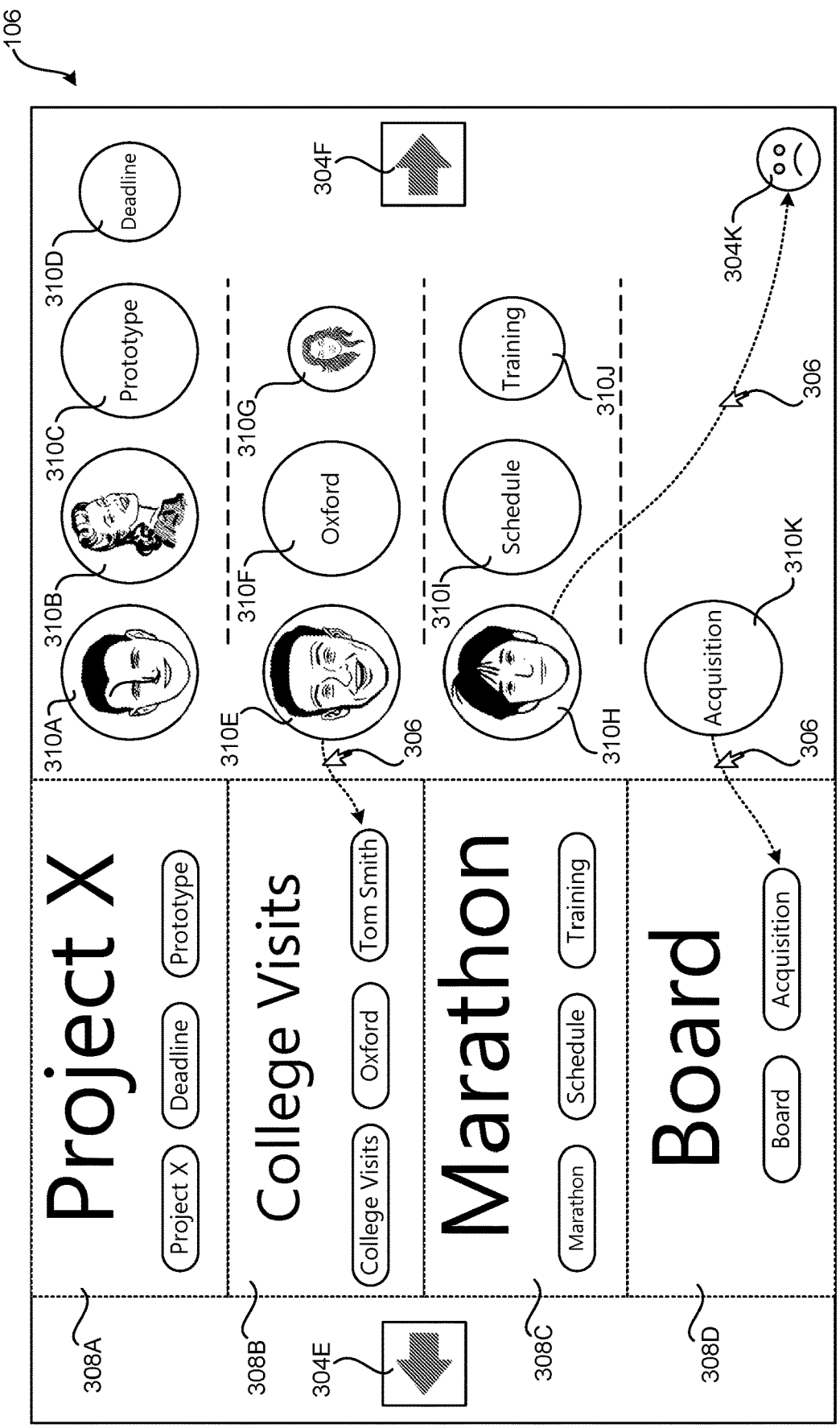
FIG. 3C is a UI diagram showing aspects of an illustrative UI that displays high-level activities along with topics that are suggested by an artificial intelligence ("AI") -driven computing system, the UI enabling users to make associations between the high-level activities and the topics.

Selections of the second UI element 304B shown in FIGS. 3A and 3B will cause the configuration UI 106 to present the rendering shown in FIG. 3C. The layout of the configuration UI 106 shown in FIG. 3C enables the user 102 to associate topics identified by the AI engine 112 with the user-specified activities (i.e. "Project X", "College Visits", "Marathon", and "Board" in this example).

As shown, the activity identifiers 308A-308D are displayed in a first section, e.g., the left side of the UI 106. UI elements (referred to herein as "topic identifiers 310" identifying the topics selected by the AI engine 112 as being associated with the activities are shown in a second section, e.g., the right side of the UI 106.

In the example shown in FIG. 3C, individual UI topic identifiers 310 are displayed, some having text descriptions and/or images of the identified topics. Topic identifiers 310 in each of the four rows correspond to activities identified by activity identifiers 308 in the same row. For instance, in the example shown in FIG. 3C, the topic identifiers 310A-310D represent topics identified by the AI engine 112 as being associated with the "Project X" activity. Similarly, the topic identifiers 310E-310G represent topics identified by the AI engine 112 as being associated with the "College Visits" activity. The topic identifiers 310H-310J represent topics identified by the AI engine 112 as being associated with the "Marathon" activity and the topic identifier 310K represents a topic identified by the AI engine 112 as being associated with the "Board" activity.

In some configurations, each displayed UI topic identifier 310 is associated with a topic having a relevance score that is calculated by the AI engine 112. It can be appreciated that the AI engine 112 can generate any type of relevancy score indicating a level of relevancy of each topic to the associated activity.

In some configurations, a display property of a UI topic identifier 310 can be modified based on the relevancy score of the associated topic. In the illustrated example, for instance, the topic identifiers 310 are sized and/or positioned according to the relevance of the one or more topics to the associated activity. As shown, the fifth topic identifier 310E for the topic "Tom Smith" may be displayed with a size, color, shading, position, ordering, or any other display property that indicates that it is associated with a topic having a higher relevancy score than the topic represented by the seventh topic identifier 310G. In one configuration, the topic identifiers 310 are ordered in each row of the configuration UI 106 shown in FIG. 3C from highest to lowest relevancy scores. In yet another example, the topic identifiers 310 are sized and/or positioned according to a volume of the user content 116 associated with the one or more topics.

The layout of the configuration UI 106 shown in FIG. 3C can also receive user input correlating a topic with an activity. In this configuration, for instance, a user 102 can utilize a user input device to drag and drop, select, or otherwise provide gestures to associate a topic with an activity. For example, when a user utilizes the mouse cursor 306 to drag the fifth topic UI identifier 310E onto the second activity identifier 308B, the topic "Tom Smith" becomes associated with the activity "college visits." Similarly, a user 102 can utilize the mouse cursor 306 to drag the eleventh topic identifier 310K onto the fourth activity identifier 308D to associate the "acquisition" topic with the "Board" activity.

As also shown in FIG. 3C, user input can also be made to the configuration UI 106 indicating that a topic is not to be associated with a particular activity. In the example shown in FIG. 3C, for instance, a user can select the eighth topic identifier 310H with the mouse cursor 306 and drag that topic identifier to the UI element 304K to indicate that the topic associated with the topic identifier 310H is not associated with the "Marathon" activity.

Upon receiving user input associating a topic with an activity or user input indicating that a topic is not associated with an activity such as that described above, the activity management application 104 can provide data describing the association or lack thereof to the AI engine 112 for use in updating the AI model 114. For example, and without limitation, scores describing the relevance of the topic represented by the topic identifier 310H might be lowered based upon the user input indicating that the topic is unrelated to the "Marathon" activity. Likewise, relevancy scores for the topics identified by the topic identifiers 310E and 310K might be increased in response to the user 102 confirming that those topics were correctly associated with the "College Visits" and "Board" activities, respectively. The activity management application 104 can also communicate and process data defining the associations (i.e. the topic/activity association data 108) between the activities and the selected topics.

In addition, the activity management application 104 can update the activity graph 120 in response to receiving user input confirming or rejecting an association between a topic and an activity. For instance, when the topic "Tom Smith" is associated with the activity of "college visits" in the manner described above, user content 116 such as a contact list entry, can be associated with the activity and other related categories of activities.

In the example configuration shown in FIG. 3C, the user 102 can select the UI element 304E to return to the layout of the configuration UI 106 shown in FIG. 3B. The user 102 can also select the UI element 304F to proceed to the layout of the configuration UI 106 shown in FIGS. 6A and 6B and described in detail below.

Figure 3D:
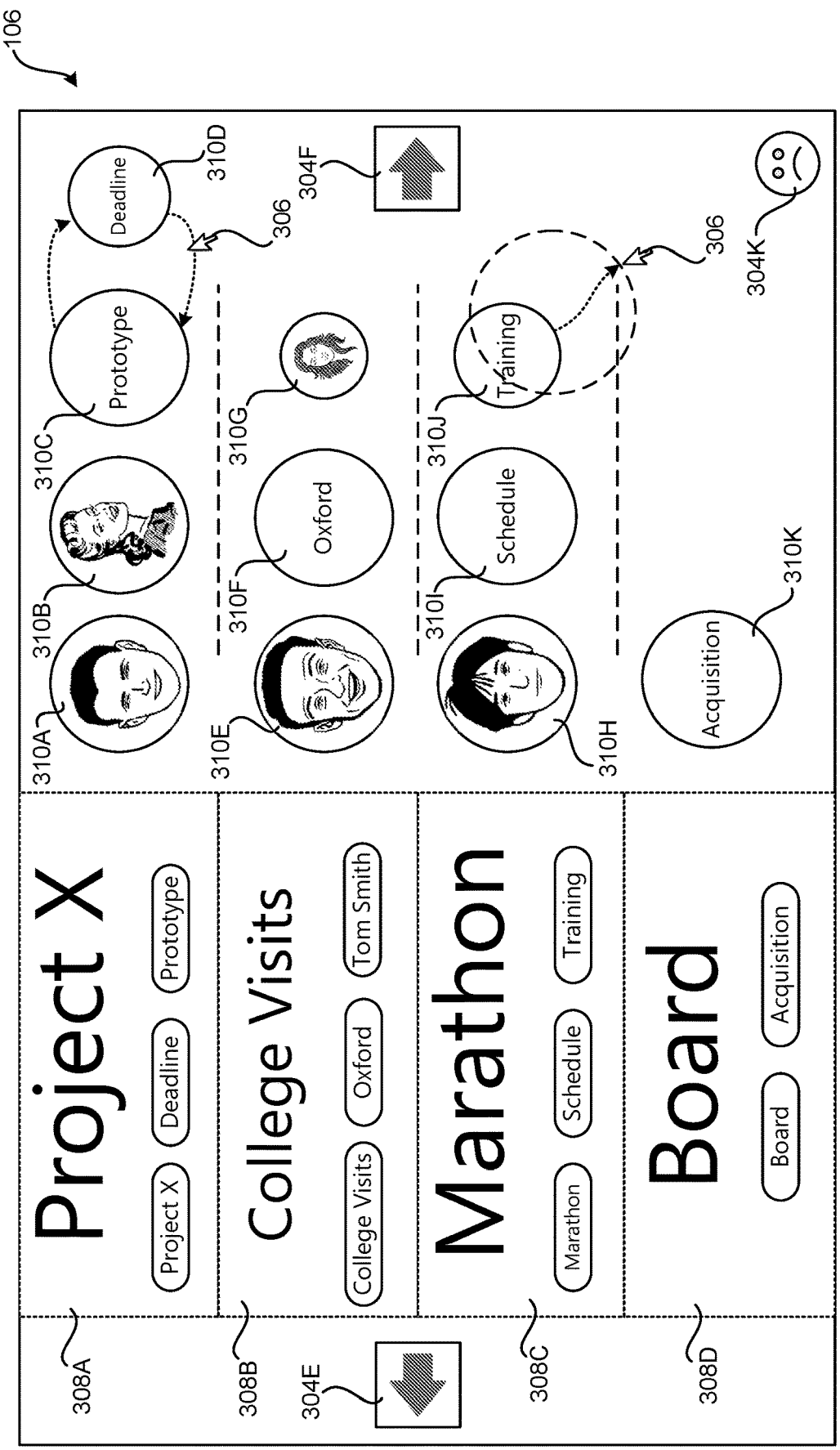
FIG. 3D is a UI diagram showing aspects of an illustrative UI that displays high-level activities along with suggested topics, the UI enabling users to provide input gestures to change a relevance of the topics for providing feedback to an AI engine.

FIG. 3D shows another example layout for the configuration UI 106 after the user 102 has entered a number of query terms 110 in the manner described above. In this example, the user 102 can provide user input to change the relevancy of topics to an associated activity. For instance, a UI element can be resized to change the relevance of a topic with respect to a particular activity. In the illustrated example, the topic identifiers 310 in each row have been ordered according to their relevance to the respective activity. In this example, user input can be provided, such as by way of the mouse cursor 306, reordering the topic identifiers 310. As shown, the user 102 has utilized the mouse cursor 306 to place the topic identifier 310D before the topic identifier 310C. As a result, the relevance of the topic "deadline" with respect to the "Project X" activity is increased and the relevance of the topic "prototype" with respect to the "Project X" activity has been decreased.

In some configurations, the activity management application 104 can also, or alternately, receive user input resizing one of the UI topic identifiers 310J. In response to receiving a user input resizing one of the UI elements, the activity management application 104 can increase the relevance of the associated topic with respect to an activity. In the example shown in FIG. 3D, for instance, the user has utilized the mouse cursor 306 to increase the size of the topic identifier 310J. As a result, the relevance of the "training" topic to the "Marathon" activity will be increased. The size of a topic identifier 310 can also be reduced in a similar manner in order to reduce the relevancy of the associated topic with respect to an activity.

As in the examples given above, data describing user input modifying the relevance of a topic with respect to an activity can be provided to the AI engine 112. The AI engine 112 can use this data to update the AI model 114 to improve the calculation of relevancy scores for topics in the future.

As in the example configuration shown in FIG. 3C, the user 102 can select the UI element 304E shown in FIG. 3D to return to the layout of the configuration UI 106 shown in FIG. 3B. The user 102 can also select the UI element 304F shown in FIG. 3D to proceed to the layout of the configuration UI 106 shown in FIGS. 6A and 6B and described in detail below.

Figure 3E:
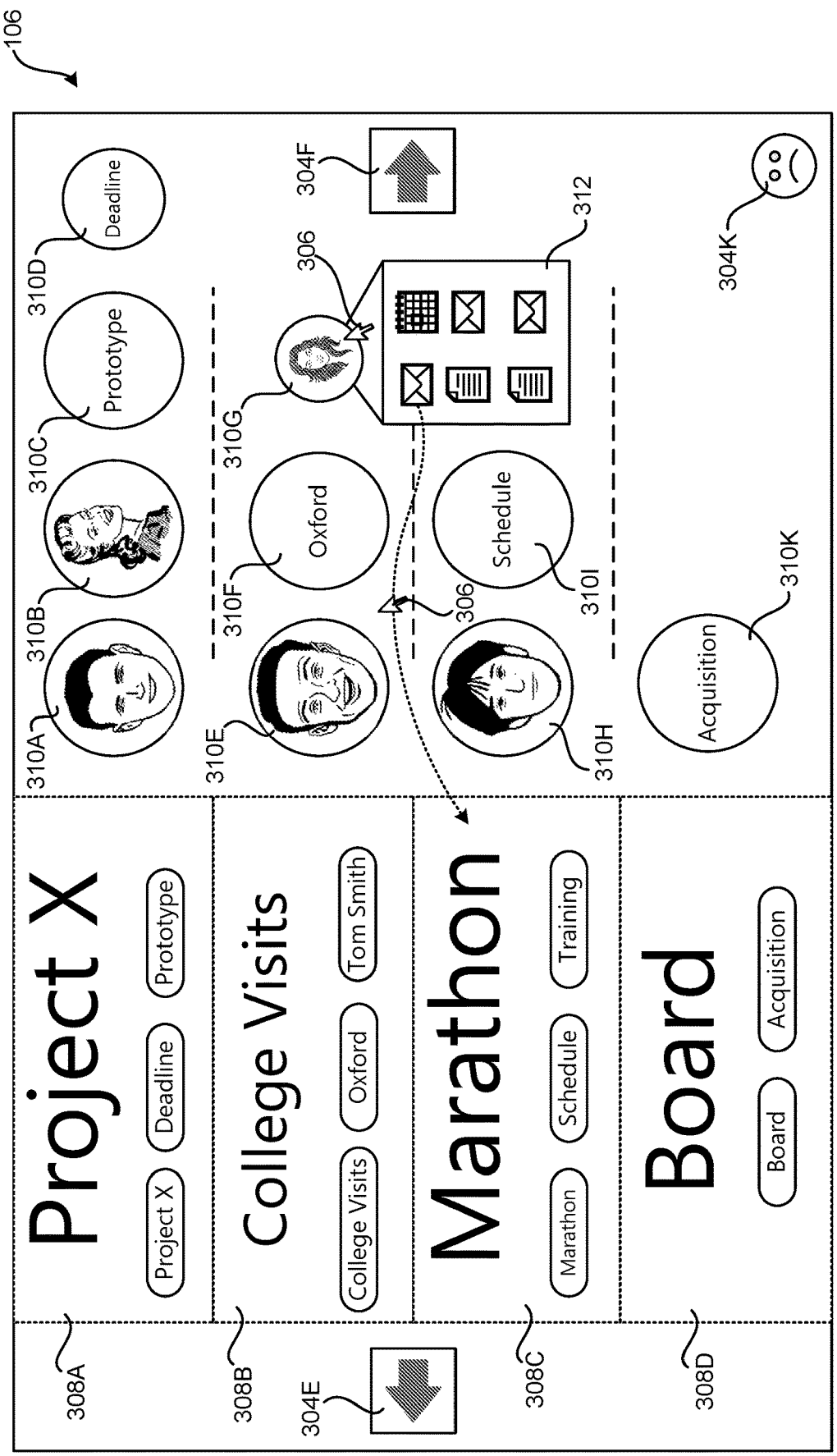
FIG. 3E is a UI diagram showing aspects of an illustrative UI that displays high-level activities along with low-level content associated with individual topics, the UI enabling users to provide input gestures to change a relevance of low-level content for providing feedback to the AI engine.

FIG. 3E shows another example layout for the configuration UI 106 after the user 102 has entered a number of query terms 110 in the manner described above. In the example shown in FIG. 3E, a user 102 can view the instances of user content 116 that resulted in a topic being associated with an activity. For instance, in the illustrated configuration, the user 102 has selected the topic identifier 310G using the mouse cursor 306 (e.g. a right-click). In response thereto, the configuration UI 106 has presented a UI element 312 that includes icons corresponding to the instances of user content 116 that resulted in the topic represented by the topic identifier 310G being associated with the "College Visits" activity.

In the configuration shown in FIG. 3E, the user 102 can also select one of the icons, such as with the mouse cursor 306, and drag the icon to an activity identifier 308 in order to indicate that the document represented by the icon is associated with the activity represented by the activity identifier 308. In the example shown in FIG. 3E, for instance, the user 102 has dragged an icon corresponding to an email message to the activity indicator 308C to indicate that the email is related to the "Marathon" activity rather than to the "College Visits" activity with which it was originally associated. Alternately, the user 102 might drag an icon corresponding to a document to the UI element 304K to indicate that the corresponding document is not related to the topic or activity with which it was originally associated.

As in the examples described above, data describing user input associating a document with an activity or indicating that a document is not associated with an activity in the manner shown in FIG. 3E can also be provided to the AI engine 112. The AI engine 112 can then use this data to update the AI model 114 to improve the manner in which it clusters documents to identify topics relating to an activity in the future.

As in the example configurations shown in FIGS. 3C and 3D, the user 102 can select the UI element 304E shown in FIG. 3E to return to the layout of the configuration UI 106 shown in FIG. 3B. The user 102 can also select the UI element 304F shown in FIG. 3E to proceed to the layout of the configuration UI 106 shown in FIGS. 6A and 6B and described in detail below.

It is to be appreciated that the various layouts of the configuration UI 106 shown in FIGS. 3A-3E (and the layouts of the other UIs disclosed herein) are provided for illustrative purposes and are not be construed as limiting. Any UI displaying high-level activities along with suggested topics can be utilized with the techniques disclosed herein. It can be appreciated that the topics can be displayed in any type of UI or communicated to a user 102 using other mediums such as an audio output indicating one or more topics, a head-mounted display ("HMD") virtual environment having virtual objects identifying the topics, etc.

FIG. 4 is a flow diagram illustrating aspects of a routine 400 for providing an association between low-level content and high-level activities using topics as an abstraction. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 400 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 402 where a computing module, such as the activity management application 104, receives content (i.e. the user content 116) associated with a user 102 from one or more data sources 118. As described above, the user content 116 can be any type of data in any suitable format. For instance, user content 116 can include, but is not limited to, images, emails, messages, documents, spreadsheets, contact lists, individual contacts, social networking data, or any other type of data.

The data sources 118 can include any type of storage device or service suitable for storing user content 116. For instance, a data source 118 can include, but is not limited to, an email server, email application, network drive, storage service, an individual computing device such as a tablet or a phone. The system 100 can receive the user content 116 using a push model, a query model, or any other suitable means for communicating user content 116 to a suitable computing module such as the activity management application 104.

From operation 402, the routine 400 proceeds to operation 404, where the computing module can receive a query term 110 identifying an activity. As discussed above, the user 102 can provide the query term 110 using any type of user input via any suitable hardware. For instance, the configuration UI 106 shown in FIG. 3A can be displayed prompting a user 102 to enter text defining a query term 110, e.g., a string of text. In response to receiving an input from the user 102, the query term 110 can be communicated to the computing module. Any other suitable hardware and method for receiving a query term 110 can be utilized in operation 404. For instance, a microphone in communication with the computing module can capture the voice of the user 102. The captured voice can be translated into data defining the query term 110. Other types of user gestures and other forms of input can be utilized at operation 404 to receive the query term 110.

From operation 404, the routine 400 proceeds to operation 406, where the AI engine 112 identifies topics associated with the supplied query term 110. In some configurations, the AI engine 112 can identify topics associated with the query term based on the user content 116 and/or other data. In one illustrative example, a query can include a phrase describing an activity such as "run a marathon". Based on that input, the AI engine 112 can analyze the user content 116 for items that are related to the received word or phrase. For instance, emails, contact list items (e.g., people), calendar events, or other data containing the words "running," "26.2," "training," or other related words or phrases can be identified by the AI engine 112. Topics can be selected based on the context of any user content 116 analyzed by the AI engine 112.

Operation 406 can also involve the generation of one or more activity graphs 120. A rendering of an illustrative activity graph 120 is shown in FIG. 2. As described herein, the activity graph 120 can define a hierarchy between topics, activities and user content 116. In addition, the activity graph 120 can define one or more clusters 206 of user content 116, activities, and topics.

At operation 408, the activity management application 104 can cause one or more computing devices to render topic identifiers 310 identifying the topics. An example of one UI 106 having multiple topic identifiers 310 is shown in FIG. 3C. In the example of FIG. 3C, individual topic identifiers 310 are displayed, some having text descriptions and/or images of the associated topics. The example shown in FIG. 3C is provided for illustrative purposes and is not to be construed as limiting. It can be appreciated that the topics can be displayed in any type of UI or communicated to the user 102 using other mediums such as an audio output indicating one or more topics, an HMD virtual environment having virtual objects indicating the topics, etc.

From operation 408, the routine 400 proceeds to operation 410, where the activity management application 104 can cause one or more computing devices to render activity identifiers 308 identifying the activities identified by the user-supplied query terms 110. An example of one UI 106 having activity identifiers 310 identifying several activities is shown in FIG. 3C.

At operation 412, the activity management application 104 receives user input correlating a first UI element (e.g. a topic identifier 310) with a second UI element (e.g. an activity identifier 308). Operation 412 can involve user interaction with the UI of FIG. 3C, for example, where a user 102 can drag and drop, select, or otherwise provide gestures to correlate a topic to an activity.

From operation 412, the routine 400 proceeds to operation 414, where the activity management application 104 can associate individual activities in response to the user input described above with respect to operation 412. For instance, when a user 102 correlates the fifth topic identifier 310E with the second activity UI identifier 308B, the topic "Tom Smith" becomes associated with the activity "College Visits."

The routine 400 then continues to operation 416, where the activity management application 104 can provide data describing the association of the topic identified by the selected first UI element (e.g. the topic identifier 310) with the activity identified by the second UI element (e.g. the activity identifier 308) to the AI engine 112 for updating the AI model 114 used by the AI engine 112 to identify the topics associated with the activity. Operation 416 can include the communication and processing of association data 108, which indicates an association between an activity and one or more topics.

At operation 418, the activity management application 104 can update the activity graph 120 in response to receiving association data 108. For instance, when the topic defining a contact "Tom Smith" is associated with the activity of "College Visits," user content 116 such as a contact list entry, can be associated with the activity and other related categories of activities. Upon the conclusion of operation 418 the routine 400 can terminate at operation 420.

Figure 5:
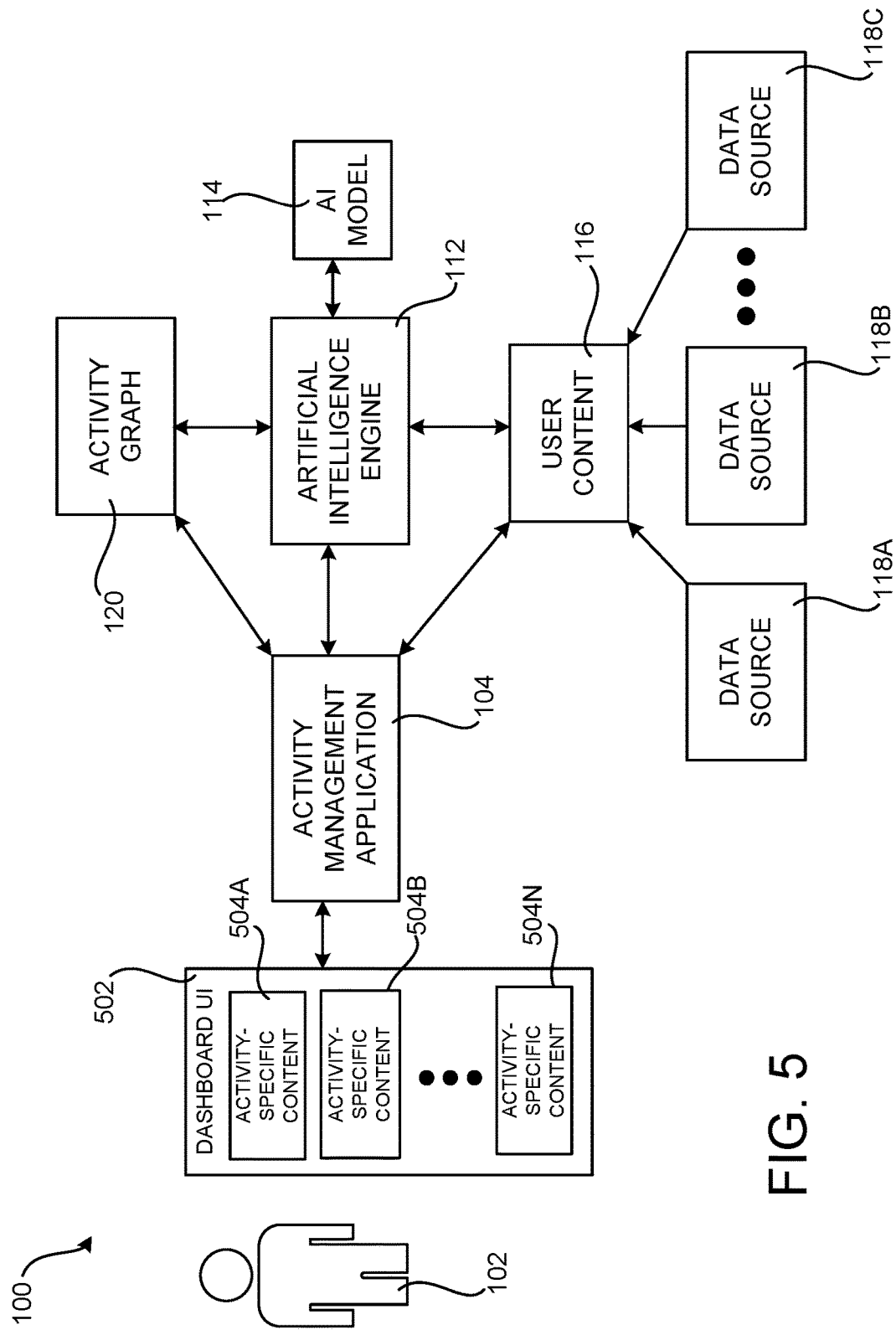
FIG. 5 is a computing system diagram illustrating aspects of an operating environment for the technologies disclosed herein along with aspects of an illustrative HCI that enables computationally efficient processing of activity-specific content in activity-specific views.

AI-Driven Human-Computer Interface for Presenting Activity-Specific Views of Activity-Specific Content for Multiple Activities Referring now to FIG. 5, other aspects of the technologies disclosed herein will be described. In particular, FIG. 5 is a computing system diagram illustrating aspects of the system 100 for enabling computationally efficient processing of activity-specific content 504 in activity-specific views. As discussed above, the system 100 can include an activity management application 104 and an AI engine 112. As also discussed above in detail with regard to FIGS. 1-4, query terms 110 (not shown in FIG. 5), user content 116, and the AI model 114 can be utilized to generate an activity graph 120 for one or more activities, such as that illustrated in FIG. 2.

Once the activity graph 120 has been generated for at least one activity, it can be utilized to identify relevant activity-specific content 504 relating to a particular activity. In some configurations, the AI engine 112 can generate relevancy scores for individual instances of user content 116. The AI engine 112 can identify relevant activity-specific content 504 from the user content 116 for an activity when an individual instance of user content 116 (such as an email, contact, document, image, etc.) has a relevancy score that meets or exceeds a threshold. This analysis can also involve the analysis of the activity graph 120, which can increase the relevancy score of a particular instance of user content 116 with respect to a particular activity if the activity graph 120 indicates that the particular instance of user content 116 and a particular activity are in the same cluster 206 (e.g. the cluster shown in FIG. 2).

Once instances of user content 116 have been associated with activities and relevancy scores have been computed, the activity management application 104 can identify and display select portions of the user content 116 that is relevant to a user 102 in customized views that are configured and arranged based on an analysis of the user content 116, the activity graph 120, and/or the AI model 114. The customized views are referred to herein as "activity-specific views," each of which displays activity-specific content 504A-504N in a layout having display properties that are easy to use and contextually relevant to a user's current situation. The activity-specific views showing the activity-specific content 504A-504N can be presented in a "dashboard UI" 502, which includes activity-specific views for a multitude of activities.

In some configurations, the AI engine 112 can identify relevant activity-specific content 504 relating to an activity from the user content 116 based on an activity specified by a user and an analysis of the user content 116 associated with the user. For example, if a select group of people and specific calendar events have a higher relevancy score than documents or other people, an activity-specific view may be configured to display that select group of people and specific calendar events rather than the documents and other people. In addition, depending on the relevancy score for each instance of user content 116, individuals of the group of people or the specific calendar events may be arranged in a particular order. In addition, depending on the relevancy score for each item, a graphical emphasis may be applied to UI elements identifying the individuals if they have a threshold relevancy score.

In some configurations, an activity-specific view of activity-specific content 504 can include at least one UI element for initiating an action with respect to the relevant activity-specific content 504. For instance, a user may select a particular calendar event to view more detailed information, or the user may remove the display of the calendar event. Based on such user interactions and other interactions with the relevant activity-specific content 504, the AI engine 112 may adjust relevancy scores for such relevant activity-specific content 504 and other instances of user content 116. Thus, any type of input or interaction with an activity-specific view may change the AI model 114, a modification that enables the system 100 to fine tune the decisions it makes on its selection of data and/or arrangement of data with each interaction.

The activity-specific views might also be modified based on a context of the user 102 or the user's current situation. For example, when a user-specified activity is related to a number of calendar events, people, and files, a customized view of the activity may change and show different types of user content 116 based on the day or time that the activity is viewed. In such an example, calendar events may be displayed to a user several weeks before an event, but UI elements identifying people attending the event may be displayed several hours before the event The examples shown in FIGS. 6A and 6B illustrate several aspects of the dashboard UI 502, which is configured to display activity-specific views that include activity-specific content 504 related to activities. As discussed above, a user 102 can select the UI element 304F shown in FIGS. 3C-3E to view the dashboard UI 502 described below with regard to FIGS. 6A and 6B.

FIG. 6A is a UI diagram showing aspects of an illustrative dashboard UI 502 for displaying activity-specific views 602 of activity-specific content 504. In general, the dashboard UI 502 includes one or more activity-specific views 602, where each activity-specific view 602 includes UI elements displaying activity-specific content 504. In the example shown in FIGS. 6A and 6B, the dashboard UI 502 presents activity-specific content for four activities: "Project X"; "College Visits"; "Marathon"; and "Board."

As shown in FIG. 5A, the dashboard UI 502 can initially show activity-specific views (e.g. three activity-specific views 602A-602C in the example shown in FIG. 6A) for one or more activities. In response to user input, such as scrolling with a mouse or a swipe touch gesture, the dashboard UI 502 can show additional activity-specific views 602 (e.g. the activity-specific view 602D in the example shown in FIG. 6B). The dashboard UI 502 can also include one or more UI elements, such as the UI element 304K, which when selected will return to the UI shown in FIG. 3B. The dashboard UI 502 can include other UI elements not specifically identified herein.

As discussed briefly above, the activity-specific views 602 shown in the dashboard UI 502 include relevant activity-specific content 504 related to each of a user's activities. In the example shown in FIG. 6A, for instance, the first activity-specific view 602A for the "Project X" activity comprises a task, labeled as "Deadline," and an "Upcoming Appointment," and lists relevant details of the appointment as "Code Review in Bill's Office, Friday at 3:30 PM."

The second activity-specific view 602B for the "College Visits" activity comprises an event labeled as "Next Event" and lists several relevant details such as "Travel to Oxford England Monday at 9 AM" and a representation of a contact relevant to the college visit, identified in the FIG. as "FIRST PERSON."

The third activity-specific view 602C for the "Marathon" activity can include relevant activity-specific content 504 relating to a marathon that meets a relevancy threshold, as determined by the AI engine 112. For instance, in the illustrated example, the activity-specific content 504 in the activity-specific view 602C includes an "Upcoming Appointment" and lists several relevant details, such as "Dr. Yu's office for Physical Therapy Thursday at 2 PM," and a representation of a contact relevant to the marathon activity, identified in the FIG. as "SECOND PERSON."

It is to be appreciated that the dashboard UI 502 can include UI elements 304 for performing functionality not explicitly shown in FIGS. 6A and 6B. For example, UI elements 304 in the dashboard UI 502 can enable users to control the amount and type of information that is displayed within each activity-specific view 602. UI elements 304 can also be provided for initiating actions with respect to the relevant activity-specific content 504. In one specific example, a user 102 can provide an input to a UI element causing a graphical element displaying an activity to remove the display of related activity-specific content 504. This enables users to continually view activities in the dashboard UI 502, while empowering the users to readily cause the display to adapt based on the focus of the user. In addition, the AI engine 112 can use such an input to modify the AI model 114, which in turn tunes the ability of the system 100 to select, display or arrange the relevant activity-specific content 504 in a more accurate manner.

FIG. 7 is a flow diagram illustrating aspects of a routine 700 for generating a UI, such as the dashboard UI 502, for presenting activity-specific content 504 in activity-specific views 602. The routine 700 begins at operation 702 where the AI engine 112 identifies relevant activity-specific content 504 related to a first activity. One illustrative example of a first activity involves the "College Visits" activity, as shown in FIG. 6A and FIG. 6B. The relevant activity-specific content 504 can include any portion of the user content 116 that meets a relevancy threshold as determined by the AI engine 112. One example of activity-specific content 504 includes the "Next Event" content indicating "Travel to Oxford England Monday at 9 AM," and a representation of a related contact, identified in the FIG. as "FIRST PERSON."

From operation 702, the routine 700 proceeds to operation 704, where the AI engine 112 identifies relevant activity-specific content 504 related to a second activity. In the example shown in FIGS. 6A and 6B, a second activity is the "Marathon" activity. The relevant activity-specific content 504 for the "Marathon" activity may include any portion of user content 116 that meets a relevancy threshold as determined by the AI engine 112. In this example, activity-specific content 504 includes an "Upcoming Appointment" indicating "Dr. Yu's office for Physical Therapy Thursday at 2 PM," and a representation of a related contact, identified in the FIG. as "SECOND PERSON."

From operation 704, the routine 700 proceeds to operation 706, where the activity management application 104 renders a UI element presenting an activity-specific view of the relevant activity-specific content 504 for the first activity. In the present example involving the first activity, "College Visits," the activity-specific view may comprise one or more UI elements presenting a calendar event labeled as "Next Event" indicating "Travel to Oxford England Monday at 9 AM," and a representation of a relevant contact, identified as "FIRST PERSON."

The routine 700 proceeds from operation 706 to operation 708, where the activity management application 104 renders a UI element presenting an activity-specific view of the relevant activity-specific content for the second activity. In the present example involving the second activity, "Marathon," the activity-specific view may include UI elements presenting a calendar event labeled as "Upcoming Appointment" indicating "Dr. Yu's office for Physical Therapy Thursday at 2 PM," and a representation of a relevant contact, identified in the FIG. as "SECOND PERSON."

From operation 708, the routine 700 proceeds to operation 710, where the activity management application 104 enables interactions with the UI elements of the activity-specific views 602. To enable aspects of operation 710, the activity management application 104 can configure at least one of the activity-specific views 602 with a selectable element, such as a button, that can cause the display of an interactive activity-specific UI. In some configurations, a user 102 can select an activity-specific view 602 using a mouse cursor 306 or another type of appropriate input to view the interactive activity-specific UI for the activity represented by the selected activity-specific view 602.

As will be described below with respect to FIGS. 8-9D, an interactive activity-specific UI displays activity-specific content in a format and layout that is contextually relevant to a user's current situation. By modifying display properties and arranging a layout of activity-specific content 504 based on a level of relevancy to a particular activity, the most relevant information to a user can be displayed to the user at a particular time. In addition, the interactive activity-specific UI described below allows a user 102 to interact with the activity-specific content 504 in various ways.

At operation 712, the activity management application 104 monitors one or more selectable UI elements 304 to identify a user input indicating a command to show an interactive activity-specific UI. At operation 712, if the user 102 does not provide an input requesting to view the interactive activity-specific UI for an activity, the routine 700 returns to operation 710. However, if the user 102 provides an input indicating a command to show an activity-specific UI, the routine 700 proceeds to operation 714 where the activity management application 104 presents an interactive activity-specific UI that allows for interaction with activity-specific content 504. Details regarding one illustrative interactive activity-specific UI will be described in detail below with regard to FIGS. 8-10. Upon the conclusion of operation 714, the routine 700 can terminates at operation 716.

Figure 8:
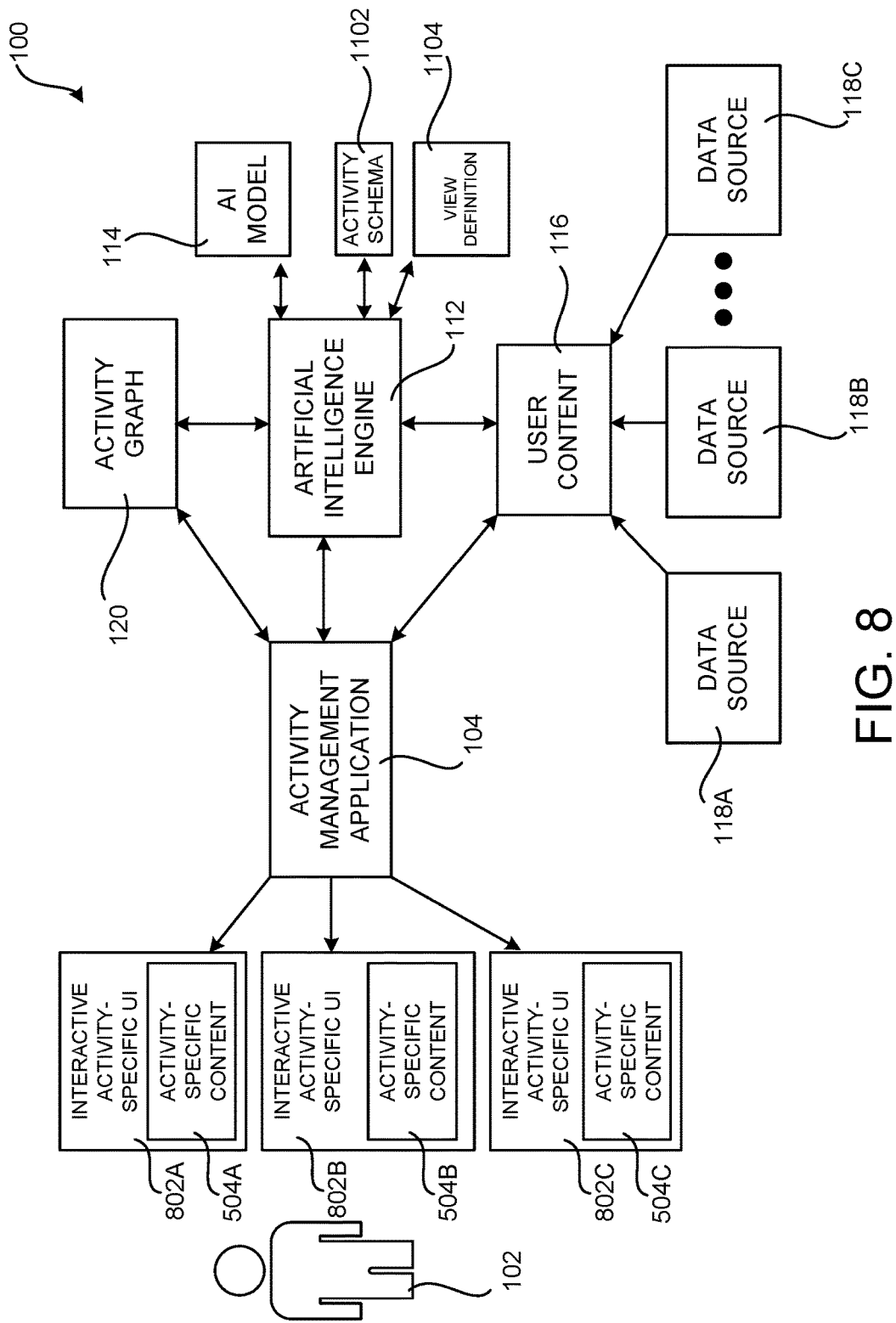
FIG. 8 is a computing system diagram illustrating aspects of an operating environment that enables computationally efficient generation of an activity-specific UI for presenting and interacting with activity-specific content.

AI-Synthesized Application for Presenting Activity-Specific UI of Activity-Specific Content FIG. 8 is a computing system diagram illustrating aspects of an operating environment 100 that enables computationally efficient generation of interactive activity-specific UIs 802A-802C (which might also be referred to herein as "activity-specific UIs" or an "activity-specific UI") for presenting activity-specific content 504A-504C and enabling users to act on the activity-specific content 504A-504C. Generally described, the AI engine 112 utilizes the AI model 114, user content 116 from one or more data sources 118, and other data to select an activity schema 1102 for a particular activity. The activity schema 1102 identifies one or more data sources 118 for obtaining the activity-specific content 504 based on topics associated with the activity. The activity schema 1102 can also include other types of data used to construct interactive activity-specific UIs 802, some of which will be described in detail below. In a similar manner, the AI engine 112 can also select a view definition 1104, which contains data for use in presenting the interactive activity-specific UI 802 for the activity. In particular, the view definition 1104 defines a visual arrangement for UI elements of an interactive activity-specific UI 804 containing relevant activity-specific content 504 obtained from the plurality of data sources 118 that are identified by the activity schema 1102.

As discussed briefly above, the activity-specific UI 802 is configured to enable a user 102 to view and interact with relevant activity-specific content 504. In response to user interaction with the activity-specific content 504, the AI engine 112 can update the AI model 114 for improving the selection of activity schema 1102 and view definitions 1104 in the future. Additional details regarding this process will be provided below.

FIG. 9A is a UI diagram showing aspects of one example of an interactive activity-specific UI 802 for presenting and interacting with activity-specific content 504. Generally described, the activity-specific UI 802 includes activity-specific UI elements 804 (which might also be referred to herein as "elements 804"), each comprising portions of activity-specific content 504 for an activity. In this example, the activity-specific UI 802 shows data identifying the represented activity, e.g., "Project X". The activity-specific UI 802 also includes a UI element 804A that displays a calendar event indicating a code review at a particular time, a second UI element 804B showing another calendar event indicating a meeting at a particular time, and a third UI element 804C displays a selected portion of a document.

The illustrative activity-specific UI 802 also includes a fourth element 804D, which illustrates a graphic representing two people relevant to the activity. UI elements can be presented that display other forms of information with respect to a person related to an activity, such as a name, address, or any other identifier. The illustrative activity-specific UI 802 also includes other UI elements 804E-804H that identify documents that are relevant to the "Project X" activity: a MICROSOFT POWERPOINT slide, a document, an image file, and an email.

As described above, the individual UI elements 804 in the interactive activity-specific UI 802 can be configured for user interaction. For instance, if a user 102 selects an individual UI element 804, the activity-specific UI 802 may transition to a view showing the activity-specific content 504 related to the selected element 804. Other types of user interactions can also be enabled.

As also described briefly above, the AI engine 112 can select portions of activity-specific content 504 to be displayed by each of the activity-specific UI elements 504 (not shown in FIG. 9A). For example, the AI engine 112 may determine, based on the context of a document, a most relevant portion of the document to be presented by the activity-specific UI element 804C. Data defining a user's interactions with the interactive activity-specific UI 802 can also be provided to and processed by the AI engine 112 to update the AI model 114. In this way, the AI model 114 can be updated to improve its future performance in the selection of the activity-specific content 504 that is shown in the interactive activity-specific UI 802 for an activity.

Figure 9B:
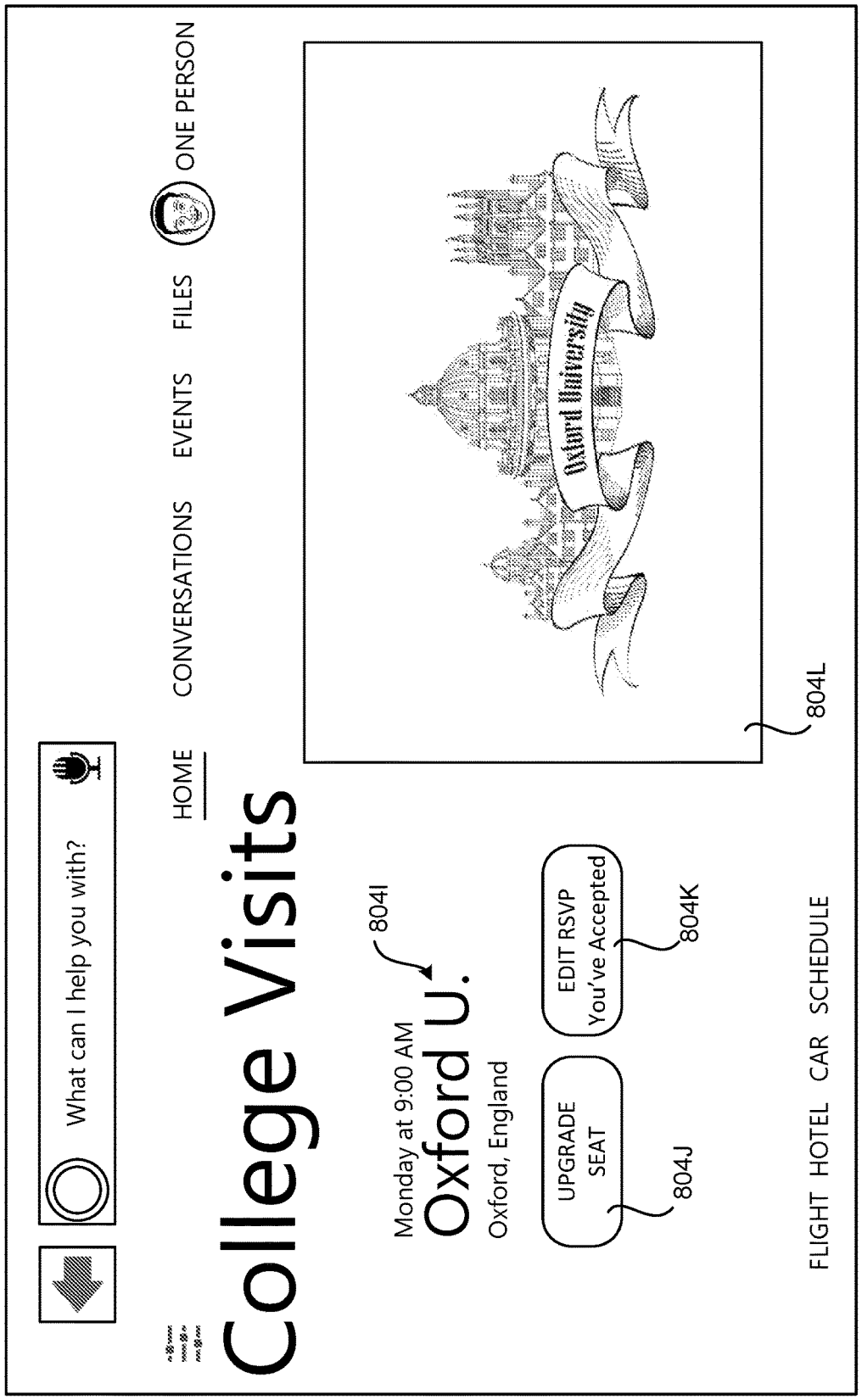
FIG. 9B is a UI diagram showing aspects of an illustrative example of an interactive activity-specific UI for presenting and interacting with activity-specific content, such as image data.

FIG. 9B is a UI diagram showing aspects of another illustrative example of an interactive activity-specific UI 802 for presenting and interacting with activity-specific content 504, such as image data. In this example, the activity-specific UI 802 includes data identifying the activity, e.g., College Visits. The activity-specific UI 802 also includes a UI element 804I that displays aspects of a calendar event indicating a meeting at Oxford University at a particular time and a particular location.

The illustrative activity-specific UI 802 shown in FIG. 9B also includes a UI element 804J and a UI element 804K, both of which are UI elements configured to receive user input. In this example, the UI element 804J and the UI element 804K, respectively, are configured to initiate a request for an airline seat upgrade and to generate an RSVP to a meeting in response to user input.

In this example, the AI engine 112 has also selected the display of a UI element 804L, which displays an image that was identified as being relevant activity-specific content 504 for the "College Visits" activity. This example illustrates that the activity-specific UI elements 804 selected by the AI engine 112 can present a wide variety of activity-specific content 504 and can include selectable controls for initiating additional functionality such as requests, queries, etc.

Figure 9C:
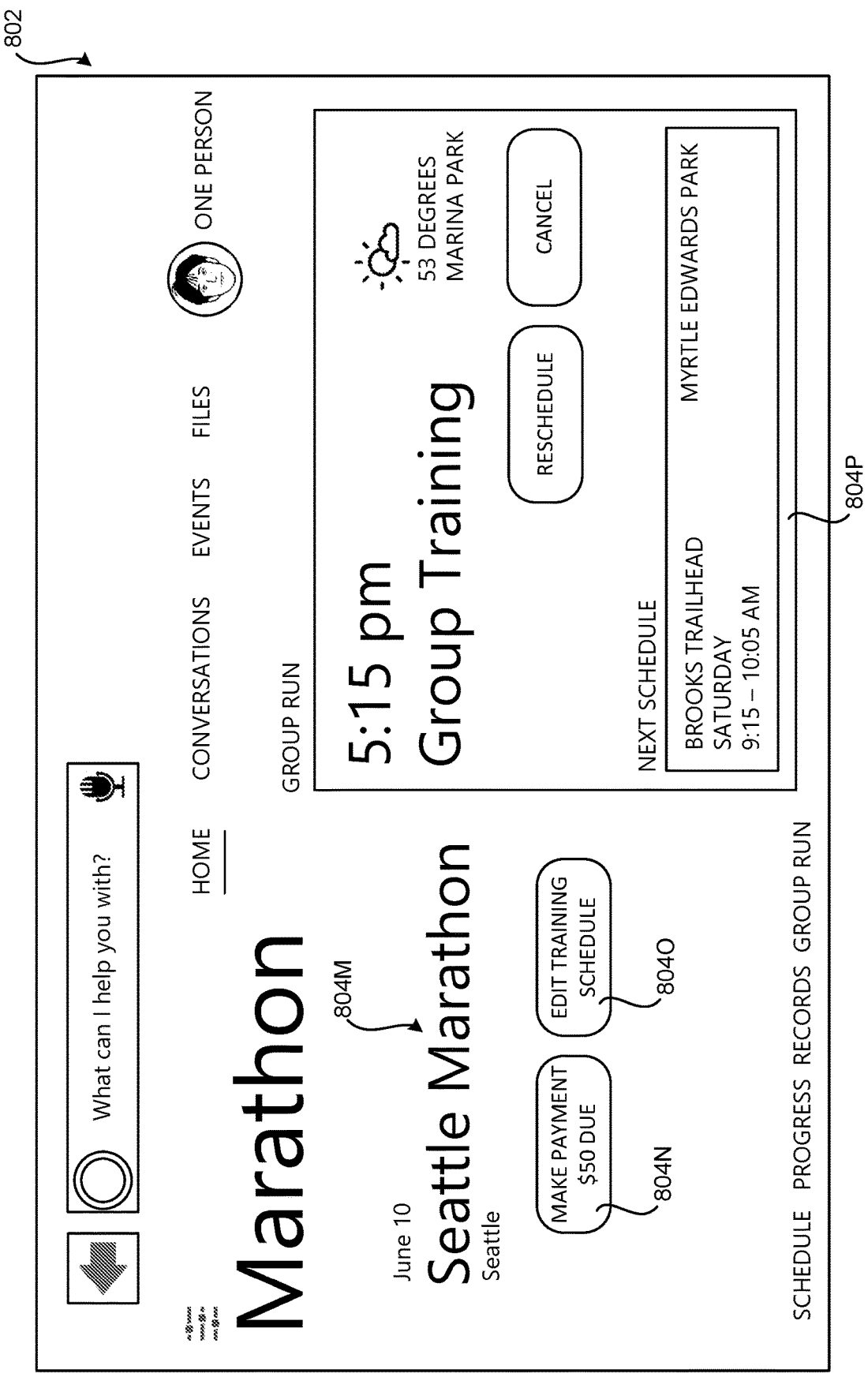
FIG. 9C is a UI diagram showing aspects of another illustrative example of an interactive activity-specific UI for presenting activity-specific content in a format that brings emphasis to particular aspects of the activity-specific content.

FIG. 9C is a UI diagram showing aspects of another illustrative example of an interactive activity-specific UI 802 for presenting activity-specific content 504 in a format that brings emphasis to particular aspects of the activity-specific content 504. In this example, the activity-specific UI 802 identifies the activity, e.g., a Marathon. The activity-specific UI 802 also includes a UI element 804M that displays aspects of a calendar event for the activity (i.e. that the marathon will take place on June 10th in Seattle).

The activity-specific UI 802 shown in FIG. 9C also includes a UI element 804N and a UI element 804O, both of which are UI elements configured for receiving user input. In this example, the element 804N and the element 804O are respectively configured to (1) initiate a payment process for the activity (i.e. the marathon) and (2) open a UI for editing a training schedule for the activity. In this example, the AI engine 112 has also selected the display of a UI element 804P that displays aspects of an upcoming activity and also provides UI elements, i.e., the "Reschedule" button and the "Cancel" button to invoke further actions related to the activity. Other aspects of the activity selected by the AI engine 112 are displayed, such as an event relating to the activity (i.e. a training run in Myrtle Edwards Park in this example).

Figure 9D:
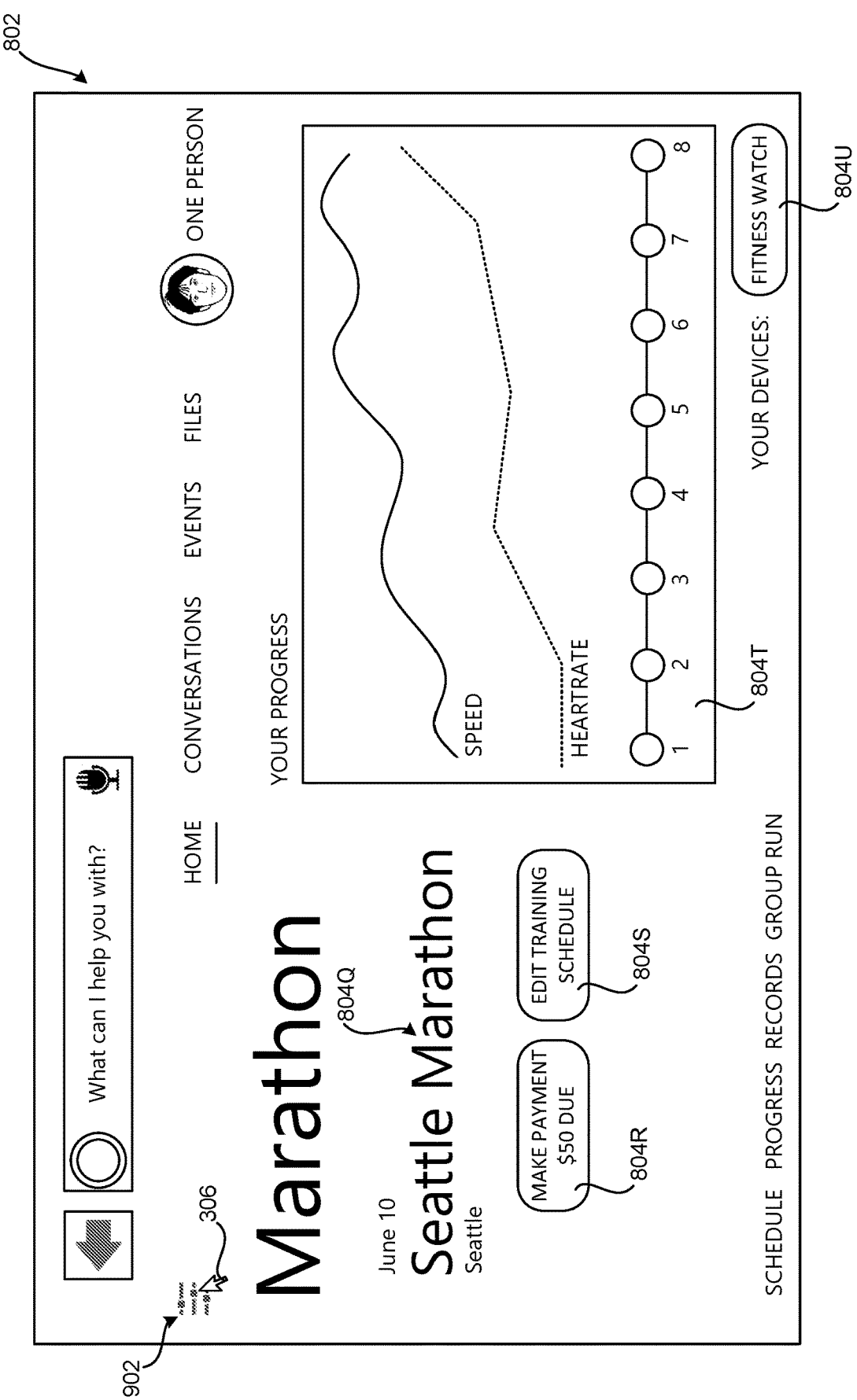
FIG. 9D is a UI diagram showing aspects of an illustrative example of an interactive activity-specific UI for presenting activity-specific content in a format that shows a different perspective of the activity-specific content.

FIG. 9D is a UI diagram showing aspects of another illustrative example of an interactive activity-specific UI 802 for presenting activity-specific content 504 in a format that shows a different perspective of the activity-specific content 504. In this example, the AI engine 112 can analyze the activity-specific content 504 to identify a format for presenting a file or dataset. For instance, if the activity-specific content 504 is a spreadsheet of performance data relating to a marathon, the spreadsheet may be analyzed to generate one or more graphs showing data relating to marathon training.

As shown in FIG. 9D, the activity-specific UI 802 includes data identifying an activity, e.g., Marathon. In addition, the activity-specific UI 802 shown in FIG. 9D includes a UI element 804Q that displays aspects of a calendar event indicating a specific event (i.e. the Seattle Marathon). In addition, the activity-specific UI 802 shown in FIG. 9D includes a UI element 804N and a UI element 804O, both of which are UI elements configured for receiving user input. In this example, the element 804N and the element 804O, respectively, are configured to initiate a payment process for the activity, and to open a UI for editing a training schedule associated with the activity.

As also shown in FIG. 9D, the interactive activity-specific UI 802 can also include a settings UI element 902. When user input is received selecting the settings UI element 902, a UI can be presented for modifying settings relating to the activity shown in the interactive activity-specific UI 802. For example, a UI might be presented through which a user 102 can select a different activity schema 1102 or view definition 1104 utilized to create the interactivity activity-specific UI 802. The UI might also provide functionality for enabling a user 102 to edit the activity schema 1102 and/or the view definition 1104. One example of such a UI is described in detail below with regard to FIGS. 13-16.

Figure 10:
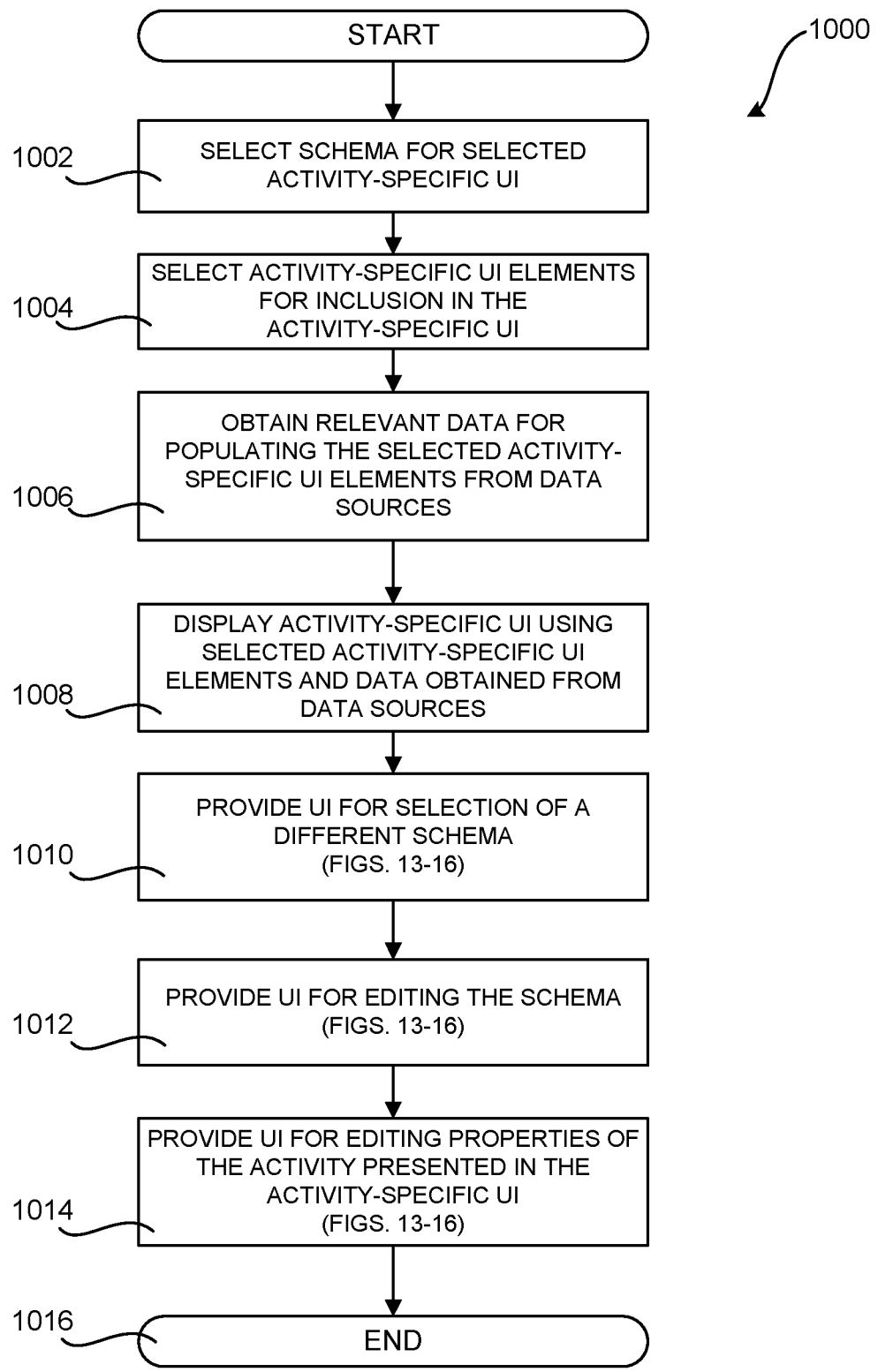
FIG. 10 is a flow diagram illustrating aspects of a routine for generating a UI for presenting activity-specific content in activity-specific views for presenting and acting on activity-specific content.

FIG. 10 is a flow diagram illustrating aspects of a routine 1000 for generating an interactive activity-specific UI 802 for presenting and enabling users 102 to interact with activity-specific content 504. The routine 1000 begins at operation 1002, where the AI engine 112 can select an activity schema 1102 for use in generating an activity-specific UI 802. The AI engine 112 can select an activity schema 1102 based on an analysis of the activity-specific content 504 for an activity (e.g. activity-specific content 504, user content 116, and other data for a "Marathon" activity).

From operation 1002, the routine 1000 proceeds to operation 1004, where the AI engine 112 can select activity-specific UI elements 804 for inclusion in the activity-specific UI 802. As described herein, the AI engine 112 can analyze a datastore having one or more activity schemas 1102 and select at least one schema 1102 based on the activity and/or topic. The selected schemas 1102 can include definitions for the activity-specific UI elements 804 and layout properties for each activity-specific UI element 804.

From operation 1004, the routine 1000 proceeds to operation 1006, where the AI engine 112 can obtain relevant activity-specific content for populating the selected activity-specific UI elements 804 from one or more data sources 118. For illustrative purposes, "relevant activity-specific content" is referred to herein as user content 116 that has been selected by the AI engine 112 for inclusion in one or more views and/or UIs. The AI engine 112 can utilize the AI model 114, the user content 116, the activity graph 120, and potentially other data to identify the selected portions of the user content 116 as relevant activity-specific content 504. The relevant activity-specific content 504 can be selected based on relevancy scores for the instances of user content 116.

From operation 1006, the routine 1000 proceeds to operation 1008, where the activity management application 104 can display one or more activity-specific UIs 802 using selected activity-specific UI elements 504 and the relevant activity-specific content 504. The display is generated based upon the activity schema 1102 and the view definition 1104 selected by the AI engine 112.

The routine 1000 then proceeds to operation 1010, where the activity management application 104 can provide a UI for selection of a different activity schema 1102 for an activity. As described herein, although the AI engine 112 can select an activity schema 1102 for a specific activity, a user 102 can select a different schema for the activity. The newly selected schema can define layout options for UI elements and provide an indication of the relevant activity-specific content 504 and/or the data sources 118 that are selected for obtaining the relevant activity-specific content 504. When a user 102 selects a new activity schema 1102, the AI engine 112 may update relevancy scores in the AI model 114 to improve the accuracy of the system 100 in selecting an activity schema 1102 for an activity in the future. Examples of a UI and a process for selecting a different activity schema 1102 is described below with reference to FIGS. 13-16.

From operation 1010, the routine 1000 proceeds to operation 1012, where the activity management application 104 can provide a UI for editing the activity schema 1102 and/or a view definition 1104 for an activity. The UI for editing the activity schema 1102 and the view definition 1104 can enable the user 102 to add, remove, or modify the selected activity-specific UI elements 504, the layout for the UI elements, and display properties of the selected activity-specific UI elements 504. The UI for editing the activity schema 1102 can enable a user 102 to add, remove, or modify the relevant activity-specific content 504. In addition, the UI for editing the activity schema 1102 can enable a user 102 to add, remove, or modify the data sources 116 from which the activity-specific content 504 shown in the activity-specific UI 802 is obtained. When the activity schema 1102 or the view definition 1104 is modified in this manner, the AI engine 112 may update relevancy scores in the AI model 114 to improve the accuracy of the system 100 in selecting an activity schema 1102 and a view definition 1104 for an activity in the future. Examples of a UI and a process for editing activity schema 1102 is described below with reference to FIGS. 13-16.

From operation 1012, the routine 1000 proceeds to operation 1014, where the activity management application 104 can provide a UI for editing properties of the activity presented in the activity-specific UI 802. The UI for editing properties of the activity presented in the activity-specific UI 802 can enable the user 102 to modify various properties of the activity such as, but not limited to, a beginning date for the activity, an end date for the activity, milestones associated with the activity, and other properties. When properties associated with an activity are modified, added, or deleted, the AI engine 112 may update relevancy scores in the AI model 114 to improve the accuracy of the system 100 in selecting an activity schema 1102 and a view definition 1104 for an activity. Examples of a UI and a process for editing the properties of an activity schema 1102 is described below with reference to FIGS. 13-16. Upon the termination of operation 1014, the routine 1000 continues to operation 1016, where it ends.

Figure 11:
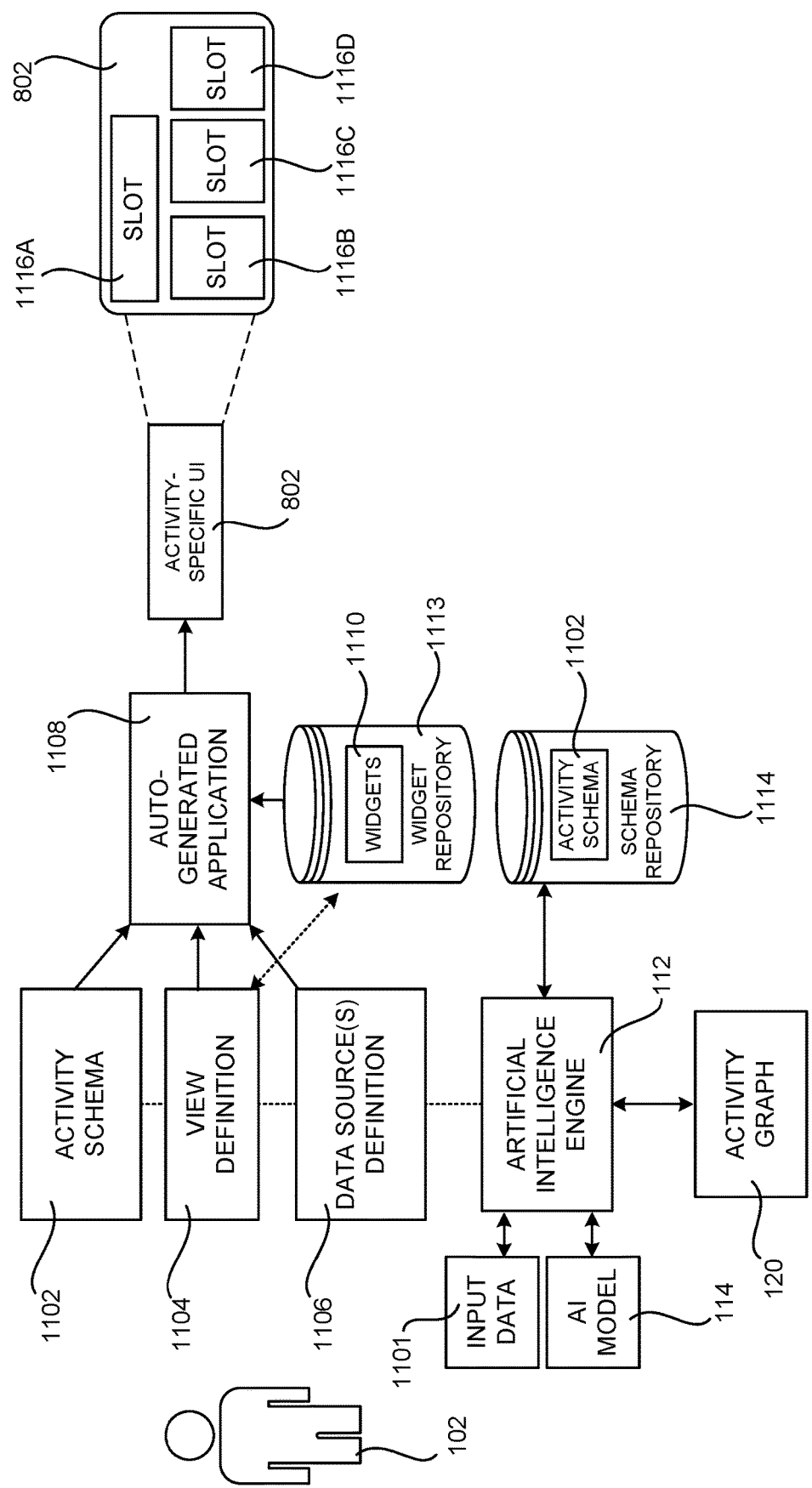
FIG. 11 is a computing system diagram illustrating aspects of an operating environment for auto-generating an application for providing activity-specific views of activity-specific content.

Referring now to FIG. 11, aspects of the system 100 for auto-generating an application 1108 for providing an interactive activity-specific UI 802 of activity-specific content 504 will be described. Generally described, an auto-generated application 1108 (also referred to herein as an "application 1108") can be generated by the system 100 that is capable of obtaining and presenting activity-specific content 504 for an interactive activity-specific UI 802.

In this configuration, the AI engine 112 analyzes topics identified by the leaf nodes 204 in the activity graph 120 that are associated with an activity to select an activity schema 1102 for the activity. The AI engine 112 can select a view definition 1104 for visualizing the activity in an interactive activity-specific UI in a similar fashion. A data source definition 1106 identifying the data sources 118 can also be selected similarly. In this regard, it is to be appreciated that the activity schema 1102, view definition 1104, and data source definition 1106 can be contained in a single file. The schema 1102, view definition 1104, and data source definition 1106 can be selected by the AI engine 112 using the AI model 114, the related activity-specific content 504 and other data, such as the activity graph 120.

The selection of the activity schema 1102 for visualizing data associated with an activity can be made from a number of schemas 1102 stored in a schema repository 1114. The activity schema 1102 and the view definition 1104 can obtain relevant activity-specific content 504 from the data sources 118 and present this data in the activity-specific UI 802. As discussed above, the schema 1102 can define the data sources 118, such as email servers, storage servers, etc. The AI engine 112 then auto-generates the application 1108 based on the selected activity schema 1102, view definition, 1104, and data source definition 1106.

In some configurations, the application 1108 is configured to provide the activity-specific UI 802 based, at least in part, on the selected schema 1102 and the selected view definition 1104. The activity-specific UI 802 includes a number of slots 1116A-1116D for presenting the relevant activity-specific content 504 obtained from the data sources 118. The activity-specific content 504 presented in each slot 1106 can be generated by widgets 1110 stored in a widget repository 1113. Widgets are programs configured to generate a visual presentation of activity-specific content 504 in one of the slots 1116 of the interactive activity-specific UI 802.

Figure 12:
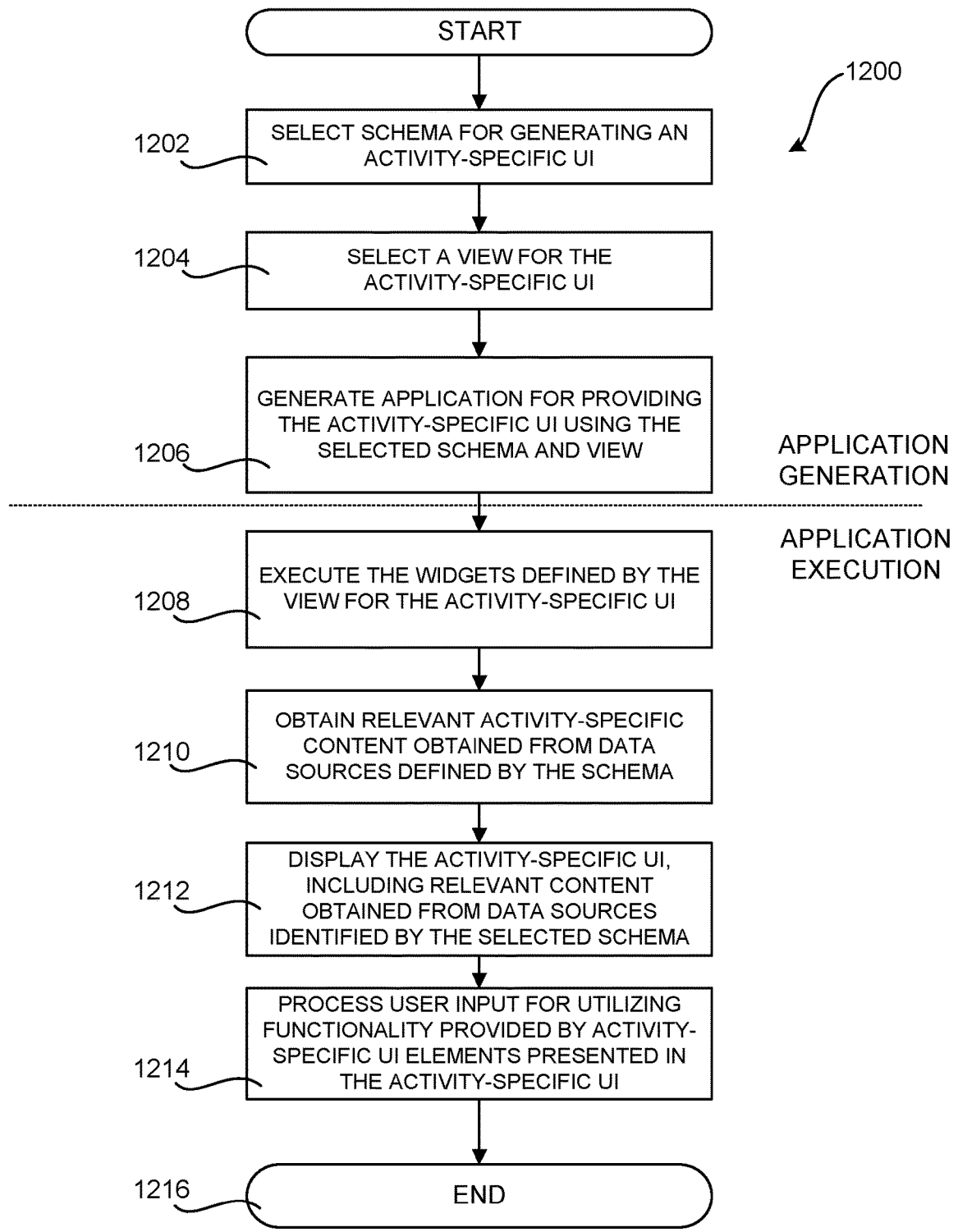
FIG. 12 is a flow diagram illustrating aspects of a routine for auto-generating an application for providing activity-specific views of activity-specific content.

FIG. 12 is a flow diagram illustrating aspects of a routine 1200 for auto-generating an application 1108 for providing activity-specific views 602 and/or activity-specific UIs 802 of activity-specific content 504. The routine 1200 starts at operation 1202 where the AI engine 112 selects a schema 1102 for generating an activity-specific UI 802. As discussed above, the AI engine 112 can utilize various types of data, such as the topics identified by the leaf nodes 204 in the activity graph 120, to select an activity schema 1102.

From operation 1202, the routine 1200 proceeds to operation 1204, where the AI engine 112 selects a view definition 1104 for visualizing activity-specific content 504 in an activity-specific UI 802. As discussed above, the schema 1102, view definition 1104, and a data source definition 1106 can be selected based on an analysis of an activity, the AI model 114, activity-specific content 504, and/or other data such as the activity graph 120.

From operation 1204, the routine 1200 proceeds to operation 1206, where the AI engine 112 can generate an application 1108 for providing an interactive activity-specific UI 802 that includes activity-specific content 504. The application 1108 can be generated based on a schema 1102 that is selected based on input data 1101 or other data describing an activity. As discussed above, the selection of the schema 1102 can be made from a number of schemas 1102 stored in a schema repository 1114. The schema 1102 combined with the view definition 1104 can be utilized to present an activity-specific UI 802 containing relevant activity-specific content 504 obtained from the data sources 118.

From operation 1206, the routine 1200 proceeds to operation 1208, where the application 1108 is executed. Execution of the application 1108 can include execution of the widgets 1110 defined by the view definition 1104 for the activity-specific UI 802. The routine 1200 then proceeds to operation 1210.

At operation 1210, the AI engine 112 can obtain relevant activity-specific content 504 from one or more data sources 118. As discussed above, the data sources 118 can be identified by the schema 1102. Examples of one or more data sources 118 include email servers, file servers, storage services, local computers, etc.

From operation 1210, the routine 1200 continues to operation 1212, where the AI engine 112 can cause the display of the activity-specific UI 802, which includes relevant activity-specific content 504 obtained from the data sources 118 identified by the selected schema. Examples of the activity-specific UIs 802 are shown in FIGS. 9A-9D and described above From operation 1212, the routine 1200 proceeds to operation 1214, where the AI engine 112 can process user input for utilizing functionality provided by the activity-specific UI elements presented in the activity-specific UI 802. As described above, the activity-specific UI 802 can comprise a number of controls for enabling a user to interact with the activity-specific content 504. Scenarios where a user can interact with activity-specific content 504 via one or more activity-specific UI elements 804, is described above in conjunction with FIGS. 9A-9D. From operation 1214, the routine 1200 proceeds to operation 1216, where it ends.

Figure 13:
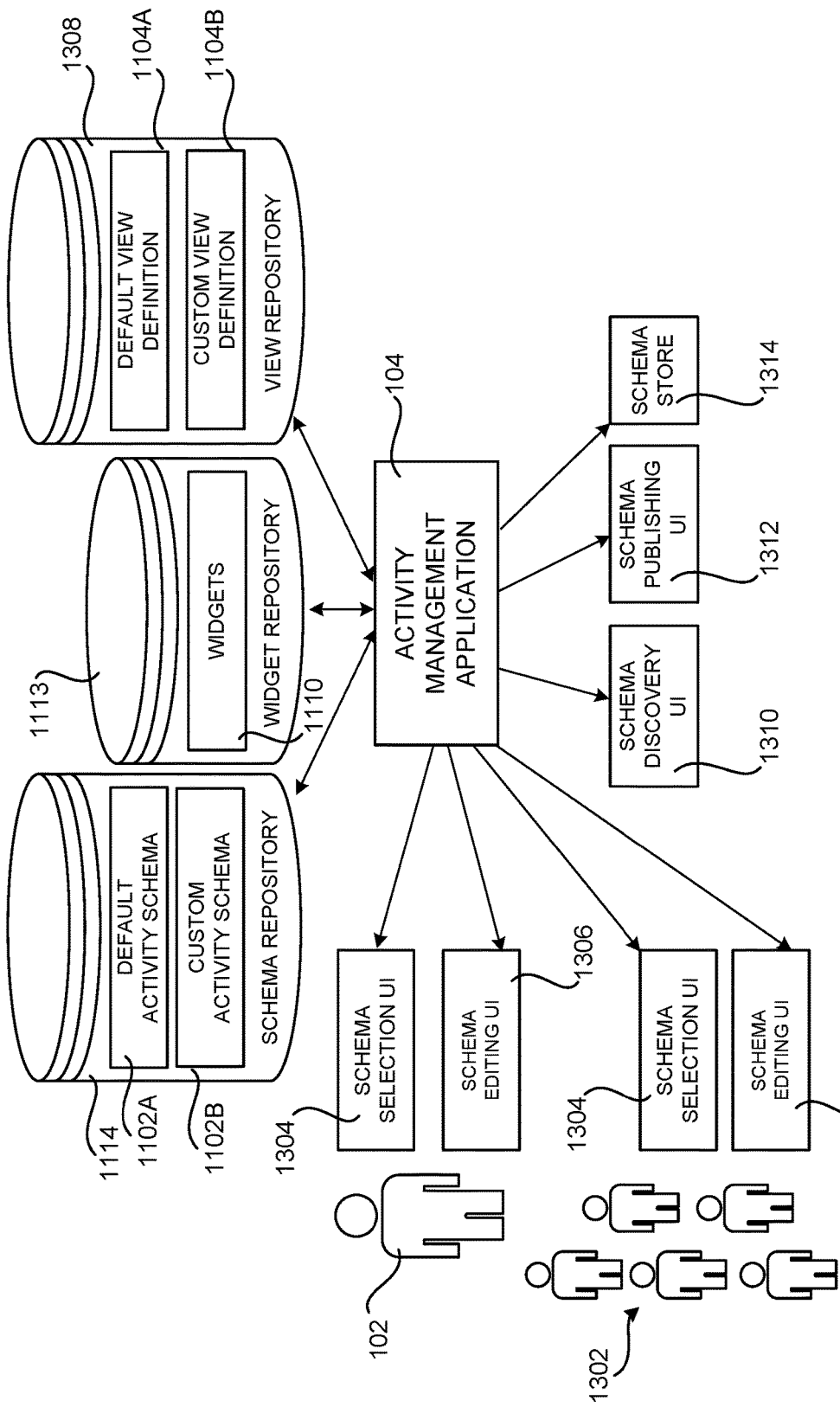
FIG. 13 is a computing system diagram illustrating aspects of an operating environment for enabling individual and crowdsourced modification of an activity schema and schema publication.

Framework and Store for User-Level Customizable Activity-Based Applications for Handling and Managing Data from Various Sources Referring now to FIG. 13, aspects of the activity management application 104 for enabling individual and crowdsourced modification of an activity schema 1102 will be described. In this configuration, a user 102 can interact with UIs provided by the activity management application 104 to discover, select, view, create, edit, publish, and buy or sell activity schemas 1102.

In some configurations, the activity management application 104 provides a schema discovery UI 1310. The schema discovery UI 1310 provides functionality for enabling a user 102 to discover default activity schema 1102 and custom activity schema 1102B that have been customized by other users 102. For example, and without limitation, a schema discovery UI 1310 might provide functionality for enabling users 102 to browse and search the schema 1102 stored in the schema repository 1114.

Once a user 102 has identified a schema 1102 of interest, the user 102 or other users 1302 can utilize a schema selection UI 1304 to select the schema 1102 for use in generating an interactive activity-specific UI 802 for an activity. The schema selection UI 1304 can be utilized to select a default activity schema 1102A for use in presenting activity-specific content 502 for an activity. As discussed above, the AI engine 112 can auto-select an activity schema 1102 for an activity in some embodiments. In this regard, the schema selection UI 1304 can also provide functionality for selecting a different activity schema 1102 than the one selected by the AI engine 112 for an activity. Aspects of the schema selection UI 1304 are described in more detail below in conjunction with FIGS. 15A, 15B, and 16.

As discussed above, the users 102 can also edit activity schema 1102 using a schema editing UI 1306 in some configurations. In particular, the schema editing UI 1306 can be utilized to create a new custom activity schema 102B or to edit a default activity schema 1102A to create a custom activity schema 1102B. Aspects of an illustrative schema editing UI 1306 are presented below in conjunction with FIGS. 14-16.

Once a user 102 has completed creation or editing of a schema 1102, the user 102 can utilize the schema publishing UI 1312 to publish the newly created or edited schema 1102 for use by other users 102. For example, and without limitation, a user 102 might utilize the schema selection UI 1304 to select a default activity schema 1102 for an activity. The user 102 might then utilize the schema editing UI 1306 to edit the default activity schema 1102 to create a custom activity schema 1102B. When the user 102 is satisfied with the custom activity schema 1102B, the user 102 can utilize the schema publishing UI 1312 to publish the custom activity schema 1102 to a schema store 1314.

The schema store 1314 provides functionality for enabling users 102 to view and purchase schema 1102 created by other users or entities. For example, and without limitation, the schema store 1314 can provide UI elements for searching and browsing the schema repository 1114 to identify activity schema 1102 of interest. Once the user 102 has identified an activity schema 1102 of interest, the user 102 can purchase the schema 1102 from the schema store 1314 for personal use.

In a similar fashion, a user 102 can create a custom activity schema 1102B and publish the custom activity schema 1102B for inclusion in the schema store 1314. In this manner, users 102 can create, edit, and share custom activity schema 1102B with other users 102. Although the examples described above are primarily presented in the context of discovering, selecting, editing, and publishing of activity schema 1102, is to be appreciated that view definitions 1104 and data source definitions 1106 can be discovered, selected, edited, published, and bought or sold in a similar manner to that described above.

In some configurations, the activity management application 104 also provides functionality for enabling a group of users 1302 to perform crowdsourcing editing of activity schemas 1102. In particular, users 102 in a group of users 1302 can edit default activity schema 1102A to create custom activity schema 1102B, which can then be published for use by other users 102 in the manner described above. When changes are made to an activity schema 1102 and published, users 102 in the group of users 1302 may be permitted to approve or disapprove of the edits prior to publication. This process is described in further detail below with regard to FIG. 14.

By enabling crowdsourced editing of activity schemas 1102 in the manner described herein, custom activity schemas 1102B can be shared among users 102 to help organize content based on user activities. For instance, university coaches that specialize in track can create activity schema 102 that is specific to viewing and interacting with content relating to track meets. Users 102 engaged in similar activities, such as other track coaches, can utilize and/or edit the shared activity schema. A number of activity schemas 1102 may be created with respect to a particular activity, and a ranking system may enable the AI engine 112 to select the most relevant activity schema for a user's particular activity.

Figure 14:
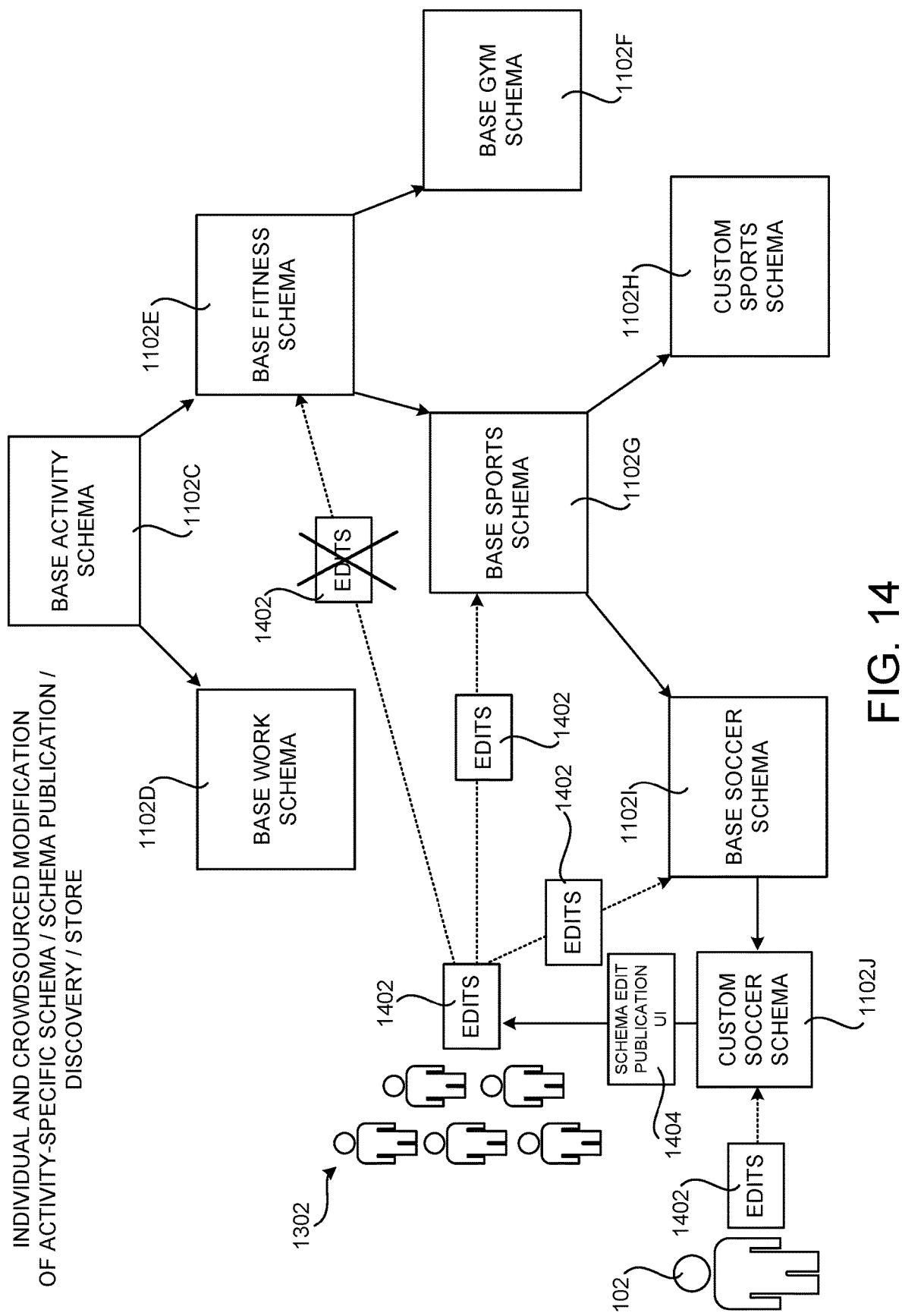
FIG. 14 is a computing system diagram illustrating aspects of an operating environment for enabling individual and crowdsourced modification of activity schemas having inheritance dependencies.

FIG. 14 is a computing system diagram illustrating aspects of the system 100 for enabling crowdsourced modification of activity schemas 1102 having inheritance dependencies. As illustrated in FIG. 14, a base activity schema 1102C can be utilized in some configurations. In these configurations, the base activity schema 1102C includes schema data that is inherited by other activity schema 1102, such as the activity schema 1102D-1102F. In this regard, the base activity schema 1102C can be considered a template, or shell, from which other activity schema 1102 inherit.

In the example shown in FIG. 14, for instance, the base work schema 1102D inherits from the base activity schema 1102C. Similarly, the base fitness schema 1102E also inherits from the base activity schema 1102C. In this manner, the base work schema 1102D and the base fitness schema 1102E include the contents of the base activity schema 1102C plus additional schema data.

The base sports schema 1102G and the base gym schema 1102F inherit from the base fitness schema 1102E. In this manner, the base sports schema 1102G and the base gym schema 1102F include the contents of the base activity schema 1102C, the base fitness schema 1102E, and additional schema data.

The base soccer schema 1102I and the custom sports schema 1102H inherit from the base sports schema 1102G. Consequently, the base soccer schema 1102I and the custom sports schema 1102H include the contents of the base sports schema 1102G, the base fitness schema 1102E, and the base activity schema 1102C, along with additional schema data.

In the example shown in FIG. 14, a user 102 has made edits 1402 to the base soccer schema 1102I to create a custom soccer schema 1102J. The user 102 has also made a request to publish the edits 1402 to the base soccer schema 1102I, to the base sports schema 1102G, and to the base fitness schema 1102E. In some configurations, a schema edit publication UI 1404 is provided through which a user 102 can request to publish edits 1404 made to one activity schema 1102 to other activity schema 1102.

In the example shown in FIG. 14, the system 100 utilizes a crowdsourcing mechanism to determine whether edits 1402 made to a base activity schema 1102 to create a custom activity schema, such as the custom soccer schema 1102J, are to be applied to other activity schema 1102, such as the base soccer schema 1102I, the base sports schema 1102G, and the base fitness schema 1102E, in this example. For instance, a UI might be provided through which users 102 in the group of users 1302 can approve or decline application of the edits 1402 to other activity schema 1102.

In the example shown in FIG. 14, the group of users 1302 has approved application of the edits 1402 to the base soccer schema 1102I and the base sports schema 1102G. The users 102 in the group of users 1302, however, have rejected application of the edits 1402 to the base fitness schema 1102E.

Through the use of the crowdsourcing mechanism shown in FIG. 14 and described above, users 102 can make edits 1402 to activity schema 1102 to create custom activity schema 1102. The edits 1402 might then be applied to other activity schema 1102 based upon the input of other users 102 in a group of users 1302.

Figure 15A:
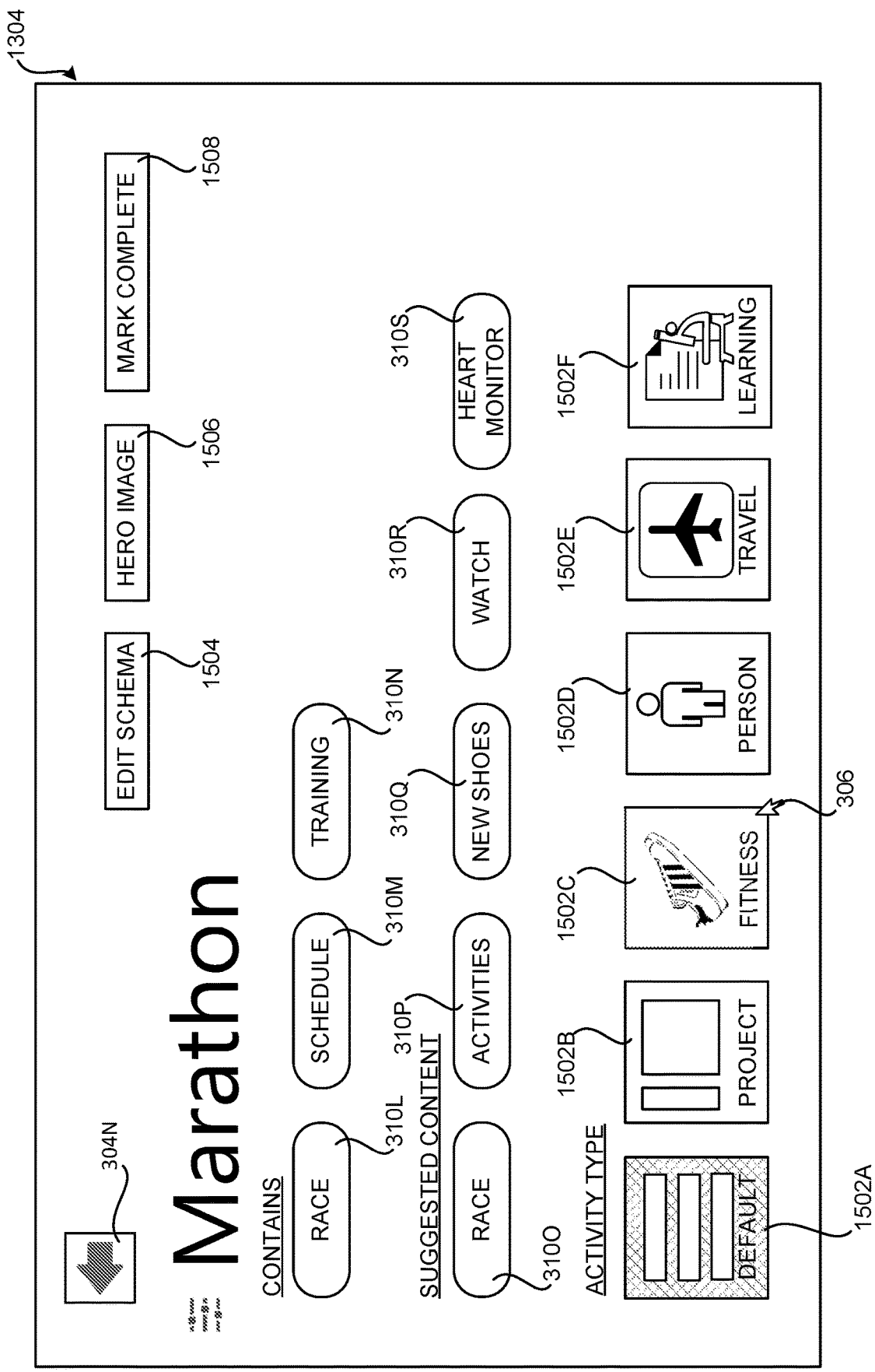
FIG. 15A is a UI diagram showing aspects of an illustrative schema selection UI utilized in some configurations to select an activity schema for an activity.

FIG. 15A is a UI diagram showing aspects of an illustrative schema selection UI 1304. As discussed above with regard to FIG. 9D, selection of the activity settings UI element 902 will cause the schema selection UI 1304 shown in FIG. 15A to be displayed. As illustrated in FIG. 15A, the UI 1304 includes topic identifiers 310L-310N corresponding to topics previously associated with the represented activity (i.e. the "Marathon" activity). The UI 1304 also includes topic identifiers 310O-310S corresponding to other topics identified by the AI engine 112 as potentially being relevant to the represented activity. A user 102 can select the topic identifiers 310O-310S with an appropriate user input device to create an association between the represented topic and the activity.

As also illustrated in FIG. 15A, the UI 1304 includes activity schema selection UI elements 1502A-1502F in some configurations. In this example, the activity schema selection UI element 1502A has been highlighted to identify the activity schema 1102 currently associated with the represented activity. In this example, a default activity schema 1102 has been selected for the represented activity by the AI engine 112. By selecting one of the UI elements 1502B-1502F, a user 102 can select a different activity schema 1102 for use in visualizing the activity-specific content 504 associated with the represented activity. In the example shown in FIG. 15A, a user 102 has utilized the mouse cursor 306 to select the activity schema selection UI element 1502C, thereby associating a fitness activity schema 1102 with the "Marathon" activity.

In the example configuration shown in FIG. 15A, the schema selection UI 1304 also includes a schema editing UI element 1504, a default hero image UI element 1506, and a mark complete UI element 1508. In one configuration, selection of the schema editing UI 1504 will cause the schema editing UI 1306 shown in FIG. 15C to be displayed. Additional details regarding the schema editing UI 1306 will be provided below with regard to FIG. 15C.

Selection of the default image UI element 1506 will allow a user 102 to select a default image, or "hero" image, for use in rendering the background of the interactive activity-specific UI 802. Selection of the mark complete UI element 1508 will cause the represented activity to be marked as having been completed. Thereafter, the activity-specific view 602 corresponding to the represented activity will not be presented in the dashboard UI 502. Selection of the UI element 304N will cause the user interface shown in FIG. 9D to be presented.

Figure 15B:
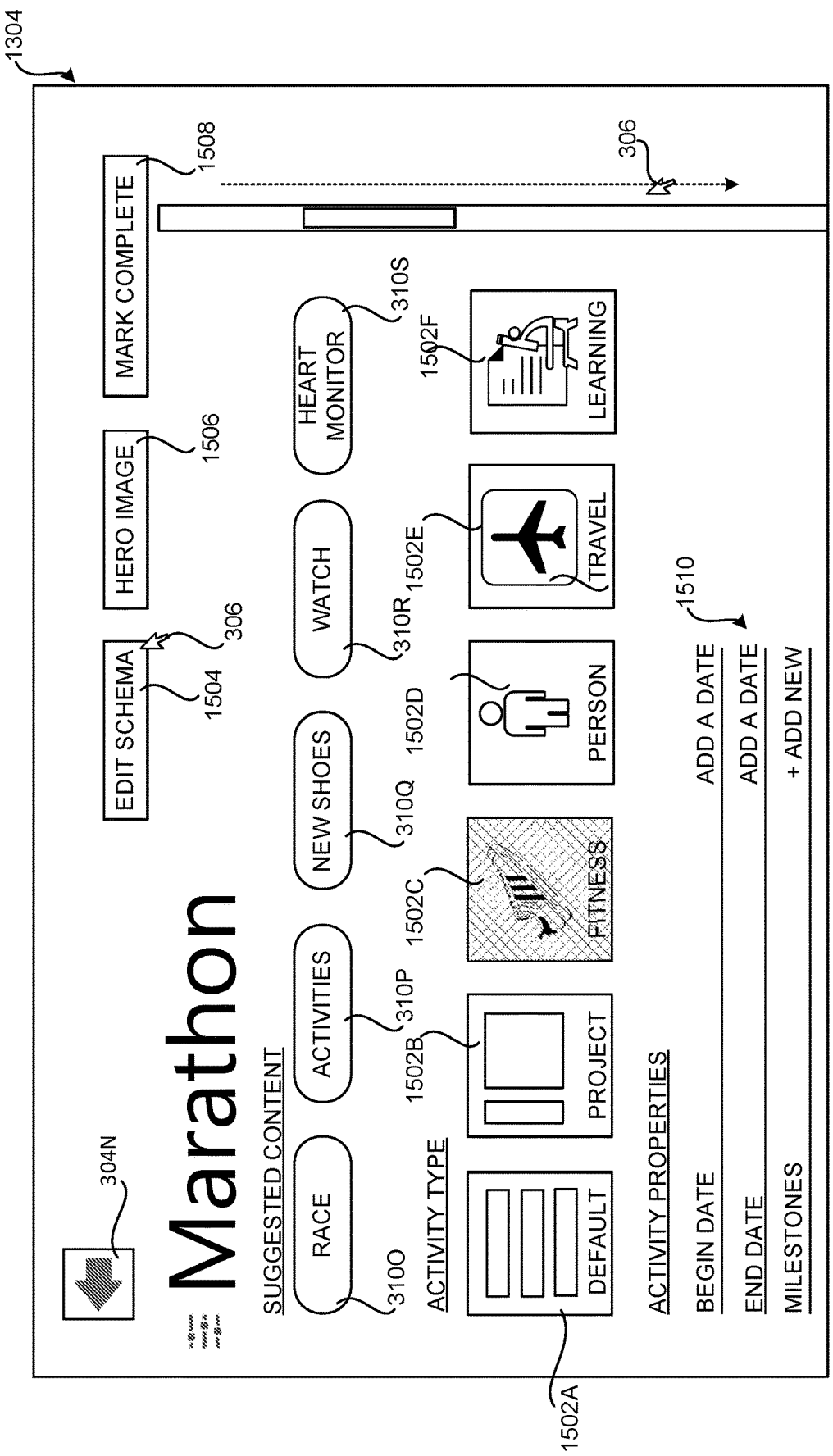
FIG. 15B is a UI diagram showing additional aspects of the schema selection described with regard to FIG. 15A.

FIG. 15B is a UI diagram showing additional aspects of the schema selection UI 1304 described above with regard to FIG. 15A. In the example shown in FIG. 15B, a user 102 has utilized the mouse cursor 306 to scroll the schema selection UI 1304. As a result, additional UI elements have been presented in the schema selection UI 1304 for editing properties associated with the represented activity. In this example, for instance, the user 102 can specify a beginning date for the activity, an ending date for the activity, and define one or more milestones associated with the activity. Other properties for the represented activity can be defined in other configurations.

Figure 15C:
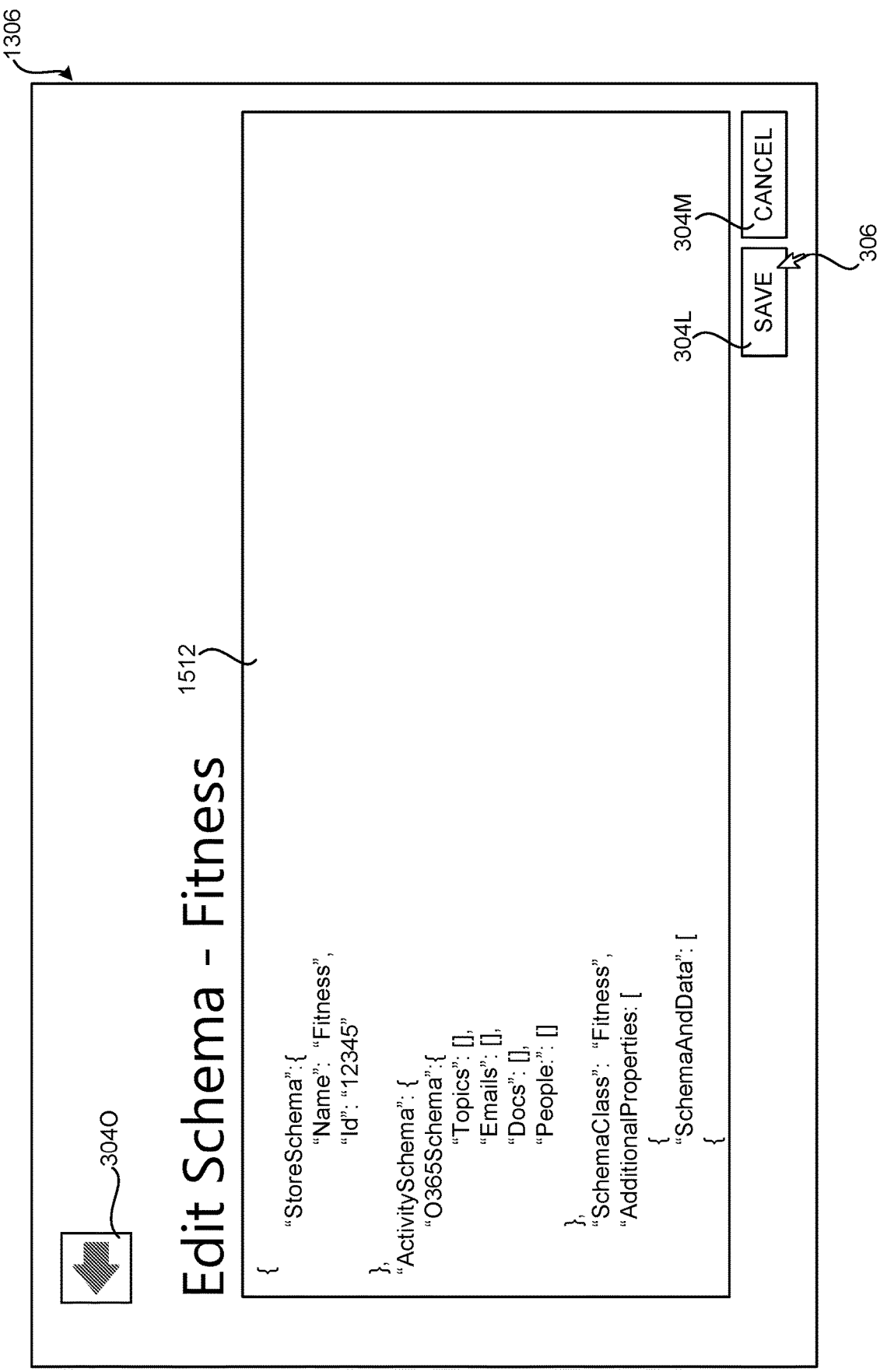
FIG. 15C is a UI diagram showing aspects of an illustrative UI for editing an activity schema.

FIG. 15C is a UI diagram showing aspects of an illustrative UI for editing an activity schema. As discussed briefly above with regard to FIG. 15A, selection of the schema editing UI element 1504 will result in the presentation of the schema editing UI 1306 illustrated in FIG. 15C. The schema editing UI 1306 includes a schema editing pane 1512 in one configuration. The schema editing pane 1512 enables a user 102 to directly edit the activity schema 1102 associated with the represented activity. In this example, for instance, a user 102 can utilize the schema editing pane 1512 to make changes to an activity schema 1102 associated with a "fitness" activity.

In the example shown in FIG. 15C, the schema editing UI 1306 also includes UI elements 304L and 304M which, when selected, will save edits to the activity schema 1102 or cancel any edits made to the activity schema 1102, respectively. The schema editing UI 1306 can also include a UI element 304O which, when selected, will return the display to the schema selection UI 1304 discussed above with regard to FIG. 15A.

FIG. 16 is a flow diagram illustrating aspects of a routine 1600 for enabling individual and crowdsourced modification of activity schema 1102. The routine 1600 begins at operation 1602, where the AI engine 112 selects an activity schema 1102 for an activity in the manner described above. Once an activity schema 1102 has been selected, the routine 1600 proceeds to operation 1604. At operation 1604, a UI can be presented for selecting a different activity schema 1102 for the activity. For example, and without limitation, a UI such as the schema selection UI 1304 can be presented.

From operation 1604, the routine 1600 proceeds to operation 1606, where the activity management application 104 determines whether a user 102 has selected a new activity schema 1102. If a new activity schema 1102 has been selected, the routine 1600 proceeds from operation 1606 to operation 1610, where the newly selected activity schema 1102 is associated with the activity. If a new activity schema 1102 has not been selected, the routine 1600 proceeds from operation 1606 to operation 1608.

At operation 1608 a UI for receiving edits 1402 to the currently selected activity schema 1102 can be provided for example, and without limitation, a UI such as the schema editing UI 1306 can be presented. From operation 1608, the routine 1600 proceeds to operation 1612, where the activity management application 104 determines whether the activity schema 1102 has been edited.

If the activity schema 1102 has been edited, the routine 1600 proceeds to operation 1614, where the edits 1402 can be published for use by other users 102 such as, for example, by using the schema edit publication UI 1404. As discussed above, other users 102 in a group of users 1302 can approve the application of the edits to other activity schema 1102 or reject the edits in some configurations where crowdsourcing is utilized to manage edits that are to be published to other activity schemas 1102.

From operation 1614, the routine 1600 proceeds to operation 1616, where determination is made as to whether the other users 102 approve of the edits 1402 made to the active schema 1102 at operation 1608. If the other users 102 approve of the edits made to the activity schema 1102, the routine 1600 proceeds from operation 1616 to operation 1618, where the edits 1402 are applied to the other activity schema 1102. If the other users 102 do not approve of the edits 1402, the edits are not applied to any other activity schema 1102.

From operation 1618, the routine 1600 proceeds to operation 1620, where the activity management application 104 can provide data to the AI engine 112 describing the selection of a different activity schema 1102 for an activity and/or any edits 1402 made to the activity schema 1102. As described above, the AI engine 112 can utilize this data to update the AI model 114 to increase its accuracy when selecting activity schema 1102 for a particular activity in the future. From operation 1620, the routine 1600 proceeds back to operation 1604, where the process described above may be repeated.

Personalized Artificial Intelligence and Natural Language Models Based Upon User-Defined Semantic Context and Activities FIG. 17 is a computing system diagram illustrating aspects of the system 100 for enabling AI-assisted clustering and personalization of data for disambiguating NL queries over semi-structured data from multiple data sources. As illustrated in FIG. 17, various aspects of the technologies described above can be used in conjunction with a NL search engine 1702. A NL search engine 1702 enables users 102 to perform database searches using regular spoken language, such as English. Using this type of search, a user 102 can submit a NL query 1706 in the form of spoken words or text typed using a natural language format. For example, a user 102 might submit a NL query 1706, such as "Show me my meetings with Rajav about Project X." As another example, a user 102 might submit a NL query 1706 such as, "Show me the engineers I worked with on Project X."

Conventional NL search engines are unable to return accurate search results for queries containing domain-specific terminology, such as in the examples given above. For instance, in the first example, a conventional NL search engine would have no understanding of "meetings with Rajav" about "Project X." Similarly, in the second example, a conventional NL search engine would have no understanding of the "engineers" that worked on "Project X." A conventional NL search engine would not, therefore, be able to respond effectively to these types of queries. The technologies described below address this, and potentially other, technical considerations.

In order to provide accurate results for NL queries 1706 such as those described above, the NL search engine 1702 is configured to operate in conjunction with the AI engine 112, the AI model 114, and the activity graph 120. In particular, the NL model 1704 utilized by the NL search engine 1702 can be trained using the activity graph 120. By training the NL model 1704 using the activity graph 120, the NL search engine 1702 can disambiguate NL queries 1706 over semi-structured data, such as the user content 116, that has been obtained from multiple data sources 118.

As described above, a user 102 might submit an NL query 1706 to the NL search engine 1702 through an appropriate search UI 1708 provided by the activity management application 104, the NL search engine 1702, or another program. Using the first NL query 1706 presented above as a first example, the user 102 might submit an NL query 1706A (shown in FIG. 18A) to the NL search engine 1702, such as "Show me my meetings with Rajav about project X."

Because the NL model 1704 has been trained using the activity graph 120, the AI engine 112 can identify the phrase "Project X" contained in the specified NL query 1706 as being related to the "Project X" activity. Accordingly, the NL search engine 1702 can perform a search of the cluster 206C of user content 116 associated with the "Project X" activity previously generated by the activity management application 104 in the manner described above. More specifically, the NL search engine 1702 can search the instances of user content 116 beneath the node 202J and leaf nodes 204D of the activity graph 120 to discover content relating to the "Project X" activity.

Figure 18A:
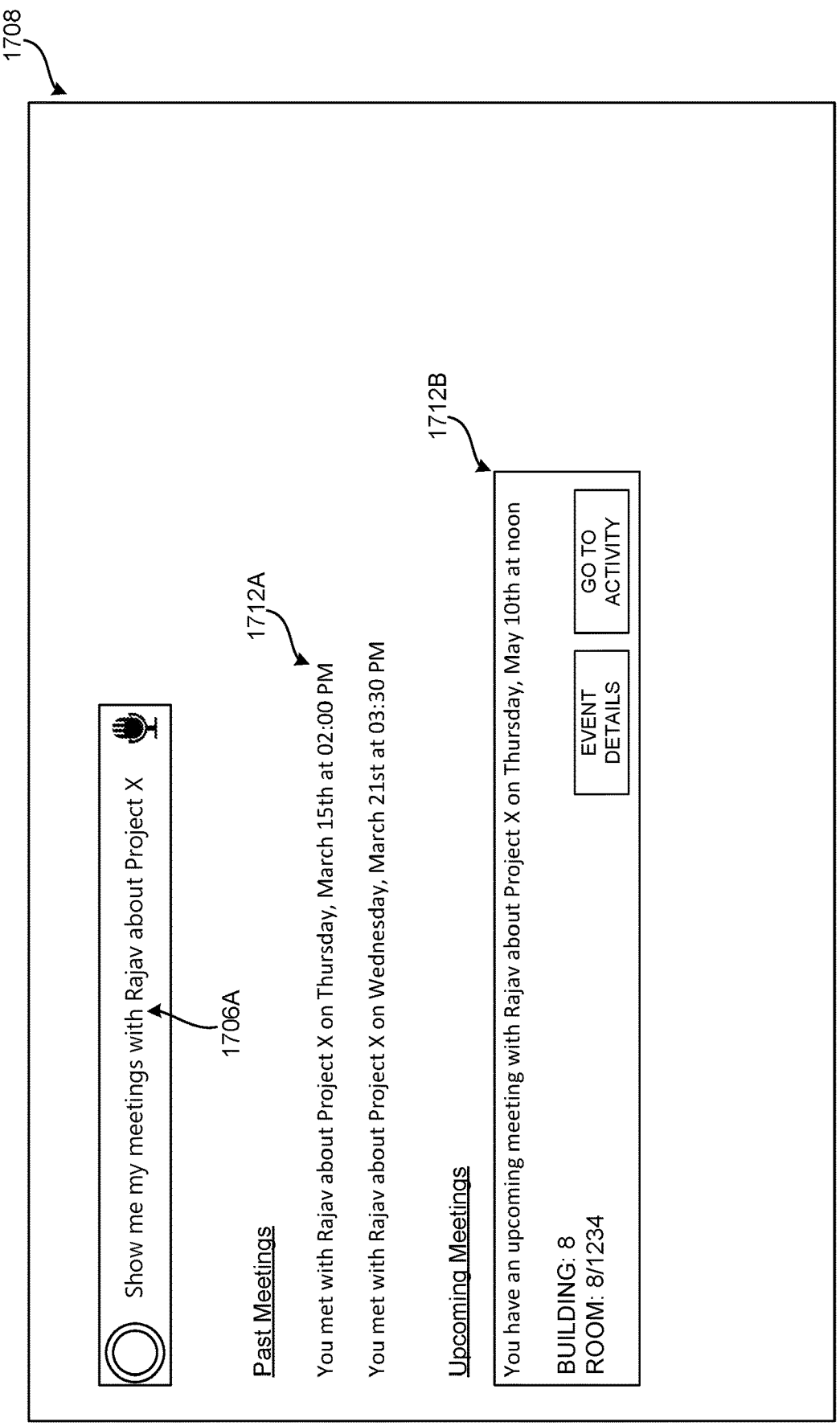
FIG. 18A is a UI diagram showing aspects of an illustrative UI for enabling a system to receive a NL query from a user and to provide disambiguated search results.
Figure 18B:
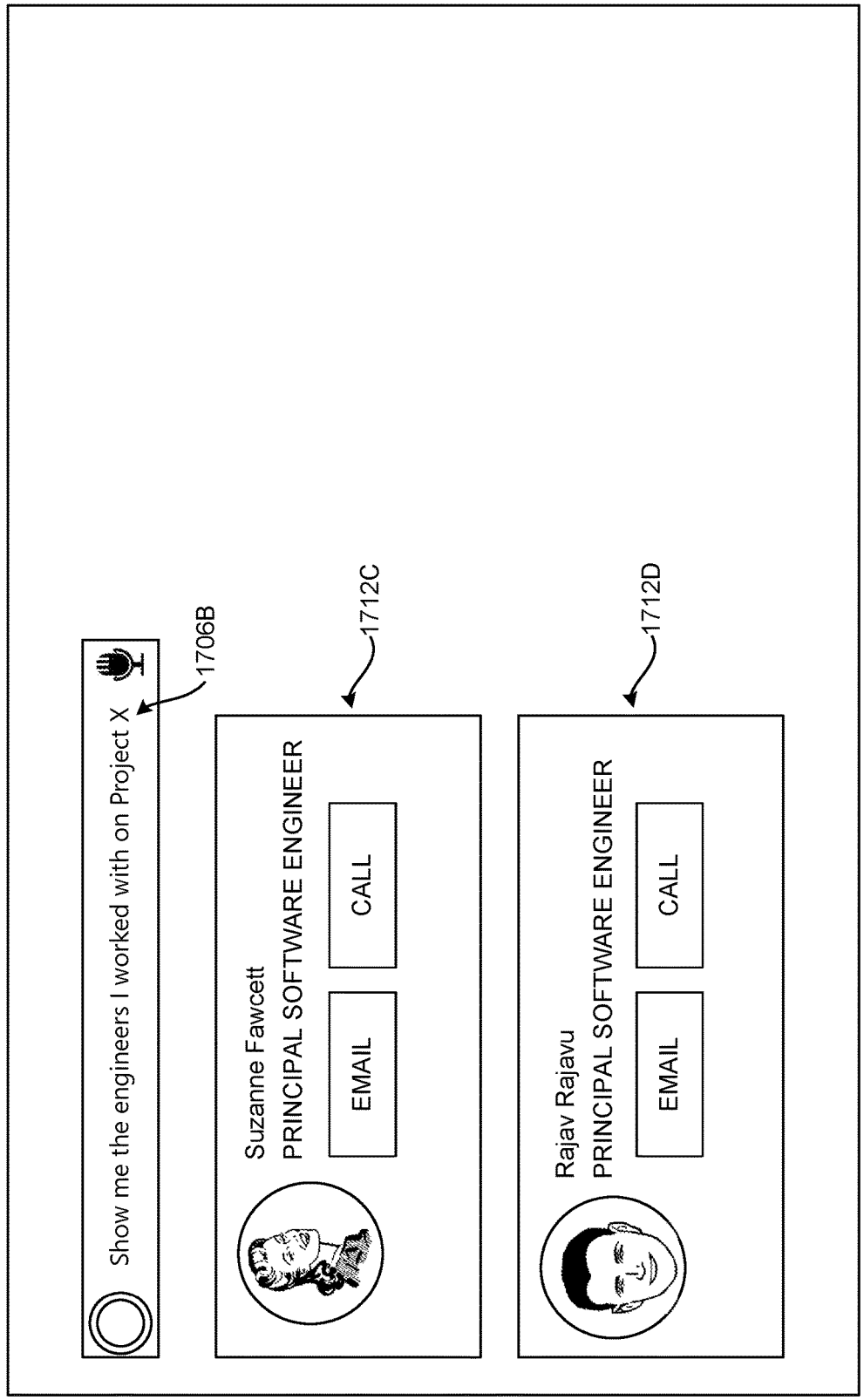
FIG. 18B is a UI diagram showing aspects of an illustrative UI for displaying disambiguated search results that are retrieved by an AI-system in response to a NL query from a user.
Figure 19:
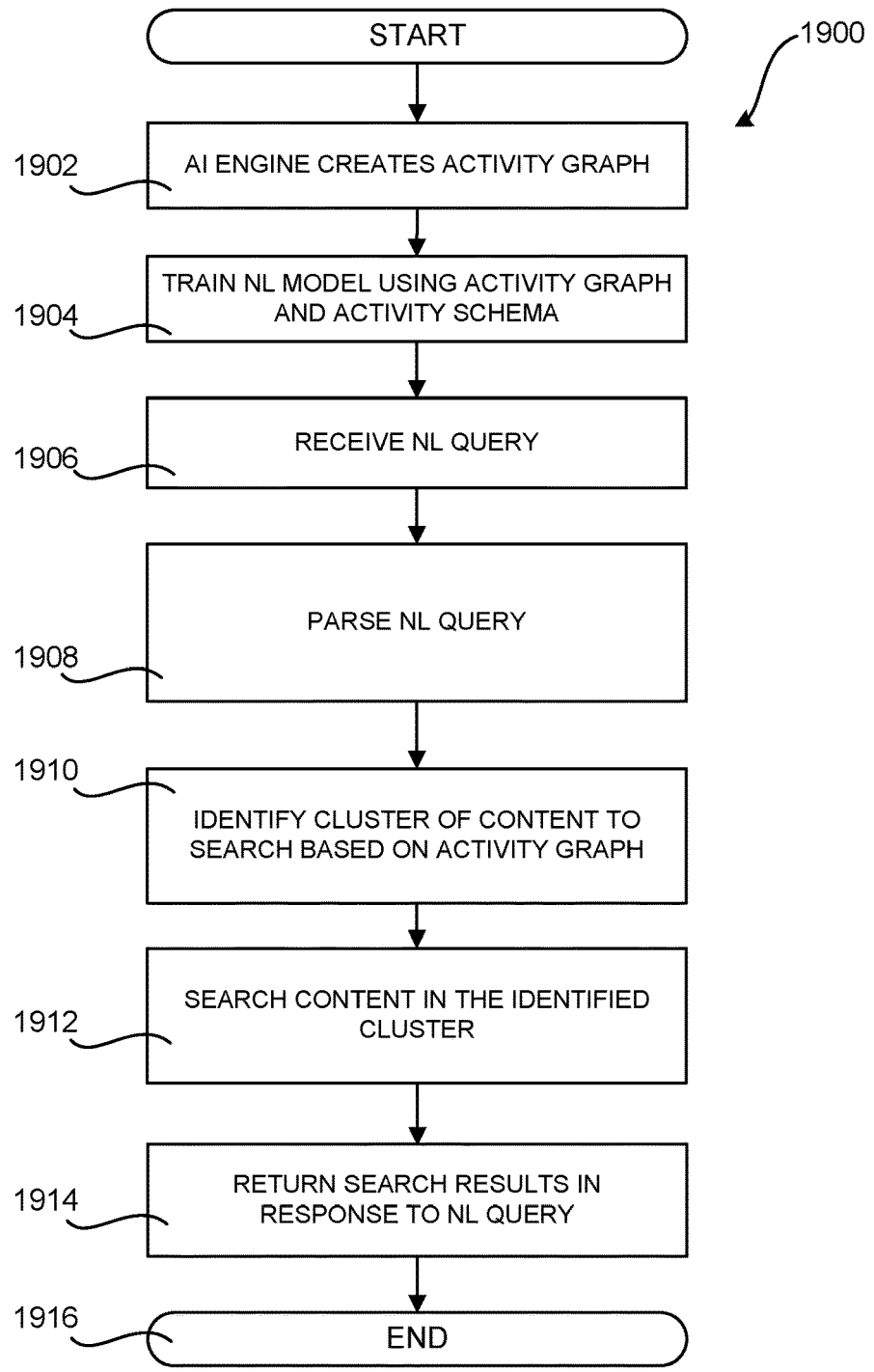
FIG. 19 is a flow diagram illustrating aspects of a routine for enabling AI-assisted clustering and personalization of data for disambiguating NL queries over semi-structured data from multiple data sources.

In this specific example, the NL search engine 1702 can search the cluster 206C for calendar entries that included an individual named "Rajav" and return the identified calendar entries to the user 102 as search results 1712A and 1712B (both shown in FIG. 18A). The search results 1712A identify past meetings with "Rajav" about "Project X." The search results 1712B identify upcoming meetings with "Rajav" about "Project X." The search UI 1708 illustrated in FIG. 18A can also provide additional functionality such as, but not limited to, allowing a user 102 to view details of NL search results, such as a meeting.

Using the second NL query 1706 presented above as a second example, the user 102 might submit an NL query 1706B (shown in FIG. 18B) to the NL search engine 1702, such as "Show me the engineers I worked with on Project X." As in the first example, the NL search engine 1702 can identify the phrase "Project X" contained in the specified NL query 1706 as being related to the "Project X" activity. Accordingly, the NL search engine 1702 can perform a search of the cluster 206C for instances of user content 116 identifying other engineers. For instance, the NL search engine 1702 might search the cluster 206C for email messages relating to the "Project X" activity sent to or received from others to identify engineers associated with the activity.

Search results 1712C and 1712D (shown in FIG. 18B) can then be provided in the search UI 1708.

Figure 18C:
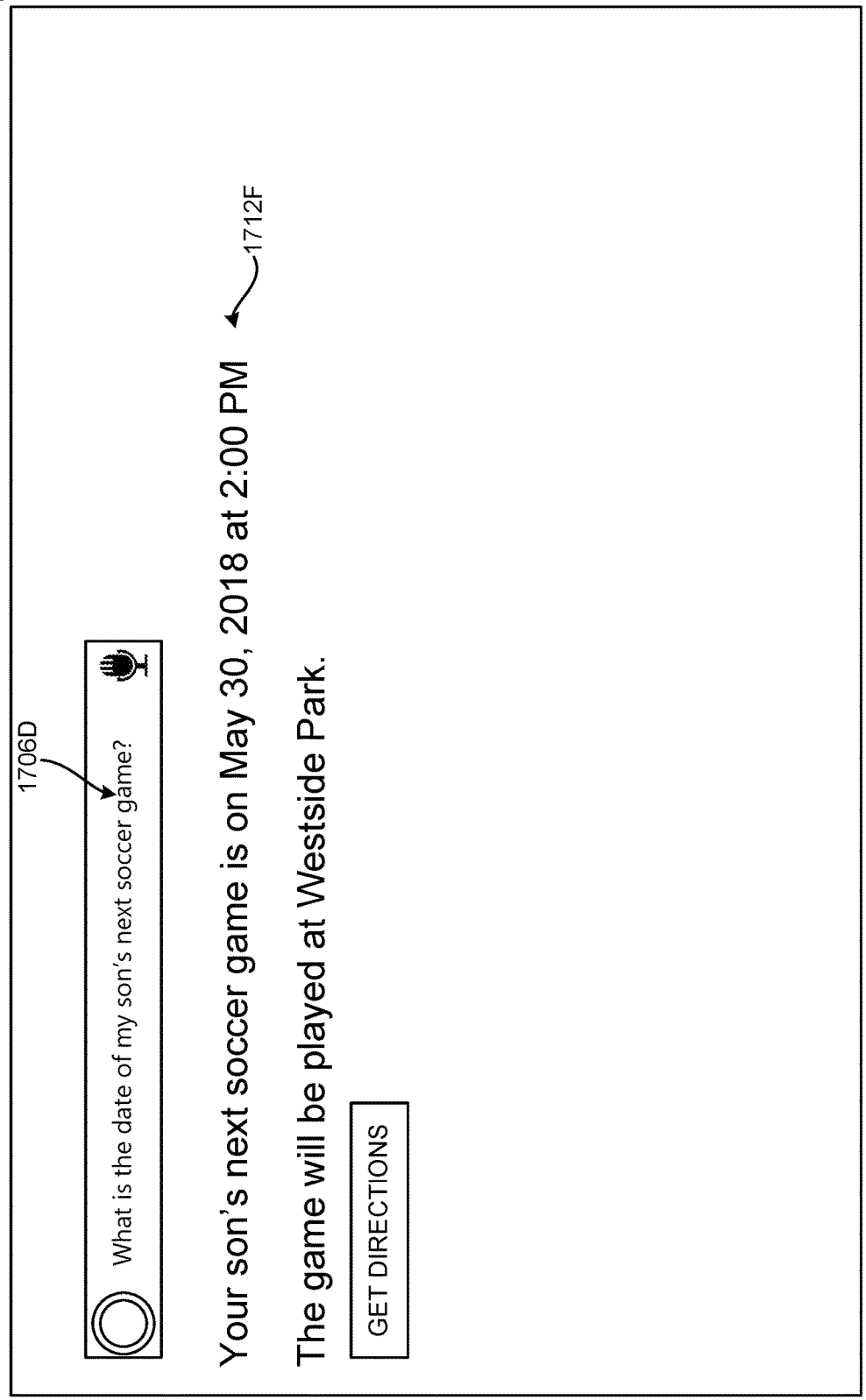
FIG. 18C is a UI diagram showing aspects of an illustrative UI for displaying disambiguated search results that are retrieved by an AI-system in response to a NL query from a user.

In another example, illustrated in FIG. 18C, a user 102 submits a NL query 1706 asking "What is the date of my son's next soccer game?" In this example, the NL search engine 1702 can identify a cluster 206 of user content 116 relating to a "Soccer" activity. In turn, the NL search engine 1702 can search the identified cluster 206 for calendar entries. In the example shown in FIG. 18C, the NL search engine 1702 has identified a calendar entry in the cluster 206 indicating that the next soccer game is on May 30, 2018 at 2:00 PM and provided search results 1712F to the user 102 including this information.

Figure 18D:
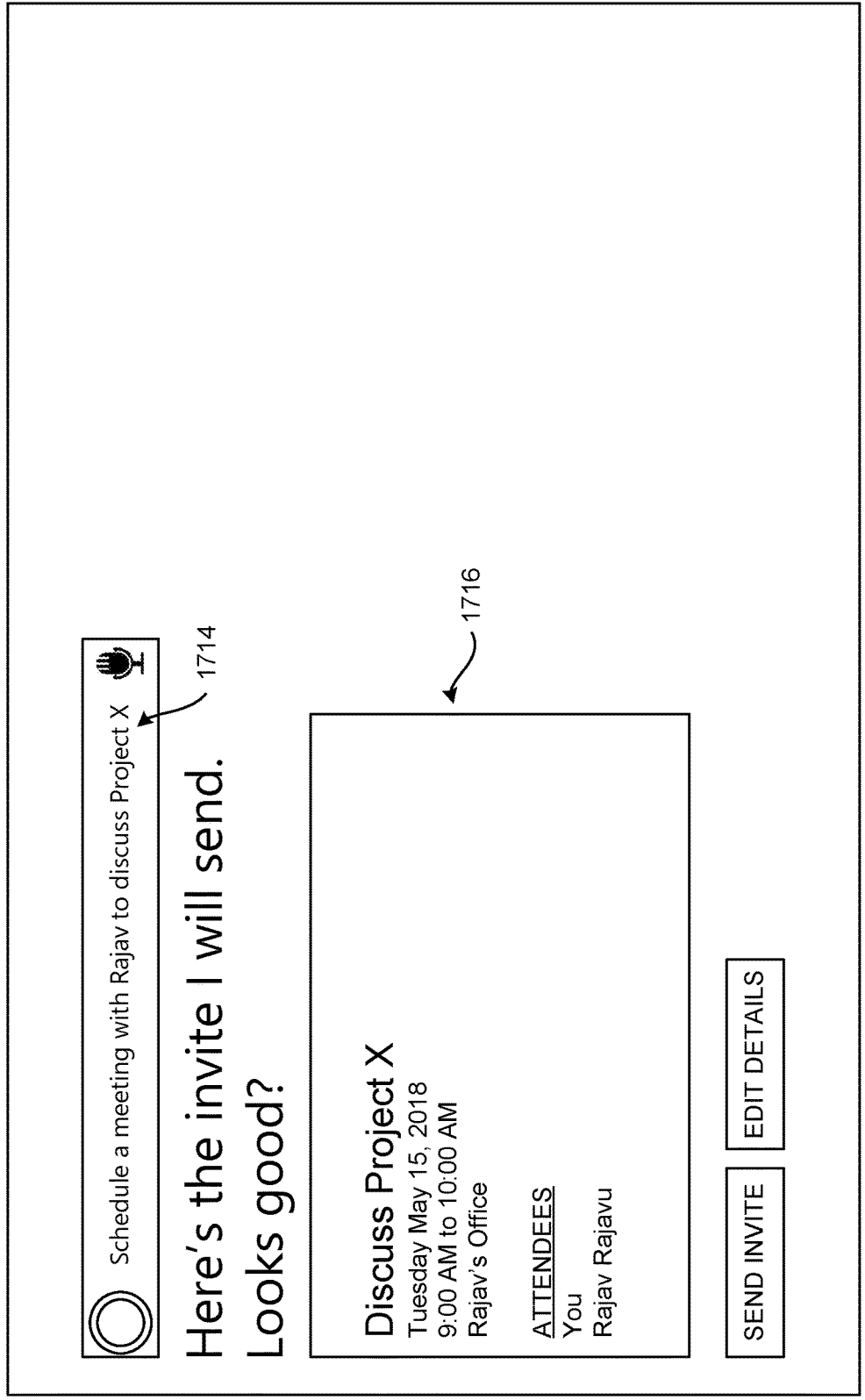
FIG. 18D is a UI diagram showing additional aspects of an illustrative UI for displaying disambiguated search results that are retrieved by an AI-system in response to a NL query from a user.

The technologies described above can also be utilized to disambiguate terms contained in requests to perform tasks made using natural language. For example, and as illustrated in FIG. 18D, a user might submit a request 1714 to the activity management application 104 to "Schedule a meeting with Rajav to discuss Project X." In this example, it likely would not be possible for a conventional NL search engine to disambiguate the individual identified in the request 1714 from other individuals sharing the same name. Using the mechanism described above, however, the proper individual can be identified by searching the cluster 206 relating to the "Project X" activity for individuals named "Rajav." A response 1716 can then be provided that includes a new calendar invitation for a meeting with the proper individual.

FIG. 19 is a flow diagram illustrating aspects of a routine 1900 for enabling AI-assisted clustering and personalization of data for disambiguating NL queries over semi-structured data from multiple data sources as described above with regard to FIGS. 17-18D. The routine 1900 begins at operation 1902, where the AI engine 112 creates the activity graph 120 in the manner described above. Once the activity graph 120 has been generated, the routine 1900 proceeds operation 1904, where an NL model 1704 can be trained using the activity graph 120 and the activity schema 1102. The routine 1900 then proceeds from operation 1904 to operation 1906.

At operation 1906, the NL search engine 1702 receives an NL query 1706, such as those described above. The routine 1900 then proceeds to operation 1908, where the NL search engine 1702 can parse the NL query 1706 to identify entities and intents in the NL query 1706. Once the entities and intents in the NL query 1706 have been identified, the routine 1900 proceeds from operation 1908 to operation 1910, where the activity graph 120 can be utilized to identify the cluster 206 of user content 116 to be searched. For instance, in the examples given above, "Project X" might be identified as an entity. Accordingly, the NL search engine 1702 could limit its search to the cluster 206 containing instances of user content 116 relating to the "Project X" activity.

From operation 1910, the routine 1900 proceeds to operation 1912, where the NL search engine 1702 can search the instances of user content 116 in the identified cluster 206. Once the search has completed, the routine 1900 can proceed to operation 1914, where the NL search engine 1702 can return search results 1712 in response to the NL query 1706. The routine 1910 then proceeds from operation 1914 to operation 1916, where it ends.

Figure 20:
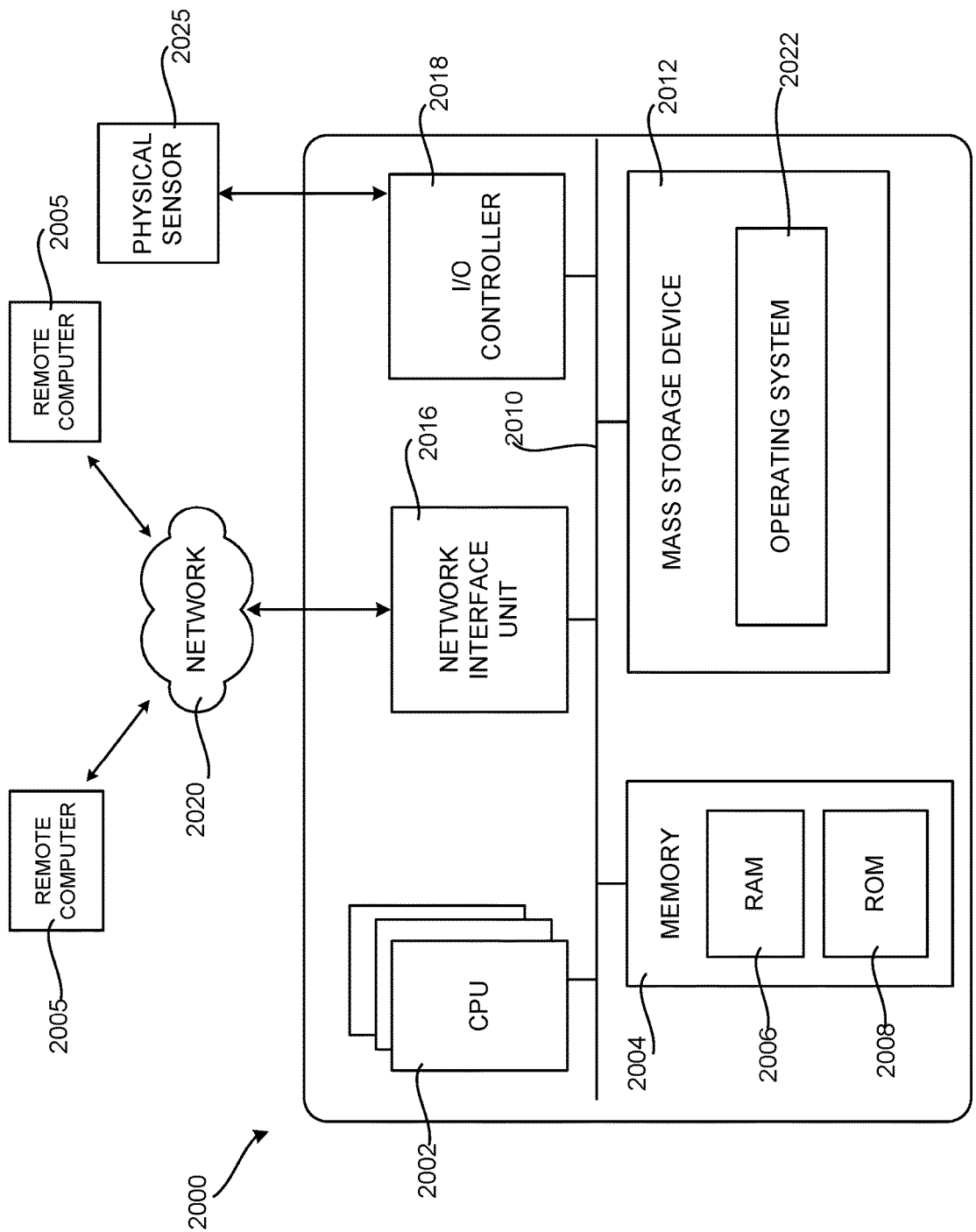
FIG. 20 is a computer architecture diagram showing an illustrative computer hardware and software architecture for a computing device that can execute the various software components presented herein.

FIG. 20 is a computer architecture diagram showing an illustrative computer hardware and software architecture for a computing device that can execute the various software components presented herein. In particular, the architecture illustrated in FIG. 20 can be utilized to implement a server computer, mobile phone, an e-reader, a smartphone, a desktop computer, an alternate reality ("AR") or virtual reality ("VR") device, a tablet computer, a laptop computer, or another type of computing device.

The computer 2000 illustrated in FIG. 20 includes a central processing unit 2002 ("CPU"), a system memory 2004, including a random-access memory 2006 ("RAM") and a read-only memory ("ROM") 2008, and a system bus 2010 that couples the memory 2004 to the CPU 2002. A basic input/output system ("BIOS" or "firmware") containing the basic routines that help to transfer information between elements within the computer 2000, such as during startup, can be stored in the ROM 2008. The computer 2000 further includes a mass storage device 2012 for storing an operating system 2022, application programs, and other types of programs. The mass storage device 2012 can also be configured to store other types of programs and data.

The mass storage device 2012 is connected to the CPU 2002 through a mass storage controller (not shown in FIG. 20) connected to the bus 2010. The mass storage device 2012 and its associated computer readable media provide non-volatile storage for the computer 2000. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 2000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 2000. For purposes of the claims, the phrase "computer storage medium," and variations thereof, does not include waves or signals per se or communication media.

According to various configurations, the computer 2000 can operate in a networked environment using logical connections to remote computers through a network such as the network 2020. The computer 2000 can connect to the network 2020 through a network interface unit 2016 connected to the bus 2010. It should be appreciated that the network interface unit 2016 can also be utilized to connect to other types of networks and remote computer systems. The computer 2000 can also include an input/output controller 2018 for receiving and processing input from a number of other devices, including a keyboard, mouse, touch input, an electronic stylus (not shown in FIG. 20), or a physical sensor such as a video camera. Similarly, the input/output controller 2018 can provide output to a display screen or other type of output device (also not shown in FIG. 20).

It should be appreciated that the software components described herein, when loaded into the CPU 2002 and executed, can transform the CPU 2002 and the overall computer 2000 from a general-purpose computing device into a special-purpose computing device customized to facilitate the functionality presented herein. The CPU 2002 can be constructed from any number of transistors or other discrete circuit elements, which can individually or collectively assume any number of states. More specifically, the CPU 2002 can operate as a finite-state machine, in response to executable instructions contained within the software modules disclosed herein. These computer-executable instructions can transform the CPU 2002 by specifying how the CPU 2002 transitions between states, thereby transforming the transistors or other discrete hardware elements constituting the CPU 2002.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 2000 in order to store and execute the software components presented herein. It also should be appreciated that the architecture shown in FIG. 20 for the computer 2000, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 2000 might not include all of the components shown in FIG. 20, can include other components that are not explicitly shown in FIG. 20, or can utilize an architecture completely different than that shown in FIG. 20.

Figure 21:
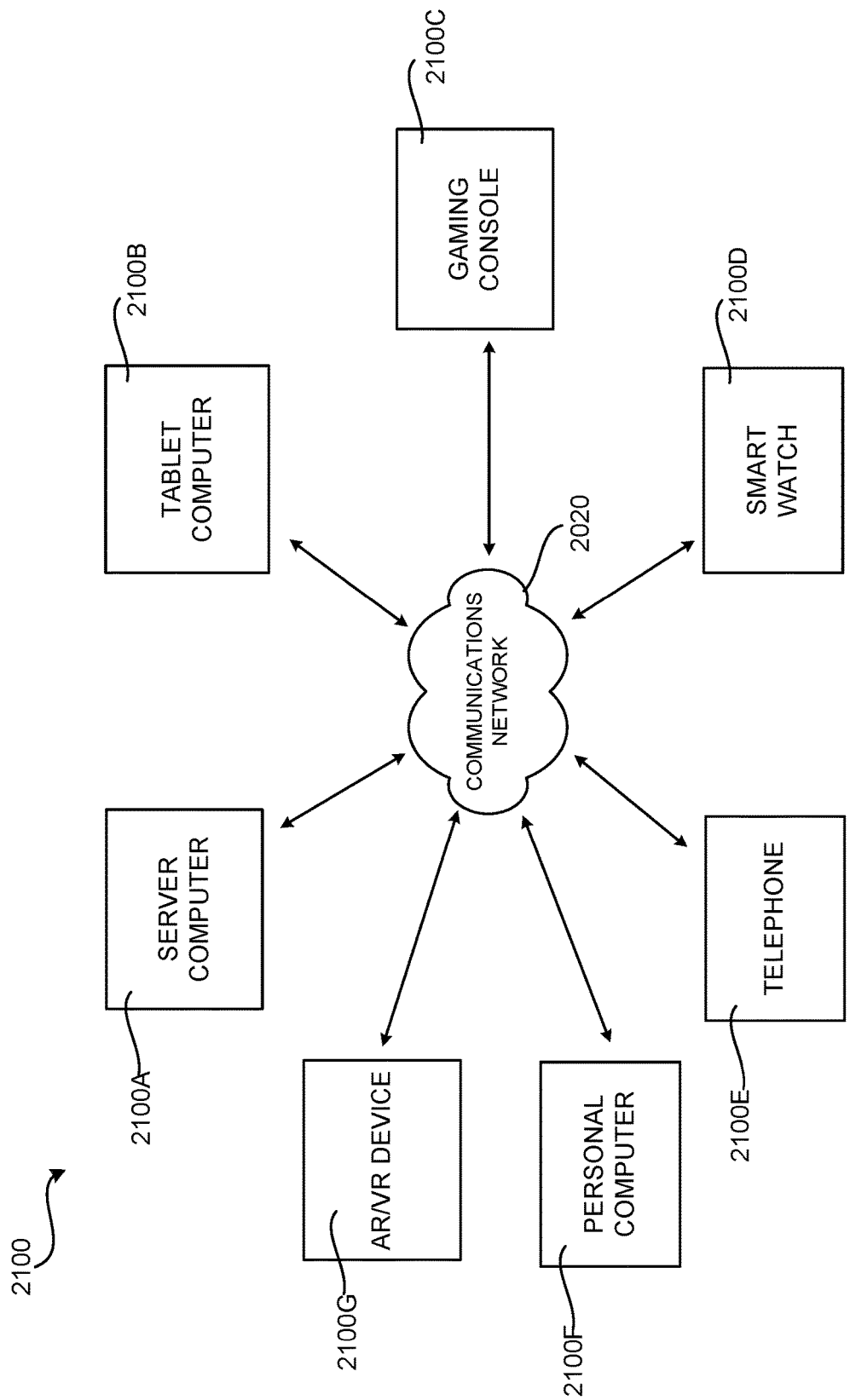
FIG. 21 is a network diagram illustrating a distributed computing environment in which aspects of the disclosed technologies can be implemented, according to various configurations presented herein.

FIG. 21 is a network diagram illustrating a distributed network computing environment 2100 in which aspects of the disclosed technologies can be implemented, according to various configurations presented herein. As shown in FIG. 21, one or more server computers 2100A can be interconnected via a communications network 2020 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 2100B, a gaming console 2100C, a smart watch 2100D, a telephone 2100E, such as a smartphone, a personal computer 2100F, and an AR/VR device 2100G.

In a network environment in which the communications network 2020 is the Internet, for example, the server computer 2100A can be a dedicated server computer operable to process and communicate data to and from the client computing devices 2100B-2100G via any of a number of known protocols, such as, hypertext transfer protocol ("HTTP"), file transfer protocol ("FTP"), or simple object access protocol ("SOAP"). Additionally, the networked computing environment 2100 can utilize various data security protocols such as secured socket layer ("SSL") or pretty good privacy ("PGP"). Each of the client computing devices 2100B-2100G can be equipped with an operating system operable to support one or more computing applications or terminal sessions such as a web browser (not shown in FIG. 21), or other graphical UI (also not shown in FIG. 21), or a mobile desktop environment (also not shown in FIG. 21) to gain access to the server computer 2100A.

The server computer 2100A can be communicatively coupled to other computing environments (not shown in FIG. 21) and receive data regarding a participating user's interactions/resource network. In an illustrative operation, a user (not shown in FIG. 21) may interact with a computing application running on a client computing device 2100B-2100G to obtain desired data and/or perform other computing applications.

The data and/or computing applications may be stored on the server 2100A, or servers 2100A, and communicated to cooperating users through the client computing devices 2100B-2100G over an exemplary communications network 2020. A participating user (not shown in FIG. 21) may request access to specific-data and applications housed in whole or in part on the server computer 2100A. These data may be communicated between the client computing devices 2100B-2100G and the server computer 2100A for processing and storage.

The server computer 2100A can host computing applications, processes and applets for the generation, authentication, encryption, and communication of data and applications, and may cooperate with other server computing environments (not shown in FIG. 21), third party service providers (not shown in FIG. 21), network attached storage ("NAS") and storage area networks ("SAN") to realize application/data transactions.

It should be appreciated that the computing architecture shown in FIG. 20 and the distributed network computing environment shown in FIG. 21 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

Example A: A computer-implemented method, comprising: receiving a term from a user (102) by way of a computing system (2000), the term identifying an activity; identifying one or more topics associated with the activity based upon content (116) associated with the user (102) retrieved from a plurality of data sources (118); rendering one or more first user interface (UI) elements (310) in a UI (106), the one or more first UI elements (310) identifying the one or more topics; rendering a second UI element (308) in the UI (106), the second UI element (308) identifying the activity; receiving user input correlating a selected first UI element (310) with the second UI element (308); and responsive to receiving the user input, associating a topic identified by the selected first UI element (310) with the activity identified by the second UI element (308).

Example B: The computer-implemented method of Example A, wherein an artificial intelligence (AI) engine identifies the one or more topics associated with the activity based upon the content associated with the user retrieved from the plurality of data sources, and wherein the method further comprises: providing data describing the association of the topic identified by the selected first UI element with the activity identified by the second UI element to the AI engine for updating an AI model used by the AI engine to identify the topics associated with the activity.

Example C: The computer-implemented method of Examples A and B, wherein the one or more first UI elements are sized according to a volume of the content associated with the one or more topics.

Example D: The computer-implemented method of Examples A through C, wherein the one or more first UI elements are sized according to a relevance of the one or more topics.

Example E: The computer-implemented method of Examples A through D, wherein an artificial intelligence (AI) engine identifies the one or more topics associated with the activity based upon the content associated with the user retrieved from the plurality of data sources, and wherein the computer-implemented method further comprises receiving user input for resizing one of the one or more first UI elements; and responsive to receiving the user input resizing one of the one or more first UI elements, providing data to the AI engine for reducing or increasing the relevance of the topic identified by the resized first UI element in an AI model used by the AI engine to identify the topics associated with the activity.

Example F: The computer-implemented method of Examples A through E, wherein the one or more first UI elements are ordered according to a relevance of the one or more topics.

Example G: The computer-implemented method of Examples A through F, wherein an artificial intelligence (AI) engine identifies the one or more topics associated with the activity based upon the content associated with the user, retrieved from the plurality of data sources, and wherein the method further comprises: receiving user input reordering the one or more first UI elements; and responsive to receiving the user input reordering the one or more first UI elements, providing data to the AI engine for modifying the relevance of the reordered UI elements in an AI model used to identify the topics associated with the activity.

Example H: A computing system (2000), comprising: one or more processors (2002); and a computer storage medium (2012) having computer-executable instructions stored thereupon which, when executed by the one or more processors (2002), cause the computing system (2000) to: identify one or more topics associated with an activity based upon content (116) associated with a user (102) retrieved from a plurality of data sources (118); render a user interface (UI) (106) comprising one or more first UI elements (310) identifying the one or more topics; render a second UI element (308) in the UI (106), the second UI element (308) identifying the activity; receive user input by way of the UI (106) defining a correlation between a selected first UI element (310) and the second UI element (308); and create an association between a topic identified by the selected first UI element (310) with the activity identified by the second UI element (308) responsive to receiving the user input.

Example I: The computing system (2000) of Example H, wherein an artificial intelligence (AI) engine identifies the one or more topics associated with the activity based upon the content associated with the user retrieved from the plurality of data sources, and wherein the computer storage medium has further computer-executable instructions stored thereupon to: provide data describing the association of the topic identified by the selected first UI element with the activity identified by the second UI element to the AI engine for updating an AI model used to identify the topics associated with the activity.

Example J: The computing system (2000) of Examples H and I, wherein the selected first UI elements are sized according to a relevance of the one or more topics.

Example K: The computing system (2000) of Examples H through J, wherein an artificial intelligence (AI) engine identifies the one or more topics associated with the activity based upon the content associated with the user retrieved from a plurality of data sources, and wherein the computer storage medium has further computer-executable instructions stored thereupon to: receive user input by way of the UI for resizing one of the one or more selected first UI elements; and responsive to receiving the user input resizing one of the one or more selected first UI elements, provide data to the AI engine for reducing or increasing the relevance of the topic identified by the resized first UI element in an AI model used to identify the topics associated with the activity.

Example L: The computing system (2000) of Examples H through K, wherein the computer storage medium has further computer-executable instructions stored thereupon to: receive a selection of the first UI element; and responsive to receiving the selection of the first UI element, present data in the UI that identifies instances of the content associated with the topic identified by the selected first UI element.

Example M: The computing system (2000) of Examples H through L, wherein the computer storage medium has further computer-executable instructions stored thereupon to: receive user input associating an instance of the content with the second UI element; and responsive to receiving the user input associating the instance of the content with the second UI element, providing data describing the association of the instance of the content with the activity associated with the second UI element to an AI engine for updating an AI model used to identify the topics associated with the activity.

Example N: The computing system (2000) of Examples H through M, wherein an artificial intelligence (AI) engine identifies the one or more topics associated with the activity based upon the content associated with the user retrieved from the plurality of data sources, and wherein the computer storage medium has further computer-executable instructions stored thereupon to: receive user input indicating a dissociation of the topic identified by the selected UI element from the activity identified by the second UI element; and provide data describing the dissociation to the AI engine for updating an AI model used to identify the topics associated with the activity.

Example O: The computing system (2000) of Examples H through N, wherein the one or more first UI elements comprise a photo of a person associated with a topic or a keyword associated with a topic.

Example P: A computer storage medium (2012) having computer-executable instructions stored thereupon which, when executed by one or more processors (2002) of a computing system (2000), cause the computing system (2000) to: render a user interface (UI) (106) comprising one or more first UI elements (310) and one or more second UI elements (308), wherein the first UI elements (310) identify one or more topics associated with an activity, and wherein the second UI elements (308) identify the activity; receive user input by way of the UI (106), the user input defining a correlation between at least one of the one or more first UI elements (310) and the second UI element (308); and create an association between a topic identified by the first UI element (310) with the activity identified by the second UI element (308) responsive to receiving the user input.

Example Q: The computer storage medium (2012) of Example P, wherein the one or more first UI elements are sized according to a relevance of the one or more topics.

Example R: The computer storage medium (2012) of Examples P through Q, wherein the one or more first UI elements are ordered according to a relevance of the one or more topics.

Example S: The computer storage medium (2012) of Examples P through R, wherein the one or more first UI elements are sized according to a volume of the content associated with the one or more topics.

Example T: The computer storage medium (2012) of Examples P through S, wherein the one or more first UI elements comprise a photo of a person associated with a topic or a keyword associated with a topic.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts, and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
    receiving, from one or more data sources, content associated with a user;
    receiving, via a configuration user interface (UI), first user input that defines a first activity identifier that indicates a first activity that is engaged in by the user;
    receiving, via the configuration UI, second user input that defines a second activity identifier that indicates a second activity that is engaged in by the user;
    based on the first user input and the second user input, causing an artificial intelligence (AI) engine to analyze the content based on an AI model to determine:
        a first topic, from the content associated with the user, that is associated with the first activity that is engaged in by the user, and
        a second topic, from the content associated with the user, that is associated with the second activity that is engaged in by the user;
    rendering, via the configuration UI, at least:
        a first topic identifier UI element that identifies the first topic determined to be associated with the first activity that is engaged in by the user, and
        a second topic identifier UI element that identifies the second topic determined to be associated with the second activity that is engaged in by the user;
    generating an activity graph that is associated with the user and that includes:
        a first node that corresponds to the first activity,
        a second node that corresponds to the second activity,
        a third node that corresponds to the first topic and that is linked, within the activity graph, to the first node that corresponds to the first activity, and
        a fourth node that corresponds to the second topic and that is linked, within the activity graph, to the second node that corresponds to the second activity;
    receiving, via the configuration UI, third user input associated with the first topic identifier UI element, the third user input confirming that the first topic is associated with the first activity that is engaged in by the user;
    receiving, via the configuration UI, fourth user input associated with the second topic identifier UI element, the fourth user input refuting that the second topic is associated with the second activity that is engaged in by the user; and
    updating the AI model and the activity graph based on the fourth user input refuting that the second topic is associated with the second activity that is engaged in by the user.

2. The computer-implemented method of claim 1, further comprising providing data describing an association of the first topic identified by the first topic identifier UI element to the AI engine for updating an AI model used by the AI engine to identify one or more topics associated with the first activity identifier.

3. The computer-implemented method of claim 1, wherein the first topic identifier UI element is sized according to a volume of the content associated with the first topic.

4. The computer-implemented method of claim 1, wherein the first topic identifier UI element is sized according to a relevance of the first topic.

5. The computer-implemented method of claim 4, further comprising:
    receiving fifth user input that resizes the first topic identifier UI element; and
    responsive to receiving the fifth user input, providing data to the AI engine for reducing or increasing the relevance of the first topic in the AI model.

6. The computer-implemented method of claim 1, wherein the first topic identifier UI element is ordered, in relation to one or more other topic identifier UI elements, according to the relevance of the first topic in relation to one or more other topics that are individually associated with the one or more other topic identifier UI elements.

7. The computer-implemented method of claim 6, further comprising:
    receiving fifth user input that reorders the one or more other topic identifier UI elements; and responsive to receiving the fifth user input, providing data to the AI engine for modifying the relevance of the reordered topic identifier UI elements in the AI model.

8. A computing system, comprising:
one or more processors; and
a computer storage medium having computer-executable instructions stored thereupon which, when executed by the one or more processors, cause the computing system to:
- receive, from one or more data sources, content associated with a user;
- receive, via a configuration user interface (UI), first user input that defines a first activity identifier that indicates a first activity that is engaged in by the user;
- receive, via the configuration UI, second user input that defines a second activity identifier that indicates a second activity that is engaged in by the user;
- based on the first user input and the second user input, cause an artificial intelligence (AI) engine to analyze the content based on an AI model to determine:
  - a first topic, from the content associated with the user, that is associated with the first activity that is engaged in by the user, and
  - a second topic, from the content associated with the user, that is associated with the second activity that is engaged in by the user;
- render, via the configuration UI, at least:
  - a first topic identifier UI element that identifies the first topic determined to be associated with the first activity that is engaged in by the user, and
  - a second topic identifier UI element that identifies the second topic determined to be associated with the second activity that is engaged in by the user;
- generate an activity graph that is associated with the user and that includes:
  - a first node that corresponds to the first activity,
  - a second node that corresponds to the second activity,
  - a third node that corresponds to the first topic and that is linked, within the activity graph, to the first node that corresponds to the first activity, and
  - a fourth node that corresponds to the second topic and that is linked, within the activity graph, to the second node that corresponds to the second activity;
- receive, via the configuration UI, third user input associated with the first topic identifier UI element, the third user input confirming that the first topic is associated with the first activity that is engaged in by the user;
- receive, via the configuration, fourth user input associated with the second topic identifier UI element, the fourth user input refuting that the second topic is associated with the second activity that is engaged in by the user; and
- update the AI model and the activity graph based on the fourth user input refuting that the second topic is associated with the second activity that is engaged in by the user.

9. The computing system of claim 8, wherein the computer storage medium has further computer-executable instructions stored thereupon which, when executed by the one or more processors, cause the computing system to provide data describing an association of the first topic identified by the first topic identifier UI element with the first activity to the AI engine for updating the AI model used to identify one of more topics associated with the first activity.

10. The computing system of claim 8, wherein the first topic identifier UI element is sized according to a relevance of the first topic in relation to one or more other topics.

11. The computing system of claim 10, wherein the computer storage medium has further computer-executable instructions stored thereupon which, when executed by the one or more processors, cause the computing system to:
- receive fifth user input that resizes the first topic identifier UI element; and
- responsive to receiving the fifth user input, provide data to the AI engine for reducing or increasing the relevance of the first topic in the AI model.

12. The computing system of claim 8, wherein the computer storage medium has further computer-executable instructions stored thereupon which, when executed by the one or more processors, cause the computing system to:
- receive a selection of the first topic identifier UI element; and
- responsive to receiving the selection, present data in the configuration UI that identifies instances of the content associated with the first topic.

13. The computing system of claim 12, wherein the computer storage medium has further computer-executable instructions stored thereupon which, when executed by the one or more processors, cause the computing system to:
- receive fifth user input that associates an instance of the content with the first topic identifier UI element; and
- responsive to receiving the fifth user input, providing data describing the association of the instance of the content with the first topic to the AI engine for updating the AI model.

14. The computing system of claim 8, wherein the first topic identifier UI element comprises a photo of a person associated with the first topic.

15. A computer storage medium having computer-executable instructions stored thereupon which, when executed by one or more processors of a computing system, cause the computing system to:
- receive, from one or more data sources, content associated with a user;
- receive, via a configuration user interface (UI), first user input that defines a first activity identifier that indicates a first activity that is engaged in by a user;
- receive, via the configuration UI, second user input that defines a second activity identifier that indicates a second activity that is engaged in by the user;
- based on the first user input and the second user input, cause an artificial intelligence (AI) engine to analyze the content based on an AI model to determine:
  - a first topic, from the content associated with the user, that is associated with the first activity that is engaged in by the user, and
  - a second topic, from the content associated with the user, that is associated with the second activity that is engaged in by the user;
- generate an activity graph that is associated with the user and that includes:
  - a first node that corresponds to the first activity,
  - a second node that corresponds to the second activity,
  - a third node that corresponds to the first topic and that is linked, within the activity graph, to the first node that corresponds to the first activity, and
  - a fourth node that corresponds to the second topic and that is linked, within the activity graph, to the second node that corresponds to the second activity;
- cause at least a portion of the activity graph to be rendered via the configuration UI;

receive, via the configuration UI that renders the at least the portion of the activity graph, third user input confirming that the first topic is associated with the first activity that is engaged in by the user;

receive, via the configuration UI that renders the at least the portion of the activity graph, fourth user input refuting that the second topic is associated with the second activity that is engaged in by the user; and update the AI model and the activity graph based on the fourth user input refuting that the second topic is associated with the second activity that is engaged in by the user.

16. The computer storage medium of claim 15, wherein the computer storage medium has further computer-executable instructions stored thereupon which, when executed by the one or more processors of the computing system, cause the computing system to:

render, via the configuration UI, a first topic identifier UI element that identifies the first topic determined to be associated with the first activity that is engaged in by the user; and render, via the configuration UI, a second topic identifier UI element that identifies the second topic determined to be associated with the second activity that is engaged in by the user.

17. The computer storage medium of claim 16, wherein the first topic identifier UI element and the second topic identifier UI element are sized according to a relevance of the first topic in relation to a relevance of the second topic.

18. The computer storage medium of claim 16, wherein the first topic identifier UI element and the second topic identifier UI element are ordered according to a relevance of the first topic in relation to a relevance of the second topic.

19. The computer storage medium of claim 16, wherein the first topic identifier UI element and the second topic identifier UI element are sized according to a relative volume of the content associated with the first topic in relation to the second topic.

20. The computer storage medium of claim 16, wherein the first topic identifier UI element comprises a photo of a person associated with the first topic.

* * * * *